United States Patent
Rudisill et al.

(10) Patent No.: US 10,680,383 B2
(45) Date of Patent: Jun. 9, 2020

(54) LINEAR ELECTRODE SYSTEMS FOR MODULE ATTACHMENT WITH NON-UNIFORM AXIAL SPACING

(71) Applicants: Charles Albert Rudisill, Apex, NC (US); Daniel John Whittle, Bellingham, WA (US)

(72) Inventors: Charles Albert Rudisill, Apex, NC (US); Daniel John Whittle, Bellingham, WA (US)

(73) Assignee: Apex Technologies, Inc., Apex, NC (US)

( * ) Notice: Subject to any disclaimer, the term of this patent is extended or adjusted under 35 U.S.C. 154(b) by 0 days.

(21) Appl. No.: 16/149,137

(22) Filed: Oct. 2, 2018

(65) Prior Publication Data

US 2019/0036272 A1     Jan. 31, 2019

Related U.S. Application Data

(63) Continuation-in-part of application No. 15/213,115, filed on Jul. 18, 2016, which is a continuation-in-part
(Continued)

(51) Int. Cl.
    *F21V 21/35*      (2006.01)
    *H01R 13/62*      (2006.01)
    (Continued)

(52) U.S. Cl.
    CPC ....... *H01R 13/6205* (2013.01); *F21V 21/096* (2013.01); *F21V 21/34* (2013.01);
    (Continued)

(58) Field of Classification Search
    CPC ...... H01R 13/6205; F21S 6/005; F21V 21/34; F21V 21/35
(Continued)

(56) References Cited

U.S. PATENT DOCUMENTS

| | | |
|---|---|---|
| 737,027 A | 8/1903 | Rutledge |
| 1,067,024 A | 7/1913 | Hall et al. |

(Continued)

FOREIGN PATENT DOCUMENTS

| | | |
|---|---|---|
| DE | 2516011 A1 | 10/1976 |
| DE | 3811740 A1 | 10/1989 |

(Continued)

OTHER PUBLICATIONS

"WAC FlexrailHM1-T4_IN" (WAC Lighting Installation Instructions for Flexrail1™ System—Line Voltage) found at http://www.waclighting.com/sites/waclighting.com/files/product/instrsheet/HM1-T4_IN.pdf downloaded on May 2, 2016.

*Primary Examiner* — Neil Abrams
(74) *Attorney, Agent, or Firm* — Patent Leverage LLC

(57) ABSTRACT

Embodiments of electrode systems having non-uniform spacing between electrodes along the axial direction for track lighting and other linear systems are disclosed. These systems may be used to provide directional flexibility for removable lighting fixtures with an asymmetric light distribution by providing a range of module position and angular mounting options. Some embodiments include electrodes which overlap continuously or at a series of discrete crossover overlap nodes to provide lateral support without external spacers. Electrode segments may be electrically and mechanically attached at overlap nodes to create extended two- and three-dimensional structures with localized planar areas. Embodiments with preferential bending regions provide additional directional capability. Embodiments of electrode systems integrated into planar surfaces or combined into extended suspended arrays are disclosed Modules with magnetic connectors having complete magnetic flux paths for use with the electrode systems are also disclosed.

20 Claims, 25 Drawing Sheets

Related U.S. Application Data of application No. 15/010,605, filed on Jan. 29, 2016, now Pat. No. 9,583,871, which is a continuation of application No. 13/910,132, filed on Jun. 5, 2013, now Pat. No. 9,300,081.

(60) Provisional application No. 61/786,037, filed on Mar. 14, 2013, provisional application No. 62/193,073, filed on Jul. 16, 2015, provisional application No. 62/569,370, filed on Oct. 6, 2017.

(51) Int. Cl.
| | |
|---|---|
| H01R 13/645 | (2006.01) |
| H01R 11/30 | (2006.01) |
| H01R 12/77 | (2011.01) |
| F21V 21/096 | (2006.01) |
| F21V 21/34 | (2006.01) |
| H04M 1/02 | (2006.01) |
| F21Y 115/10 | (2016.01) |

(52) U.S. Cl.
CPC ........... *H01R 11/30* (2013.01); *H01R 12/771* (2013.01); *H01R 13/645* (2013.01); *F21Y 2115/10* (2016.08); *H04M 1/0274* (2013.01)

(58) Field of Classification Search
USPC ......... 439/110, 111; 362/225, 285, 220, 391, 362/392, 648
See application file for complete search history.

(56) References Cited

U.S. PATENT DOCUMENTS

| | | | |
|---|---|---|---|
| 1,738,524 A * | 12/1929 | Christopher | H01R 33/7664 439/304 |
| 2,139,815 A | 12/1938 | Fodor | |
| 2,276,559 A | 3/1942 | Bashore | |
| 2,298,313 A | 10/1942 | Ross | |
| 2,386,129 A | 10/1945 | Maack | |
| 2,396,512 A | 3/1946 | Johnson | |
| 2,620,029 A | 12/1948 | Turechek et al. | |
| 2,489,475 A | 11/1949 | Blind | |
| 2,573,920 A | 11/1951 | McLeod | |
| 2,700,141 A | 1/1955 | Jones | |
| 2,721,891 A | 10/1955 | Kersten | |
| 2,858,518 A | 10/1958 | Chrystie et al. | |
| 2,903,667 A | 9/1959 | Buquor | |
| 2,915,580 A | 12/1959 | Gill et al. | |
| 3,158,420 A | 11/1964 | Olson et al. | |
| 3,200,320 A | 8/1965 | Mallory | |
| 3,248,089 A | 4/1966 | Barney | |
| 3,344,316 A | 9/1967 | Stelmak | |
| 3,363,214 A | 1/1968 | Wright | |
| 3,431,428 A | 3/1969 | Van Valer | |
| 3,474,381 A | 10/1969 | Baldwin | |
| 3,521,216 A | 7/1970 | Tolegian | |
| 3,598,900 A | 8/1971 | Drake | |
| 3,649,742 A | 3/1972 | Tissot | |
| 3,713,370 A | 1/1973 | Prijn | |
| 3,748,463 A | 7/1973 | Trassinelli | |
| 3,750,083 A | 7/1973 | Fayling | |
| 3,784,959 A | 1/1974 | Horton | |
| 3,786,391 A | 1/1974 | Mathauser | |
| 3,808,577 A | 4/1974 | Mathauser | |
| 3,810,258 A | 5/1974 | Mathauser | |
| 3,840,842 A | 10/1974 | Gabryelewicz | |
| 3,848,949 A | 11/1974 | Falkner | |
| 3,853,382 A | 12/1974 | Lazar | |
| 3,853,385 A | 12/1974 | Palazzetti et al. | |
| 3,868,160 A | 2/1975 | Kersman | |
| 4,023,882 A | 5/1977 | Pettersson | |
| 4,067,342 A | 1/1978 | Burton | |
| 4,173,035 A * | 10/1979 | Hoyt | F21S 10/00 361/749 |
| 4,402,151 A | 9/1983 | Medow | |
| 4,425,017 A | 1/1984 | Chan | |
| 4,451,113 A | 5/1984 | Zuniga | |
| 4,479,685 A | 10/1984 | Kirby | |
| 4,578,731 A | 3/1986 | Andriessen et al. | |
| 4,824,390 A | 4/1989 | Crane et al. | |
| 4,837,667 A * | 6/1989 | Grau | F21S 2/00 362/147 |
| 4,861,273 A | 8/1989 | Wenman et al. | |
| 4,871,315 A | 10/1989 | Noschese | |
| 4,874,316 A | 10/1989 | Kamon et al. | |
| 4,990,098 A | 2/1991 | Neidecker et al. | |
| 4,999,755 A * | 3/1991 | Lin | F21S 2/00 362/217.02 |
| 5,027,262 A | 6/1991 | Freed | |
| 5,049,081 A | 9/1991 | Ribitsch et al. | |
| 5,153,988 A | 10/1992 | Mattis et al. | |
| 5,158,360 A * | 10/1992 | Banke | F21S 8/068 362/391 |
| 5,248,261 A | 9/1993 | Conroy-Wass et al. | |
| 5,273,449 A | 12/1993 | Mattis et al. | |
| 5,310,355 A | 5/1994 | Dannatt | |
| 5,340,322 A | 8/1994 | Poulsen | |
| 5,348,485 A | 9/1994 | Briechle et al. | |
| 5,351,620 A * | 10/1994 | Becheau | F21V 21/34 104/106 |
| 5,401,175 A | 3/1995 | Guimond et al. | |
| 5,428,298 A | 6/1995 | Ko | |
| 5,584,576 A | 12/1996 | Wei Hong | |
| 5,797,759 A | 8/1998 | Mattis et al. | |
| 5,829,987 A | 11/1998 | Fritsch et al. | |
| 5,921,783 A | 7/1999 | Fritsch et al. | |
| 5,924,888 A | 7/1999 | Larkin | |
| 5,941,714 A | 8/1999 | Gorbet et al. | |
| 5,941,729 A | 8/1999 | Sri-Jayantha | |
| 5,967,823 A | 10/1999 | Tsui | |
| 6,015,081 A | 1/2000 | Okabayashi et al. | |
| 6,069,545 A | 5/2000 | Van Zeeland | |
| 6,129,559 A | 10/2000 | Hirata et al. | |
| 6,132,859 A | 10/2000 | Jolly | |
| 6,135,615 A | 10/2000 | Lee | |
| 6,170,967 B1 | 1/2001 | Usher et al. | |
| 6,176,739 B1 | 1/2001 | Denlinger et al. | |
| 6,213,783 B1 | 4/2001 | Kankkunen | |
| 6,305,071 B1 | 10/2001 | Van Zeeland | |
| 6,394,626 B1 | 5/2002 | McColloch | |
| 6,461,192 B1 | 10/2002 | Kwoka | |
| 6,464,509 B1 | 10/2002 | Emberty et al. | |
| 6,527,560 B2 | 3/2003 | Yang | |
| 6,540,372 B2 | 4/2003 | Joseph | |
| 6,541,720 B2 | 4/2003 | Ladstatter et al. | |
| 6,561,815 B1 | 5/2003 | Schmidt | |
| 6,565,363 B2 | 5/2003 | Downing | |
| 6,575,764 B1 | 6/2003 | Reipur | |
| 6,607,391 B2 | 8/2003 | Mendelson et al. | |
| 6,821,126 B2 | 11/2004 | Neidlein | |
| 6,966,781 B1 | 11/2005 | Bullinger et al. | |
| 6,988,897 B2 | 1/2006 | Belongia et al. | |
| 7,066,739 B2 | 6/2006 | McLeish | |
| 7,080,927 B2 | 7/2006 | Feuerborn et al. | |
| 7,092,257 B2 | 8/2006 | Westerheide | |
| 7,097,461 B2 | 8/2006 | Neidlein | |
| 7,128,597 B2 | 10/2006 | Niitsu et al. | |
| 7,137,727 B2 | 11/2006 | Joseph et al. | |
| 7,156,689 B2 | 1/2007 | Fabian et al. | |
| 7,252,512 B2 | 8/2007 | Tai et al. | |
| 7,264,479 B1 | 9/2007 | Lee | |
| 7,311,526 B2 | 12/2007 | Rohrbach et al. | |
| 7,322,873 B2 | 1/2008 | Rosen et al. | |
| 7,329,128 B1 | 2/2008 | Awad | |
| 7,331,793 B2 | 2/2008 | Hernandez et al. | |
| 7,341,458 B1 | 3/2008 | Koh | |
| 7,344,380 B2 | 3/2008 | Neidlein et al. | |
| 7,351,066 B2 | 4/2008 | DiFonzo et al. | |
| 7,364,433 B2 | 4/2008 | Neidlein | |
| 7,378,834 B2 | 5/2008 | Hofmeister et al. | |
| 7,467,948 B2 | 12/2008 | Lindberg et al. | |
| 7,517,222 B2 | 4/2009 | Rohrbach et al. | |
| 7,520,762 B2 | 4/2009 | Lehman et al. | |

(56) References Cited

U.S. PATENT DOCUMENTS

| | | | |
|---|---|---|---|
| 7,541,907 B2 | 6/2009 | Wang et al. |
| 7,585,175 B2 | 9/2009 | Sinclair et al. |
| 7,627,343 B2 | 12/2009 | Fadell et al. |
| 7,637,746 B2 | 12/2009 | Lindberg et al. |
| 7,654,834 B1 | 2/2010 | Mier-Langner et al. |
| 7,661,229 B2 | 2/2010 | Frecska et al. |
| 7,665,883 B2 | 2/2010 | Matheson |
| 7,677,914 B2 | 3/2010 | Nall et al. |
| 7,687,288 B2 | 3/2010 | Saha et al. |
| 7,688,580 B2 | 3/2010 | Richardson et al. |
| 7,692,100 B2 | 4/2010 | Boisclair |
| 7,712,926 B2 | 5/2010 | Matheson |
| 7,722,358 B2 | 5/2010 | Chatterjee et al. |
| 7,726,841 B2 | 6/2010 | Chien |
| 7,726,974 B2 | 6/2010 | Shah et al. |
| 7,758,358 B1 | 7/2010 | Mier-Langner et al. |
| 7,762,817 B2 | 7/2010 | Ligtenberg et al. |
| 7,762,821 B2 | 7/2010 | Patterson et al. |
| 7,771,202 B2 | 8/2010 | Amotz et al. |
| 7,775,801 B2 | 8/2010 | Shiff et al. |
| 7,803,004 B2 | 9/2010 | Remes et al. |
| 7,806,557 B2 | 10/2010 | Liu et al. |
| 7,806,569 B2 | 10/2010 | Sanroma et al. |
| 7,824,185 B2 | 11/2010 | Chien |
| 7,834,729 B2 | 11/2010 | Fullerton et al. |
| 7,846,002 B1 | 12/2010 | Mikesell et al. |
| 7,874,844 B1 | 1/2011 | Fitts |
| 7,928,602 B2 | 4/2011 | Heidmann |
| 7,982,436 B2 | 7/2011 | Randall |
| 8,087,939 B2 | 1/2012 | Rohrbach et al. |
| 8,128,427 B2 | 3/2012 | Mochizuki |
| 8,184,445 B2 | 5/2012 | Jacobs et al. |
| 8,187,006 B2 | 5/2012 | Rudisill et al. |
| 8,344,642 B2 * | 1/2013 | Noll | F21V 21/35 |
| | | | 315/178 |
| 8,491,312 B2 | 7/2013 | Rudisill et al. |
| 8,602,612 B2 | 12/2013 | Stathis et al. |
| 8,608,502 B2 | 12/2013 | Witter et al. |
| 8,628,212 B2 | 1/2014 | Klus |
| 8,680,774 B2 * | 3/2014 | Van Hoof | F21V 21/35 |
| | | | 315/209 R |
| 8,827,511 B2 | 9/2014 | Chien |
| 8,864,347 B2 | 10/2014 | Pearson et al. |
| 8,922,121 B2 | 12/2014 | Willemsen et al. |
| 9,039,230 B2 | 5/2015 | Crimi et al. |
| 9,062,841 B2 | 6/2015 | Tran et al. |
| 9,130,138 B2 | 9/2015 | Marutani et al. |
| 9,225,131 B2 | 12/2015 | Ernest et al. |
| 9,300,081 B2 | 3/2016 | Rudisill et al. |
| 9,303,854 B2 * | 4/2016 | Rudisill | F21V 21/14 |
| 9,413,102 B1 | 8/2016 | Wright et al. |
| 9,458,995 B1 | 10/2016 | Pearson et al. |
| 9,484,643 B2 | 11/2016 | Schaefer et al. |
| 9,583,871 B1 | 2/2017 | Rudisill et al. |
| 9,599,324 B2 | 3/2017 | Diekmann et al. |
| 9,651,232 B1 | 5/2017 | Fletcher et al. |
| 9,714,746 B2 | 7/2017 | Tischler et al. |
| 9,912,100 B2 * | 3/2018 | Zantout | G06F 1/20 |
| 9,927,081 B2 * | 3/2018 | Bergman | H02G 3/20 |
| 10,132,452 B2 * | 11/2018 | Rudisill | F21S 2/005 |
| 2003/0031018 A1 | 2/2003 | Bray et al. |
| 2004/0209489 A1 | 10/2004 | Clapper |
| 2004/0224539 A1 | 11/2004 | Boyd et al. |
| 2005/0157506 A1 | 7/2005 | Chen |
| 2007/0093279 A1 | 4/2007 | Janik |
| 2007/0103824 A1 | 5/2007 | Patterson et al. |
| 2007/0254510 A1 | 11/2007 | DeBey |
| 2008/0038506 A1 | 2/2008 | Schumacher et al. |
| 2008/0139054 A1 | 6/2008 | Williamson et al. |
| 2008/0166005 A1 | 7/2008 | Terlizzi et al. |
| 2008/0166007 A1 | 7/2008 | Hankey et al. |
| 2008/0173462 A1 | 7/2008 | Whapham et al. |
| 2008/0175011 A1 | 7/2008 | Joseph |
| 2009/0034209 A1 | 2/2009 | Joo et al. |
| 2009/0201680 A1 | 8/2009 | Chang et al. |
| 2009/0251263 A1 | 10/2009 | Fullerton et al. |
| 2009/0251372 A1 | 10/2009 | Degner et al. |
| 2009/0284336 A1 | 11/2009 | Fullerton et al. |
| 2010/0164409 A1 | 7/2010 | Lo et al. |
| 2010/0254111 A1 | 10/2010 | Ligtenberg et al. |
| 2010/0261366 A1 | 10/2010 | Peiker |
| 2010/0271834 A1 | 10/2010 | Muessli |
| 2010/0320896 A1 | 12/2010 | Pet et al. |
| 2010/0327744 A1 | 12/2010 | Willemsen et al. |
| 2011/0092081 A1 | 4/2011 | Gao et al. |
| 2011/0121145 A1 | 5/2011 | Mihajlovic |
| 2011/0140136 A1 | 6/2011 | Daily et al. |
| 2011/0171837 A1 | 7/2011 | Hardisty et al. |
| 2011/0204392 A1 | 8/2011 | Weekamp et al. |
| 2011/0223776 A1 | 9/2011 | Ferber, Jr. |
| 2011/0308562 A1 | 12/2011 | Shufflebotham |
| 2012/0021618 A1 | 1/2012 | Schultz |
| 2012/0021619 A1 | 1/2012 | Bilbrey et al. |
| 2012/0023597 A1 | 1/2012 | Bilbrey et al. |
| 2012/0028480 A1 | 2/2012 | Bilbrey et al. |
| 2012/0032765 A1 | 2/2012 | Bilbrey et al. |
| 2012/0045918 A1 | 2/2012 | Litzler et al. |
| 2012/0069503 A1 | 3/2012 | Lauder et al. |
| 2012/0075857 A1 | 3/2012 | Verbrugh |
| 2012/0148195 A1 | 6/2012 | Umeno |
| 2012/0261164 A1 | 10/2012 | McKinnon |
| 2012/0287671 A1 | 11/2012 | Parker et al. |
| 2012/0300437 A1 | 11/2012 | Lu et al. |
| 2013/0005159 A1 | 1/2013 | Gao et al. |
| 2013/0044485 A1 | 2/2013 | Zaderej et al. |
| 2013/0044501 A1 | 2/2013 | Rudisill et al. |
| 2013/0210244 A1 | 8/2013 | DiFonzo et al. |
| 2013/0294081 A1 | 11/2013 | O'Connor et al. |
| 2013/0308324 A1 | 11/2013 | Zaderej et al. |
| 2014/0098557 A1 | 4/2014 | Veerasamy |
| 2014/0133137 A1 | 5/2014 | Kiss |
| 2014/0167501 A1 | 6/2014 | Marosi et al. |
| 2014/0268835 A1 | 9/2014 | Rudisill et al. |
| 2014/0293544 A1 | 10/2014 | Zaderej et al. |
| 2014/0340877 A1 | 11/2014 | Nelson |
| 2014/0362574 A1 | 12/2014 | Barrett |
| 2016/0018092 A1 | 1/2016 | Knaapen et al. |
| 2016/0025312 A1 | 1/2016 | Yu |
| 2016/0033099 A1 | 2/2016 | Bergman et al. |
| 2016/0290575 A1 | 10/2016 | Libon et al. |
| 2017/0016600 A1 | 1/2017 | Stevens |
| 2017/0030561 A1 | 2/2017 | Dix et al. |
| 2017/0198891 A1 | 7/2017 | Sonneman |

FOREIGN PATENT DOCUMENTS

| | | |
|---|---|---|
| DE | 3904708 C1 | 1/1990 |
| DE | 8904398 U1 | 8/1990 |
| DE | 8904398 U1 | 9/1990 |
| DE | 4107225 A1 | 10/1992 |
| DE | 19726930 C1 | 9/1998 |
| DE | 19849101 A1 | 4/1999 |
| DE | 10333403 A1 | 9/2004 |
| DE | 10355232 A1 | 6/2005 |
| DE | 102006002433 A1 | 7/2007 |
| DE | 202015000468 U1 | 4/2015 |
| EP | 0404979 B1 | 9/1996 |
| EP | 0734108 A2 | 9/1996 |
| EP | 1167867 A2 | 2/2002 |
| EP | 1733653 A2 | 12/2006 |
| EP | 2077416 A2 | 7/2009 |
| EP | 2330344 A2 | 6/2011 |
| FR | 2254930 A1 | 7/1975 |
| FR | 2613883 A1 | 10/1988 |
| FR | 2704362 A1 | 10/1994 |
| FR | 2849494 A1 | 7/2004 |
| FR | 2962878 A1 | 1/2012 |
| GB | 2233837 A | 1/1991 |
| GB | 2401672 A | 11/2004 |
| JP | 05135833 A | 6/1993 |
| JP | 2004533328 A | 9/2004 |
| JP | 2006095040 A | 4/2006 |
| JP | 2008236073 A | 10/2008 |
| WO | 9105378 A1 | 4/1991 |

(56) References Cited

FOREIGN PATENT DOCUMENTS

| WO | 9705673 | A1 | 2/1997 |
| WO | 2002089222 | A1 | 11/2002 |
| WO | 03090321 | A1 | 10/2003 |
| WO | 2009043561 | A2 | 4/2009 |

* cited by examiner

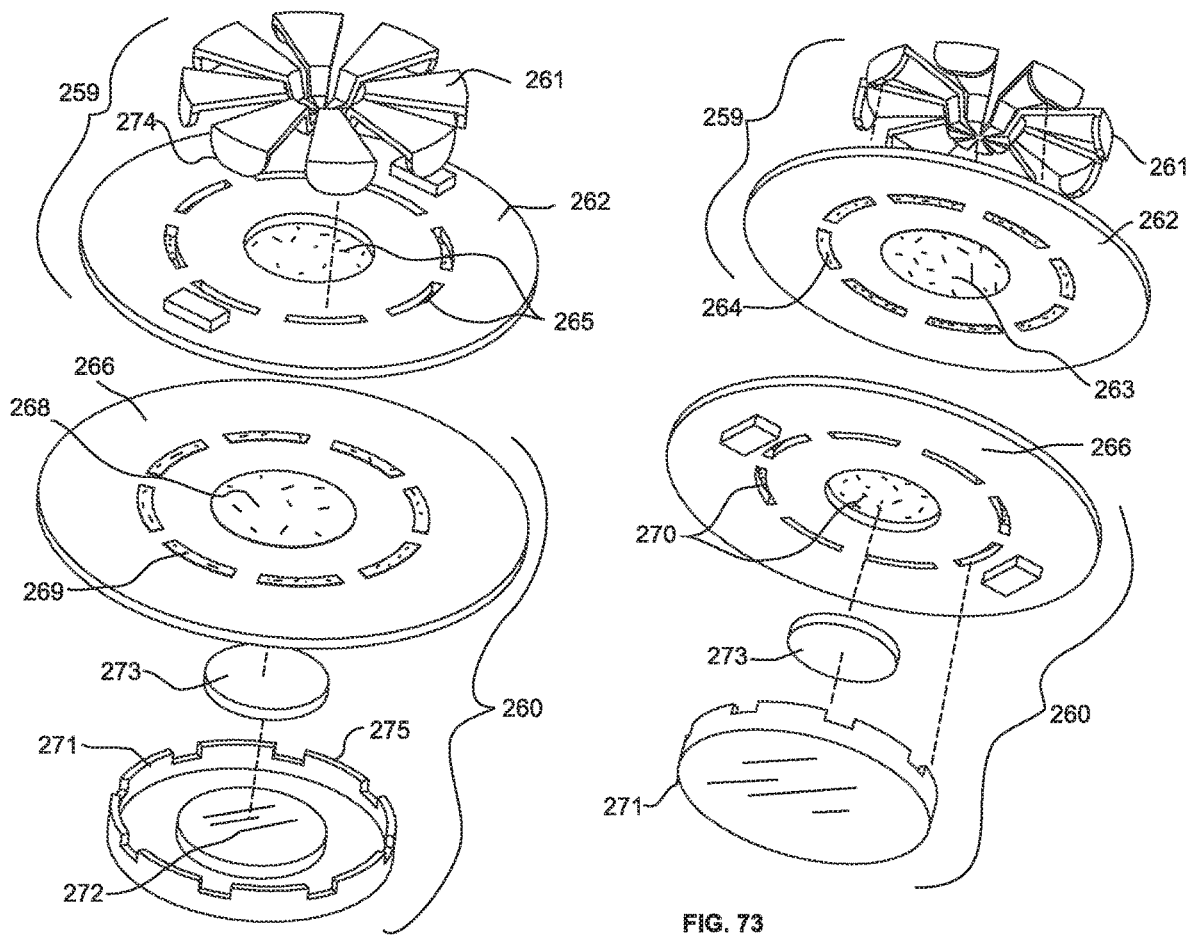
FIG. 72
FIG. 73
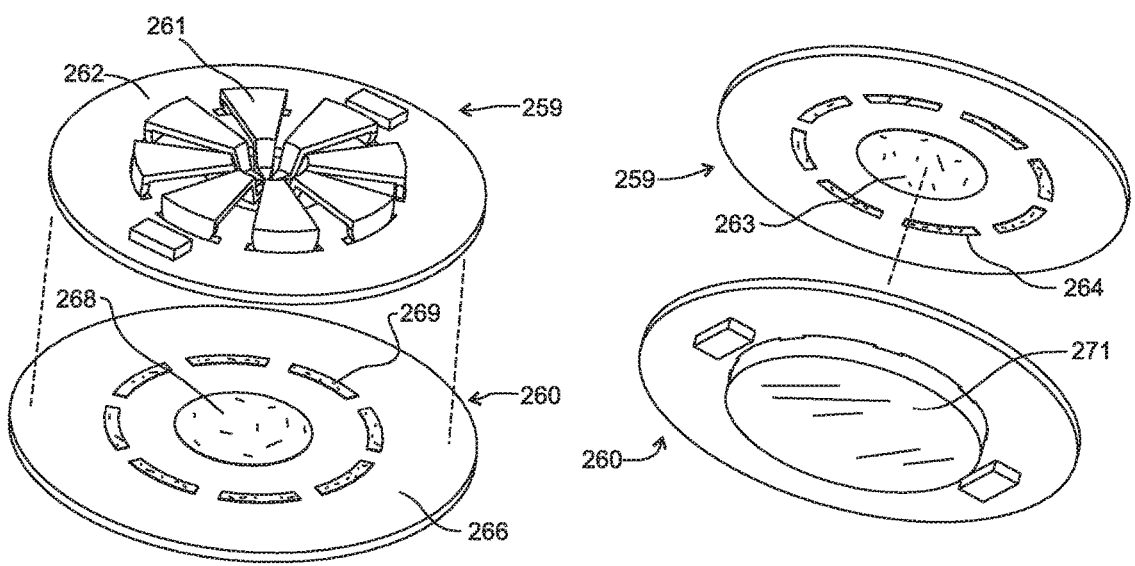
FIG. 74
FIG. 75

LINEAR ELECTRODE SYSTEMS FOR MODULE ATTACHMENT WITH NON-UNIFORM AXIAL SPACING

CROSS-REFERENCE TO RELATED APPLICATIONS

This disclosure claims priority as a continuation-in-part of pending U.S. patent application Ser. No. 15/213,115, filed on Jul. 18, 2016, which is a continuation-in-part of U.S. application Ser. No. 15/010,605, filed on Jan. 29, 2016, now U.S. Pat. No. 9,583,871, which is a continuation of U.S. patent application Ser. No. 13/910,132, filed on Jun. 5, 2013, now U.S. Pat. No. 9,300,081. This disclosure claims priority of U.S. provisional patent application No. 61/786,037, filed on Mar. 14, 2013, and U.S. provisional patent application No. 62/193,073, filed on Jul. 16, 2015 and U.S. provisional patent application No. 62/569,370, filed on Oct. 6, 2017. All of the above non-provisional and provisional applications are incorporated herein by reference in their entirety.

COPYRIGHT NOTICE

A portion of the disclosure of this patent application contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Many varieties of track lighting or rail electrode systems exist. These generally include various designs of spatially separated electrodes that are located parallel to the linear axis of the track. For lighting applications, common "track" or "monorail" systems generally have at least two continuous parallel electrodes within a mechanical housing, forming a substantially rectangular, prismatic or concentric cross-section with continuous electrode contact surfaces along the length of the track. For the purposes of this disclosure, these electrode systems are considered to have uniform spacing with respect to the axis at different locations along the axis, or "uniform axial spacing". Flexible parallel cable pairs held under tension in free space or embedded in a ribbon cable are other types of laterally-displaced rail electrodes with uniform axial spacing.

Although the radial separation distances between the track axis and the surface of concentric electrodes are different from one another, the distances from the track axis to each electrode is substantially uniform at different locations along the axis. This is also considered to have uniform axial spacing.

Co-owned U.S. Pat. No. 9,303,854 entitled "Electrical Rail Systems with Axially Interleaved Contact Arrays" issued on Apr. 5, 2016 and is incorporated by reference in its entirety herein. Pairs of electrodes in some embodiments of the referenced patent have fixture contact surfaces that wrap around a central electrode system axis such that the spacing of the electrode contact surfaces are at a uniform spacing from the central axis of the pair regardless of whether the electrodes are of a circumferential contact band form or the helical form. Fixtures attached to these axially-interleaved contact array systems may be rotated around the axis of the electrode system, but the distance to each of the fixture contacts from the axis does not change with this rotation. The coaxial and axially interleaved track systems provide additional pointing capability compared to linear rail systems as a result of adding this rotation to the linear translation of parallel electrode systems.

While track lighting systems may provide more flexibility than stationary lighting fixtures, they do not meet all the needs for easily reconfiguring the lighting distribution in a space. Some prior art rail systems are designed to be customized through bending during installation but are typically difficult to bend in all directions because of their generally rectangular cross section or other asymmetric cross-sectional structure. Also, to aim the light output of a lighting fixture attached to prior art electrode systems, additional mechanical knuckle joints, gimbals, movable optical elements or other means are often required to direct light along different directions. These elements may increase the weight, size, cost and complexity of the fixtures and may still limit the ease of pointing fixtures where desired. In addition, if parallel electrodes are not mounted continuously to a supporting substrate, some form of mechanical tensioning system or mechanical spacer is generally needed to hold the electrodes in the proper position relative to each other and the rail axis. This spacing maintenance may result from a continuous spacer preventing relative movement of electrodes or a series of discrete spacer elements that periodically attach between electrodes. Periodic spacers holding electrodes in space are generally restricted to simple systems for supplying a voltage to two fixture contacts to simply supplying power to an attached fixture. The present disclosure includes systems and methods that address one or more of these issues in the prior art.

BRIEF SUMMARY OF THE INVENTION

Electrode pairs are commonly used to provide placement flexibility of lighting fixtures, sensors or other electrical consuming devices along an axial direction of a linear rail or track. Common configurations of track light systems include electrodes which are parallel to one another and held in place with one or more insulating spacer members. For example, U.S. Pat. No. 5,695,279 describes coaxial insulated electrodes; U.S. Pat. No. 6,244,733 describes flat ribbon electrodes on opposite sides of a flat insulating base; and FIG. 7 of co-owned U.S. Pat. No. 8,651,711 illustrates free-space parallel rail electrodes with periodic insulating spacers. When these rails are bent gradually to modify the axial direction, the fixture contacts interface with the electrodes along a path which follows the rail curvature. That is, the connection path of the fixture with the electrode is locally parallel to the axis of the rail as the fixture is moved along the rail system.

This disclosure includes electrode configurations in which a change in the orientation of module attachment to electrodes in a rail system assembly at different locations is possible. This orientation change may result from a rotation of the module contacts with movement down the rail assembly axis, for example, for electrodes that include non-uniform axial spacing. For a light fixture having an asymmetric directional output that is attached to a track rail with a pair of electrical contacts, a variable spacing of electrodes provides some module rotational capability at different axial positions along the rail system. The separation distance between electrode contacts in some embodiments may be chosen to be greater than or less than the average distance between electrodes in a direction perpendicular to the rail system axis to alter attachment orientation options.

This disclosure also includes embodiments with electrodes which overlap at least periodically to provide self-supporting electrode systems without additional lateral spacer elements and to simplify mechanical and electrical attachment of individual electrodes into extended configurations. If desired, substantially planar electrode configurations can be maintained between overlap nodes. Other embodiments include electrode systems that include localized bendable extensions to orient fixtures without the complex mechanical joints used in prior art track systems such as FIG. 4 of U.S. Pat. No. 7,758,358 and citations therein. As a result, environmental sealing of the module may be simplified.

This application incorporates by reference in its entirety pending U.S. patent application Ser. No. 15/213,115 filed Jul. 18, 2016 entitled "Suspended track and planar electrode systems and methods". That patent application discloses various insulating spacers for maintaining round rod and flat strip electrodes in position relative to one another, modules with integral heat sinks, modules with thermal conduction to a heat sink member in the rail, modules with insulation displacement ("IDC") electrical connection capability, modules with mechanical attachment to rails, modules with magnetic attachment to rails, modules with twist on attachment to electrodes, planar arrays of electrodes and other apparatuses and methods that can be used in different combinations with the currently disclosed inventive concepts. It also discloses substantially planar, shaped electrodes that are laminated together in a linear track with voids that expose both electrodes from both planar sides of the assembly. That patent application also includes embodiments in which strip electrode systems are alternately folded through positive and negative angles to the axis which provide different pointing directions for lighting modules at different locations along the length of the electrode system axis. Although not described in detail, this method of forming gyrating tracks specifically is considered to be part of this disclosure.

These IDC connections include sharp structures in the form of one or more "spikes" that are pressed through insulation to make contact to flat surfaces. For the purposes of this disclosure, a "spike" is defined as an electrically conductive pointed structure that projects locally from a supporting surface. Spikes are capable of piercing electrically insulating materials to establish electrical continuity at with an electrode surface when a force is applied substantially perpendicular to the electrode surface. A spike may have multiple sharp projections at its point.

For purposes of this disclosure, a "twist-on" element is an element that uses rotation about any axis in order to make a mechanical engagement with at least one electrode. The mechanical engagement may include an interference fit which restricts relative movement or a loose coupling that allows relative movement in at least one direction after coupling. Loose and/or tight coupling may be incorporated in the various embodiments by reducing clearance dimensions between slot features and electrode outer diameters or incorporating protrusions or channels that cause electrodes to deviate from straight paths through the element after twisting. Twist on modules for IDC electrodes may include insulation slicing elements that slide along a surface of an electrode.

Lighting modules for use with the electrode systems may include the magnetic fixtures described in co-owned U.S. Pat. No. 8,651,711 and continuation U.S. Pat. No. 9,709,258, which are hereby incorporated by reference in their entirety herein.

For convenience, the current disclosure will generally describe the use of magnetic attachment of modules to flat electrodes using the referenced IDC features. This is not meant to limit the disclosure of variations of other combinations or in any way teach away from or prevent the use of mechanical attachment in a similar embodiment, non-IDC connections, other electrode shapes or other combinations that one skilled in the art of module attachment to electrode rails or planar systems would understand. In addition, although the embodiments describe lighting modules mechanically and electrically connected to the electrode systems, it is understood that other electrical energy consuming modules may also be employed such as directional and non-directional microphones, cameras, sensors, wireless communication transceivers, power supplies, etc. Modules that do not consume appreciable energy because they only provide passive electrical connection as a jumper cable between one electrode system and another electrode system or an electrical device that is not rail mounted may also benefit from inventive concepts disclosed and should be understood to be part of this disclosure. In addition, the use of the inventive concepts may also be used with modules that supply electrical energy to the electrode systems such as solar cells.

Electrode embodiments are described as "cables" or "rods" or "wires" or "rails" or "strips". For the purposes of this disclosure, in most cases these terms are used interchangeably; exceptions that depend upon electrode cross-section or flexibility can be determined from context. The fundamental characteristic of all of these is that they are locally linear; that is, they have one dimension that is significantly longer compared to the other two dimensions. That is, a locally linear rail does not have to be straight. This long or "longitudinal" dimension defines the primary axis of the electrode, but the cross-section of electrodes (taken perpendicular to the longitudinal axis) is not required to have an axially symmetric shape or any mirror symmetry about the electrode axis unless specifically restricted in the detailed description. Cables, rods and wires generally have comparable dimensions in a cross-section perpendicular to their axis, while strips have more pronounced cross-sectional differences. If not specified, the term "axis" means longitudinal axis. For "strip" electrodes, the second largest dimension, i.e., the width, will for the purposes of this disclosure determine the "surface" or "face" of the strip to which electrical attachment is made; the smallest dimension, or thickness, will determine the edge of the strip. The electrode cross-section may vary along the axis. While cables may be composed of individual wire strands that provide mechanical flexibility, cables can also be solid structures that are relatively stiff. Mechanical applications are considered to be within the scope of this disclosure.

Embodiments of electrode systems are disclosed that are suspended in space or built on the surface of a planar surface as linear tracks or incorporated into a portion of a wall, ceiling or other surface element. The term "planar array" of electrodes for the purposes of this disclosure refers to two or more electrodes that are mounted to a planar surface or suspended in space. Planar arrays are not required to consist of parallel electrodes. An assembly of interleaved or stacked electrodes will be considered to form a planar array over the area in which the combined thickness is on the order of a few electrode thicknesses.

The electrode systems may be at least partially covered by an insulating layer or coating for environmental protection and/or to prevent inadvertent touching of an energized electrode. The electrodes are combined with modules to create a system in which electrical and mechanical contact between the electrodes and the module is used to transfer electrical power and/or data between the electrode and the module. Typically, the module will receive electrical power or data from the electrodes, but for the purposes of this disclosure, the module may provide electrical power or data to the electrodes. The terms "module", "puck" and "fixture" are used interchangeably to denote any of the electrical elements that are connected to electrodes through the elements and methods described.

For this disclosure, if two quantities are "substantially equal" or "about the same", this means that the difference between them is numerically about 10% or less. In a qualitative sense, "substantially equal" parts should be considered to be interchangeable with one another without altering the pre-determined limits of functionality of the system as designed, that is, that they are within pre-determined system tolerances. For this disclosure, "substantially equal relative position" means that the difference in distance is no more than about 10%. In this disclosure, two dimensions are of a "comparable order of magnitude" if the ratio of the longer dimension to the smaller dimension is less than about 10.

For the purposes of this disclosure, a "line electrode" is an electrode having a shape that can be drawn in a single pass with a marker pen having a circular tip of the desired width in a motion that is principally along the longitudinal direction without overlapping traces. The width of a line electrode is substantially constant. That is, the general shapes of opposing edges are about the same and in-phase. The "local centerline of a line electrode" should be interpreted as the imaginary line that is equidistant from the edges of the electrode at the location of interest. The "path" of a line electrode follows the local centerline in the same manner that the course of a roadway follows the centerline of the roadway.

For a straight ribbon electrode, the local centerline is the same as the longitudinal axis of the straight ribbon electrode due to the axial mirror symmetry. The distance between edges is constant and is the width of the straight ribbon. A planar electrode system comprising two straight ribbon electrodes with their longitudinal axes parallel is an electrode system with "uniform axial spacing" since the distance between local centerlines of the electrodes is constant and is typically equal to the nominal distance between contact centers of a module designed for attachment to this parallel electrode system.

For a sinusoidal line electrode, the local centerline of the electrode is a sinusoid equidistant from the lateral edges across the width of the sinusoid. Like the straight ribbon line electrode discussion above, the local centerline provides the nominal path for electrical connection to a face of the sinusoidal line electrode. The sinusoidal line electrode has a longitudinal axis that is centered between the periodic extrema of the sinusoid. Since the sinusoid does not have mirror symmetry along its axis, the local centerline of a sinusoidal line electrode is not equivalent to the longitudinal axis of the sinusoidal line electrode. A planar electrode system comprising two identical sinusoidal line electrodes having their longitudinal axes parallel to each other and in-phase with each other will be characterized as having uniform axial spacing. In this in-phase case, their local centerlines will be separated by a fixed distance along the longitudinal axis of the electrode system. As a result, this is an example of an electrode system with uniform axial spacing. If they are shifted to an out-of-phase relationship, the distance between their centerlines will vary along the longitudinal direction and they will exhibit non-uniform axial spacing. If the longitudinal axes of the sinusoids overlap and they are exactly out-of-phase, then although the electrode system has mirror symmetry, it has non-uniform axial electrode spacing.

Some embodiments disclosed below include electrode shapes that are not line electrodes. U.S. patent application Ser. No. 15/213,115 shows strip electrodes in FIGS. 73-75 that have mirror symmetry about the longitudinal axis but include protrusions or voids comprising edges that are not in-phase like the edges of a line electrode. As a result, these electrodes do not have a "local centerline" or a nominal path in the longitudinal direction. The distance between edges along the longitudinal axis of these types of electrodes is non-uniform. The range of electrical connection locations to an isolated electrode is determined by the varying width of the electrode between its edges. When two of these electrodes are combined into an electrode system this non-uniformity in axial spacing to the edges will generally be maintained. Embodiments disclosed herein include other forms of electrodes that are not line electrodes, including electrodes that lack symmetry or periodicity. In an embodiment, electrodes are held in a locally parallel orientation separated by periodic electrode tabs that may also be used for module attachment.

In an embodiment, the electrodes are interleaved at adjacent overlapping regions. In an embodiment, electrodes are mounted to a planar building surface. In an embodiment, extended three-dimensional electrode systems are fabricated by joining subsystems together that have angled or pivoting connections.

Other terms in the specification and claims of this application should be interpreted using generally accepted, common meanings qualified by any contextual language where they are used. The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "about" and "essentially" mean±10 percent. Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation. The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting. Other objects, features, embodiments and/or advantages of the invention will be apparent from the following specification taken in conjunction with the following drawings.

BRIEF DESCRIPTION OF THE DRAWINGS

FIG. 72 is a top exploded view of a 9-contact radial connector system with a cup magnet and a segmented ferromagnetic spring.

FIG. 73 is a top exploded view of a 9-contact radial connector system with a cup magnet and a segmented ferromagnetic spring.

FIG. 74 is a top view of a 9-contact radial connector system with a cup magnet and a segmented ferromagnetic spring.

FIG. 75 is a bottom view of a 9-contact radial connector system with a cup magnet and a segmented ferromagnetic spring.

DETAILED DESCRIPTION OF THE INVENTION

Figure 1:
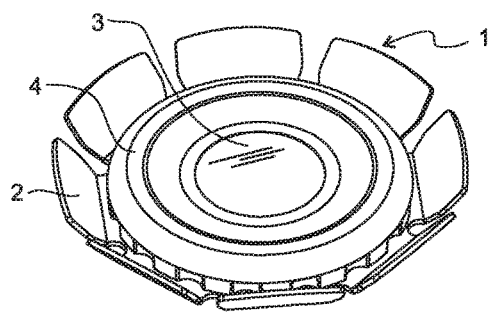
FIG. 1 is a top isometric view of a magnetic lighting module with integral heat sink substrate.
Figure 2:
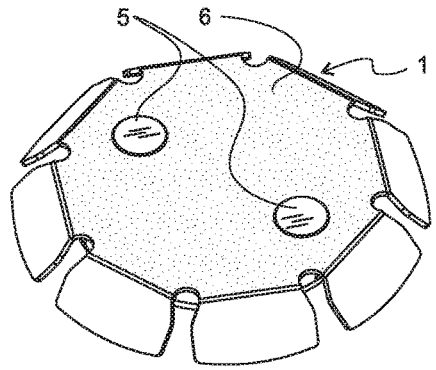
FIG. 2 is a bottom isometric view of the magnetic lighting module with integral heat sink substrate.

FIGS. 1 and 2 show top and bottom perspective views of a magnetically attached lighting module 1 with integral heat sink substrate 2. The module 1 in this disclosure comprises similar elements and construction of IDC module 42 contained in FIGS. 25-28 of U.S. patent application Ser. No. 15/213,115 and module 40 of FIGS. 14-17 of U.S. Pat. No. 8,651,711. As a result, the discussion here will focus on differences from the referenced disclosures. In FIG. 2 the IDC plate 18 and insulating cover layer 19 included in FIG. 3 have been removed to show the electrical contact pads 5 on the bottom side of flexible substrate circuit 7. A module without the IDC plate may be directly attached to electrodes that are not covered with an insulating layer at the attachment position since contact pads 5 may be in direct contact with the electrically conducting surface of the electrodes. Including the IDC plate 18 in a module allows it to be used with electrodes that are covered with an insulating layer at the point of attachment. Since the need for IDC capability is determined by this characteristic of the electrode at the desired connection point, one of ordinary skill in the art would understand by context in the disclosure that follows whether IDC capability is required for electrical continuity in a particular application. Parent application Ser. No. 15/213,113 describes alternate sealing methods for module to electrode electrical connections that may be used with embodiments herein, such as perimeter gasket illustrated in FIGS. 33-34 therein.

Figure 3:
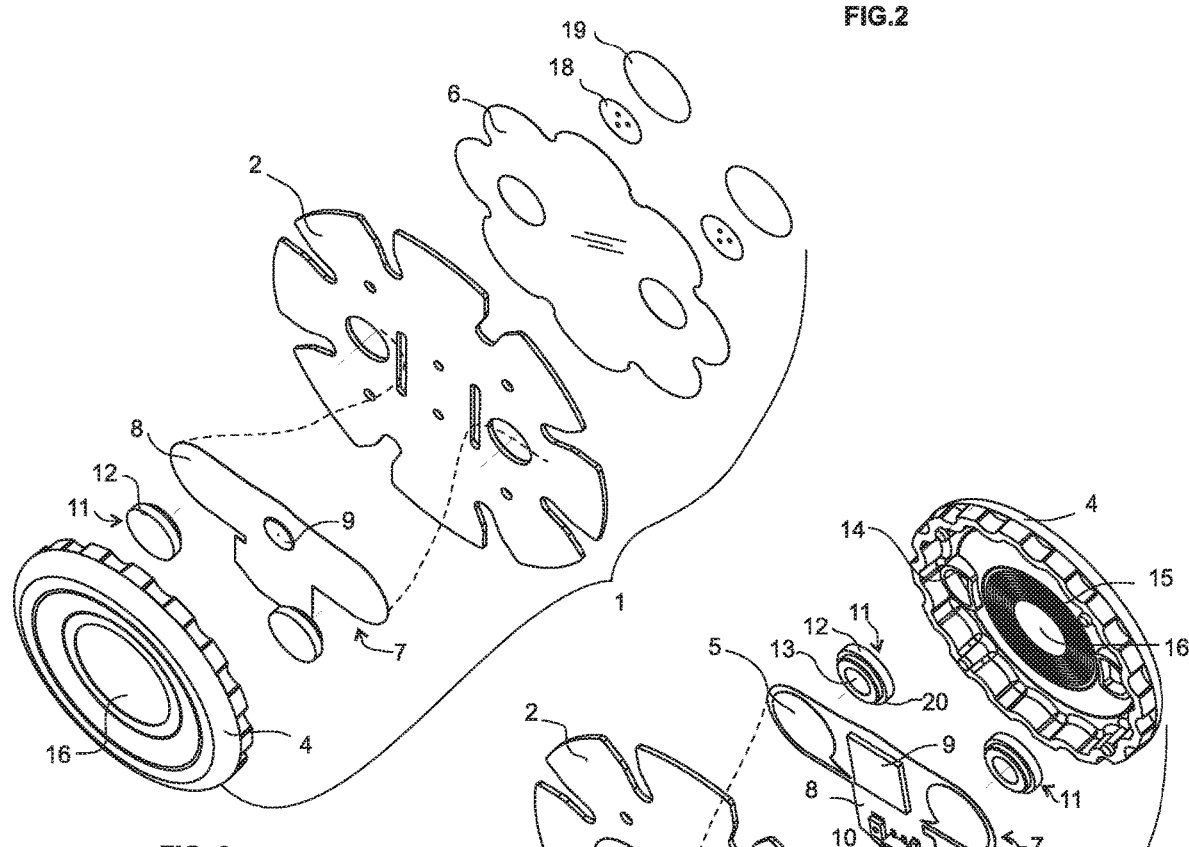
FIG. 3 is a top exploded view of the magnetic lighting module with integral heat sink substrate.
Figure 4:
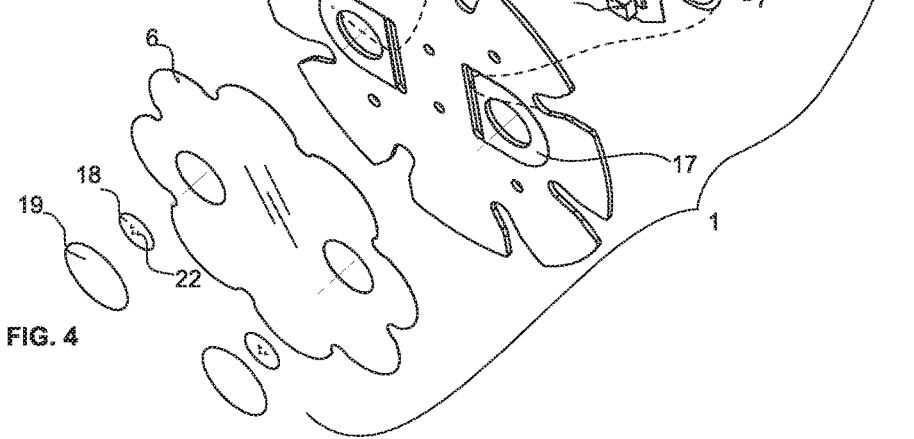
FIG. 4 is a bottom exploded view of the magnetic lighting module with integral heat sink substrate.

The exploded views in FIGS. 3 and 4 include a substrate 2 of module 1 that supports a flexible circuit assembly 7 that comprises an LED 9 mounted on flexible electronic substrate 8. This flexible circuit 7 may be attached to the substrate with pressure sensitive adhesive 17 applied to the bottom of the substrate 2 after passing through slots to orient contact pads 5 with circular openings for magnet assemblies 11. Substrate 2 may be made from 0.040" aluminum sheet for heat sinking. The substrate of the LED 9 is preferably attached directly to module substrate 2 with thermal conduction adhesive. Magnet assembly 11 differs from the magnet assembly of module 42 contained in FIGS. 25-28 of U.S. patent application Ser. No. 15/213,115 which had a ferromagnetic element 45 adjacent to each pole of a magnet 46 oriented with its magnetic axis parallel to the substrate. Magnet assembly 11 comprises a disc permanent magnet 13 and a ferromagnetic cup 12 in contact with one pole of the disc magnet. The magnetic axis of the disc magnet is oriented perpendicular to the substrate along the axis of the cup. This magnet assembly provides similar functionality to the previously disclosed assembly but may be more compact and have fewer parts. The geometry of the cup walls relative to the magnet geometry may be used to tailor the magnetic reach and magnetic attractive force of the assembly. Insulating film 6 which may comprise a pressure sensitive adhesive may be used to assist in fixing the edges of the contact pad portion of the flexible circuit to the module bottom and/or to seal the bottom of the module from moisture or other contaminants. The insulating film 6 may be designed to provide electrical isolation of a substrate 2 with an electrically conducting surface with electrode rails that do not include an electrically insulating layer. Optional IDC plate 18 with spikes 22 may be fixed to the module bottom over the contact pads 5 with IDC insulator cover 19 which may include a pressure sensitive adhesive layer. Module housing 4 may include reflective and/or refractive optical features 15 and/or an optical lens or window 16 that modify the direction, distribution or spectral content of the emitted light. Magnet confining features 14 may be included in the housing to limit movement of the magnet assembly 11 inside the housing as described in the referenced disclosures. The ferromagnetic cup 12 may also include a shoulder 20 to limit movement of the magnet relative to the substrate 2. Module cover may be fixed to the substrate 2 with a continuous adhesive seal to prevent moisture or contamination ingress into the module. The module may be assembled with the substrate 2 flat as shown in FIGS. 5-7 and the fins on the periphery of the substrate may be folded upward after assembly as shown in FIGS. 1 and 2.

While this embodiment discloses a module with a substantially planar bottom surface, modules with heat sinks or electrical contacts projecting from the bottom may be used with some electrode systems disclosed herein. In addition, although the electrical connections 5 are on the opposite side of the module 1 than the emission side of the LED, the modules may be designed to have the electrical contacts on the emitting side of the module. Using a variation of the flexible magnetic interconnect ("FMI") shown above, the flex circuit can be designed to extend to the top of the housing with the flex circuit providing a wall of the magnet retention cavity. This alternative of having the module mounted on the back side of the electrode assembly allows the appearance of the electrode assembly to be maintained without the module obscuring the lines of the electrodes. For modules with integral heat sinks, larger heat sinks may also be more easily hidden. Alternately, auxiliary heat sink elements may be extended from the non-emitting side of the module without interfering with the electrodes. For commercial installations, mounting in this manner may be used to help prevent theft of modules by having the electrodes form a cage entrapping the modules. That is, mechanical interferences may be designed into the assembly requiring electrode disassembly or removal before modules can be removed.

Figures 5, 6, 7:
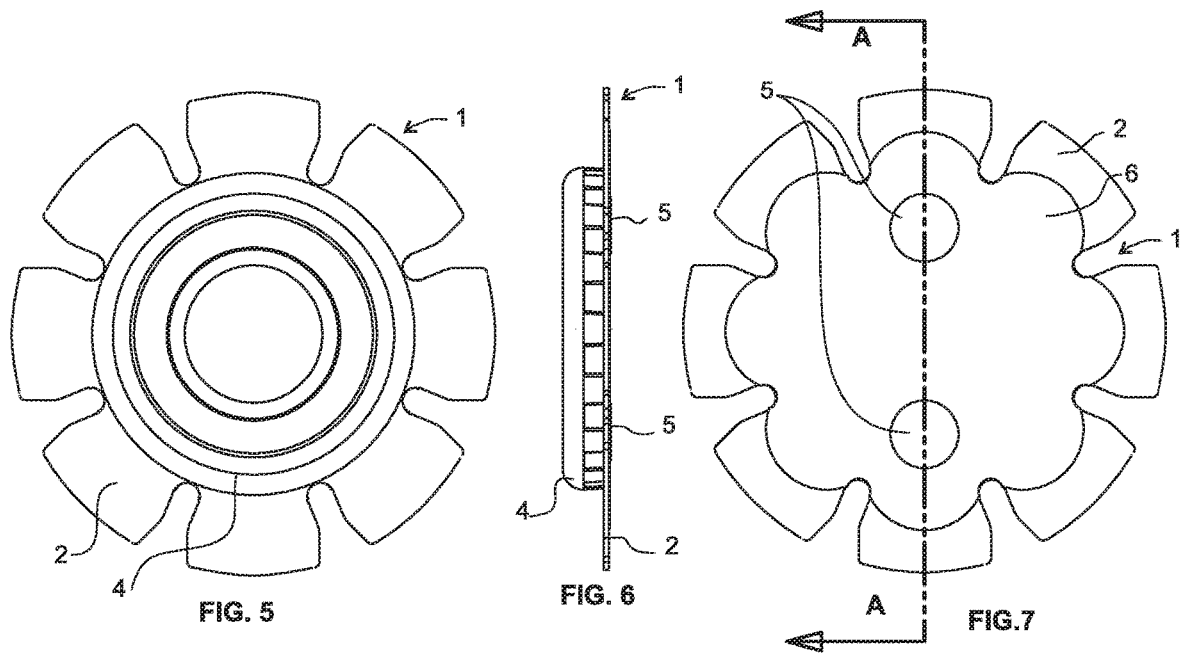
FIG. 5 is a top view of the magnetic lighting module with integral heat sink substrate.
FIG. 6 is a side view of the magnetic lighting module with integral heat sink substrate.
FIG. 7 is a bottom view of the magnetic lighting module with integral heat sink substrate.
Figure 8:
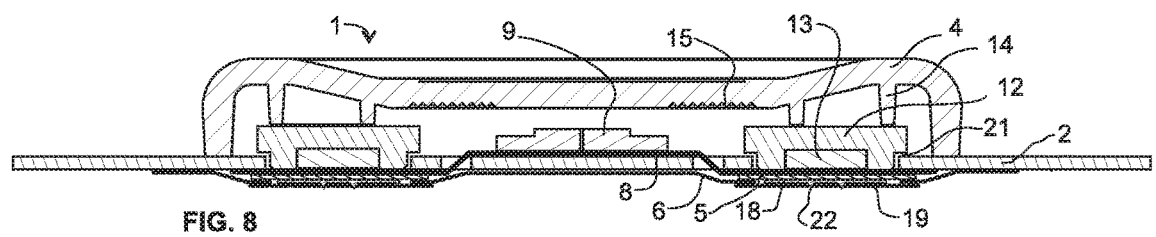
FIG. 8 is a cross-sectional view of the magnetic lighting module with integral heat sink substrate.
Figure 9:
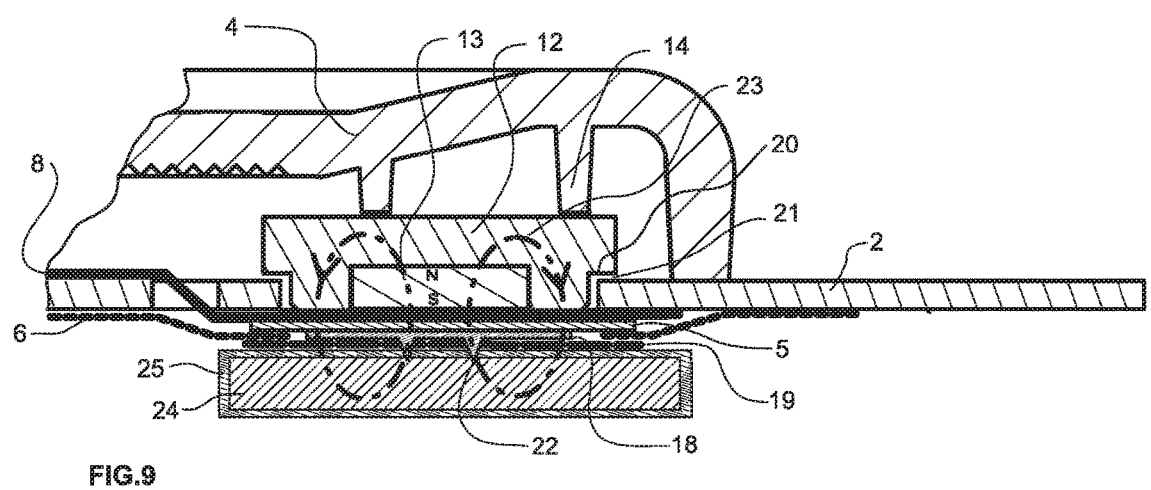
FIG. 9 is a partial cross-sectional view of the magnetic lighting module with integral heat sink substrate attached to a ferromagnetic electrode showing the magnetic flux path at the electrical contact.

FIG. 8 provides a cross-sectional view of a module taken through the center of the contacts as indicated in FIG. 7 with optional IDC capability added. FIG. 9 is an enlarged section showing the IDC module magnetically attached to ferromagnetic electrode 24 coated with insulating layer 25. Magnetic attraction forces spikes 22 through IDC insulator cover 19 and insulating layer 25 to provide an electrical path between electrode 24 to IDC plate to contact pad 5 of flex circuit assembly 7. The magnetic flux path 23 is substantially perpendicular to the electrode surface at the module electrical contact and forms a complete loop between a first pole of the magnet 13, through the ferromagnetic cup 12, through ferromagnetic electrode 24 to the second pole of the magnet. As in parent U.S. patent application Ser. No. 13/910,132, a ferromagnetic material may be used to direct and concentrate magnetic flux from a pole of a magnet in a direction perpendicular to the electrical contact interface to increase electrical contact forces. The disclosed magnetic geometry may be used with modules and electrode systems of this disclosure that do not use FMI but use direct electrical conduction through the ferromagnetic cup or magnet shown. From a comparison of the cross-section in FIG. 9 and FIGS. 44-46 of parent U.S. patent application Ser. No. 13/910,132, it is apparent that multiple electrical connections can be made with a single magnet using ferromagnetic direction whether the magnetic axis is parallel or perpendicular to the connection surface of the module. If the IDC plate 18 is made of a stainless steel with some ferromagnetic character, it will function similarly to the electrically conducting magnetic components 49 located between the interposer connector and the peripheral device in FIG. 26 of U.S. patent application Ser. No. 13/910,132. The IDC plate also functions in a similar manner to the rigid or semi-rigid contact structure 71 in FIG. 38 of U.S. patent application Ser. No. 13/910,132 that are attached to or located adjacent to the flexible components in a contact pair. As a result, the size and stiffness of the IDC plate and its mounting should be chosen to provide sufficient linear motion of the IDC plate out from the bottom of the module under magnetic force necessary to provide reliable electrical connections with environmental sealing. Note that if IDC connections are not required, the spikes on the plate can be eliminated. In this case an aperture in the insulator cover 19 with a peripheral seal holding the plate in position with the electrical contact of the module similar to the cross-section in FIGS. 33 and 34 of U.S. patent application Ser. No. 15/213,115 may be used to provide environmental sealing of the connection without electrical sealing of the module contact or electrode when unconnected. That is, the functionality would be equivalent to the environmental sealing provided with the flexible circuit feed through connector 62 in FIG. 25 of U.S. patent application Ser. No. 13/910,132. In this case, the double-sided flexible circuit at each module contact would be substituted with a smooth metal plate or metal foil positioned over and sealed around the periphery of an aperture in an insulating film.

FIG. 9 also shows how shoulder 20 and housing magnet confinement feature 14 may be designed to provide limits on movement of the magnet assembly relative to the bottom of the module. Housing feature 14 may be designed to allow mechanical force on the top of the housing to push IDC spikes 22 through the electrode insulating layer 25 during module attachment, while shoulder 20 limits the distance that the contact spikes can extend from the bottom of the module at gap 21 through magnetic attraction.

Figure 52:
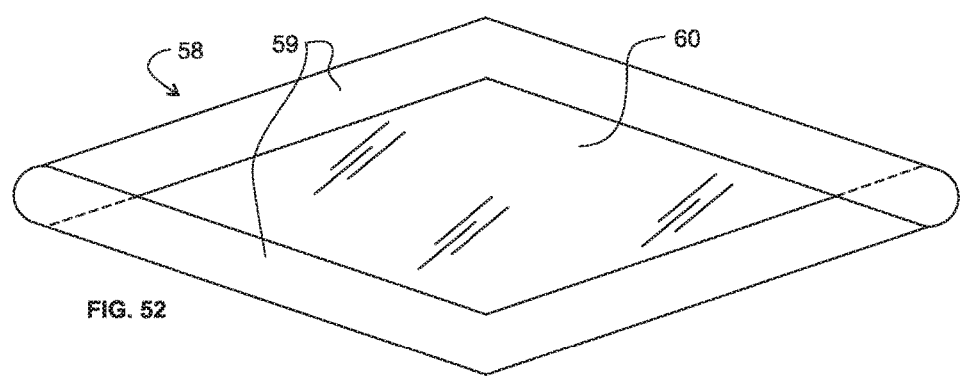
FIG. 52 is a top view of an embodiment of a thermal electrode system with a thermal heat sink spanning the opening between electrodes with non-uniform axial spacing.

While permanent magnets with ferromagnetic cups to create efficient magnetic flux paths have been described for module 1, other magnetic assemblies are possible with flexible magnetic interconnects in modules used with the electrode system embodiments of the current disclosure. Flexible magnetic interconnects are generally less sensitive to differences in alignment tolerances than rigidly mounted magnets. This capability may be useful in the electrode systems that will be described below in which one electrode may cross-over another electrode. The flexible magnetic interconnects and electrode system geometry may be designed to allow this offset in planarity even without requiring contacts of different heights as shown in FIG. 52 of U.S. Pat. No. 8,651,711. Although the loosely-constrained electrical connections of the FMI technology are preferred for the electrode systems disclosed herein, they are not required. Magnetic interconnect technologies that do not use flexible magnetic interconnects or mechanical interconnect approaches without magnetic attraction may also be used with the electrode concepts that are described in detail below. In addition, higher connection forces may be obtained by including electromagnets, for example, if the application design choices prioritize attachment force over weight and energy consumption. Electromagnets may be used to increase magnetic attachment forces to lock modules in position to help prevent their removal without tools when the electromagnets are receiving electrical power from the electrodes.

FIG. 73 of U.S. patent application Ser. No. 15/213,115 illustrates a strip electrode of the form of an axial ribbon with a series of discs centered on the strip electrode axis. For magnetic attachment, this electrode may comprise a single layer of ferromagnetic sheet stock. Two of these strip electrodes may be laminated together with an electrically insulating layer in between to form a track electrode assembly as shown in FIG. 74 of U.S. patent application Ser. No. 15/213,115. As disclosed there, electrode strips of the same shape can be laminated with an offset in the axial direction to allow connection to both electrodes from a single side of the track. In that figure, the strips are laminated so that the two series of discs are "out-of-phase" in the longitudinal direction so that the center of a disc on one strip is positioned in the center of the gap between adjacent discs of the other strip. The rail system assembly so formed provides a symmetrical self-supporting assembly with non-uniform axial spacing that may be used as a linear track to support lighting modules. Unlike the pairs of laterally spaced parallel ribbon strip electrodes shown in FIGS. 47, 50 and 57 of U.S. patent application Ser. No. 15/213,115, no separate insulating spacer is required to maintain the proper position between electrodes in the track of FIG. 74, but fixtures may still be attached to both the front and back planar surfaces of the rail. FIG. 74A shows an alternate embodiment in which one ribbon electrode with perforations is laminated to another of the same form to provide an alternative self-supporting linear track system with non-uniform axial spacing. Compared to the laterally spaced parallel ribbon line electrode tracks embodiments of U.S. patent application Ser. No. 15/213,115, these laminated tracks comprising non-ribbon shaped electrodes provide a wider range of possible module rotational attachment angles about an axis perpendicular to the plane of the rail system. For example, a lighting module designed for mounting across a laterally spaced parallel ribbon track system will have a module lateral contact separation no smaller than the gap between electrodes. Typically, the contact spacing will be equal to the distance between individual ribbon electrode axes. The nominal orientation for attachment along the rail has the module contacts oriented perpendicular, that is, at a 90-degree angle to the axis of the rail system. Module contact spacing is preferably equal to the distance between local centerlines of the electrodes. The width of each electrode is generally on the order of the size of the module contact designed to attach to it. For a magnetically attached module 1 like that shown in FIG. 1, the highest magnetic attractive force results when the electrode lies under all portions of the magnetic cup rim which is about the same size as the contact 5.

If the electrodes in a parallel electrode system are each the same width as a circular module contact, it is clear that the only orientation in which the contacts are positioned on the local centerlines of the electrodes to completely overlap the electrodes is exactly perpendicular to the longitudinal axis of the electrode system. As the electrode width increases slightly to allow for tolerances, the module can rotate slightly while maintaining this complete overlap as the position of the contacts deviate from the local centerlines of the electrodes. As this angle is increased by rotating the module further, the contacts will approach the inner edges of the electrodes adjacent to the gap between electrodes. However, this angular deviation from perpendicular in either direction is typically less than 30 degrees for spacings between electrodes that are more than twice the contact size. By comparison, the linear track assembly of FIGS. 74 and 74A of U.S. patent application Ser. No. 15/213,115 can provide a wider range of module rotational angles including having the line between contacts oriented parallel to the rail system axis. It should be clear that a module having two contacts separated by a distance slightly more than the radius of the circular opening with a first contact centered on the disc opening to touch the first electrode can pivot to any angle while the second contact remains touching the second electrode. The current disclosure includes other embodiments of non-uniform axial electrode spacing that are self-supporting electrode systems that also provide module rotational capability. When the module includes asymmetrical optical features 15 or lens 16, this module rotation flexibility provides additional pointing capability without bending the electrodes.

Figure 10:
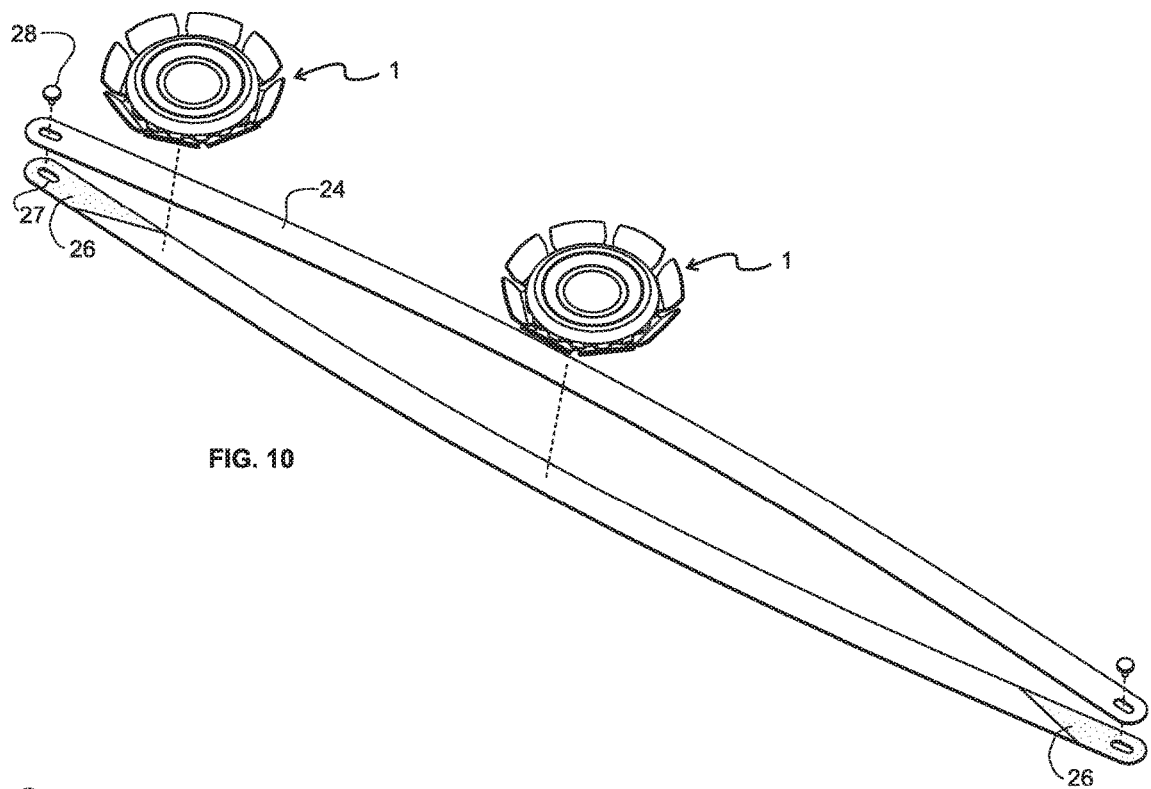
FIG. 10 is an exploded top view of two magnetic modules and a curved electrode system with non-uniform axial spacing.
Figure 11:
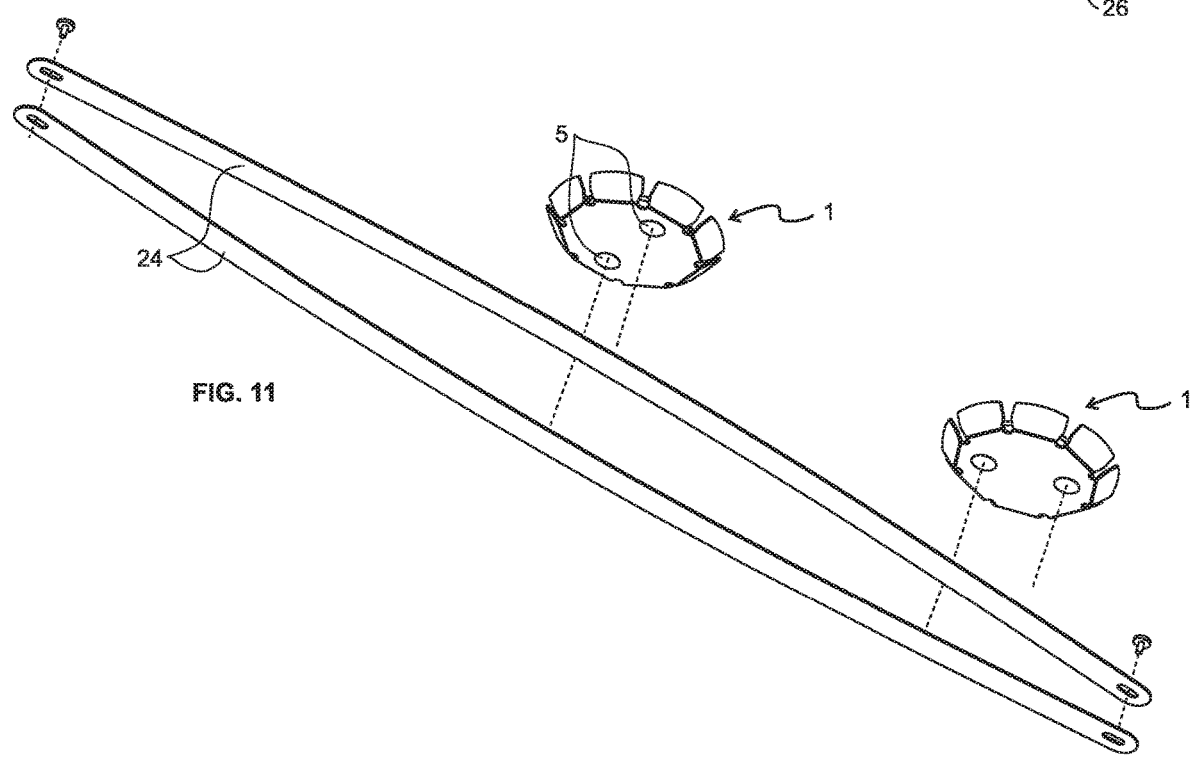
FIG. 11 is an exploded bottom view of two magnetic modules and a curved electrode system with non-uniform axial spacing.

FIGS. 10 and 11 show top and bottom views of two magnetic modules 1 and a pair of curved line electrodes 24 which are illustrated as one-half wavelength of a sine wave with a wavelength that is about an order of magnitude larger than the wave amplitude. For magnetic attachment, the electrodes are preferably made from sheet steel with an electrically conducting protective metal plating. Tin-plated, annealed low-carbon steel of thickness 0.020" to 0.040" has been determined to be a preferred sheet metal material for electrodes 24 for magnetic attachment. Electrodes may be made from ferromagnetic material with different cross-sections and shapes than shown. Optional holes 27 at the ends of the electrodes may be used to attach electrodes together using a mechanical fastener 28 such as a screw, rivet, or clinched fastener such as a "PEM" nut or other press-fit fastener which may be attached permanently to one or more of the electrode rail ends. Other attachment methods such as dispensed adhesives, adhesive films or magnets may also be used. Since the electrodes are overlapped at the ends, an insulating layer 26 of types known in the field of electrical insulation such as organic paints (electro-deposited, sprayed, dipped, coated), varnishes, laminated films, and pressure-sensitive adhesive films may be applied in the overlap portions to prevent electrical shorting. Of course, the mechanical fasteners will also need to be made of an electrically insulating material or provided with an insulating coating, insulating bushings and/or washers to keep the two electrodes electrically isolated from one another.

Figure 12:
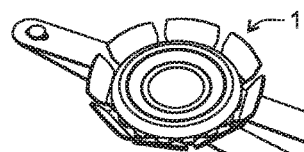
FIG. 12 is a top isometric view of two magnetic modules and a curved electrode system with non-uniform axial spacing.
Figure 13:
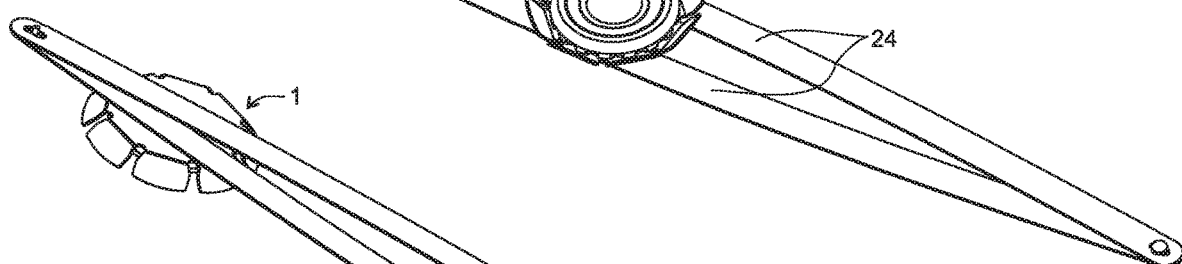
FIG. 13 is a bottom isometric view of two magnetic modules and a curved electrode system with non-uniform axial spacing.

FIGS. 12 and 13 show the assembled electrodes 24 with attached modules 1. The combination of the two electrodes shown results in a linear rail system. The electrode assembly is substantially planar in form. The axial direction of the rail system is along a line that goes through the centers of the mechanical fasteners between the stacked electrodes with the electrodes forming a shape that has mirror symmetry neglecting the stacking offset at overlaps when viewed from above about this axial direction. The distance between an electrode and the rail system axis is a maximum at the midpoint of the assembly along this axis. The shape of the opening between the electrodes in this top view illustrates how the spacing between the electrodes and the rail system axis varies from no separation at the overlapping ends to a maximum at the middle. Flexible magnetic interconnect technology has the capability to accommodate the difference in height resulting from the stacking offset equal to about the thickness of the sheet steel. Although as illustrated the electrodes are in a stacked arrangement in which one electrode lies above the other electrode at both ends, the electrodes could be arranged in an interleaved arrangement in which a first electrode lies above a second electrode at one end and below the second electrode at the other end. It has been observed that with the magnetic modules and ferromagnetic electrodes described above, the electrode offset difference between stacked and interleaved arrangements is reduced towards the midway between nodes as a result of the magnetic attraction at the module contacts.

Figure 14:
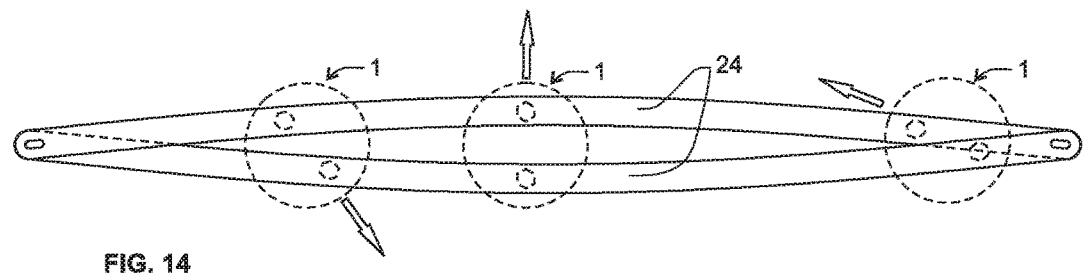
FIG. 14 is a top view of a curved electrode system with non-uniform axial spacing with three modules showing the orientation of the modules in different locations.

FIGS. 12 and 13 include one module attached in the middle of the assembly and one attached near the overlap. FIG. 14 also shows a module located between the center and end of the rail system. Since the spacing of the module contacts (shown as dotted circles) is fixed, the orientation of the module about its central axis must be rotated in these three positions to engage module contacts and both electrodes. The module shown has a separation distance between electrical contacts that provides contact with the middle of the electrodes at the center of the rail system. That is, the orientation of a line through the module contacts is essentially perpendicular to the rail system axis at this central location as indicated by the arrows in FIG. 14. Modules may be constructed with diodes to be insensitive to which contact mates with which electrode so that an inherently DC voltage LED module with two contacts can be attached to a pair of DC voltage electrodes in either voltage polarity or a pair of AC electrodes. Whether to include this capability is a design option. Since this capability is known, for example, through U.S. Pat. No. 4,578,731, no distinction will be made for brevity in this disclosure. As the module is moved away from this central electrode system position, the module must be rotated to have its contacts remain attached to both electrodes. As the module position deviates more from the middle of the assembly, the line connecting the contacts will also rotate to make angles less than 90 degrees with respect to the rail system axis as shown. Starting at the middle position, the module can be rotated either clockwise or counter clockwise. In FIG. 14, counter clockwise rotation of the modules on the left and right are shown. For a lighting module with a light distribution that is not axially symmetric about the direction perpendicular to the plane of the module, this rotation can be used to redirect light without moving any optics in the module or the use of gimbals or other rotating elements. Other modules that have a functional or decorative asymmetry may also use this directional capability that results from the variable spacing of one or both electrodes from the axis of a rail system. Visual inspection of FIG. 14 demonstrates how even if the module contacts were the same size as the width of each electrode, since the contacts lie on the local centerline of each electrode, it is possible to have complete overlap of the contacts and electrodes with module rotation over a wide range of angles from perpendicular to the rail system axis at the center of the figure and rotation in excess of 60 degrees from perpendicular for the module near the right end.

Note that the assembly of the two electrodes as shown in FIGS. 12-14 provide a self-supporting substantially planar rail system. That is, the overlap of the electrodes at the ends of this rail assembly eliminates the need to provide any continuous or periodic mechanical spacers to maintain electrode spacing or planarity. The desired stiffness of the rail assembly is a straightforward design choice of electrode material properties, shape and thickness.

Note that asymmetric structures can be produced with similar module directional and electrode self-supporting characteristics. For example, replacing one of the curved electrodes in this embodiment with a straight electrode (not illustrated) would also require puck rotation to attach at different locations along the rail assembly. The rail system axis of this modified asymmetric assembly would remain parallel to the long dimension of the assembly. That is, the rail system axis would be parallel with the straight electrode, so there would be no variation in the separation distance between the rail system axis and the straight electrode. However, there would be a varying distance between the rail system axis and the curved electrode at different mounting positions along the length of the rail system that would require rotation of the module to maintain electrical contact with both electrodes.

Figure 15:
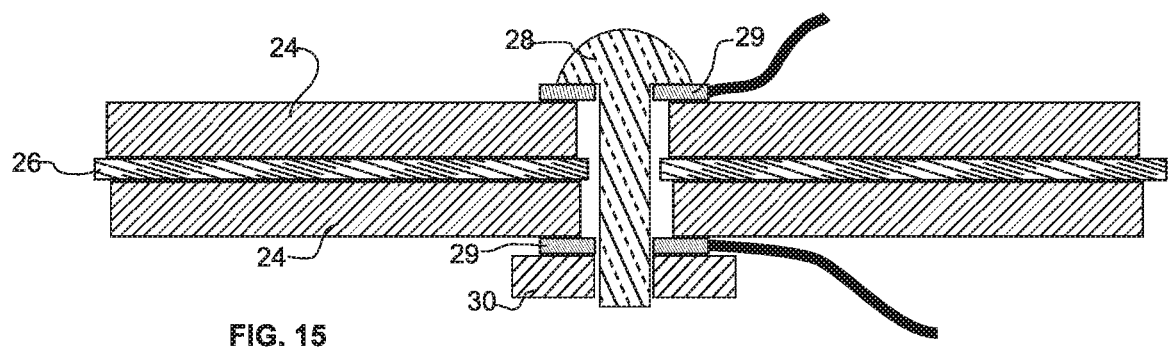
FIG. 15 is a schematic cross-sectional end view through an overlap node portion of a bare electrode system with electrical connections.

FIG. 15 shows a schematic cross-sectional end view through an overlap node portion from a viewing direction along the axial direction of the rail assembly of FIGS. 10-14. It includes means for electrical attachment to an external electrical circuit. Relative dimensions are not drawn to scale for clarity. It shows the stacked electrodes 24 with an insulating layer 26 in between and a schematic plastic bolt 28 and nut 30 as the mechanical attachment element. Threads are not included in the drawing for clarity. It also shows ring terminals 29 with attached wires on the outer surfaces of the overlapping electrodes. The mechanical fastener presses each of the ring terminals into intimate contact with one of the electrodes and completes the electrical circuit between that electrode and one wire.

Figure 16:
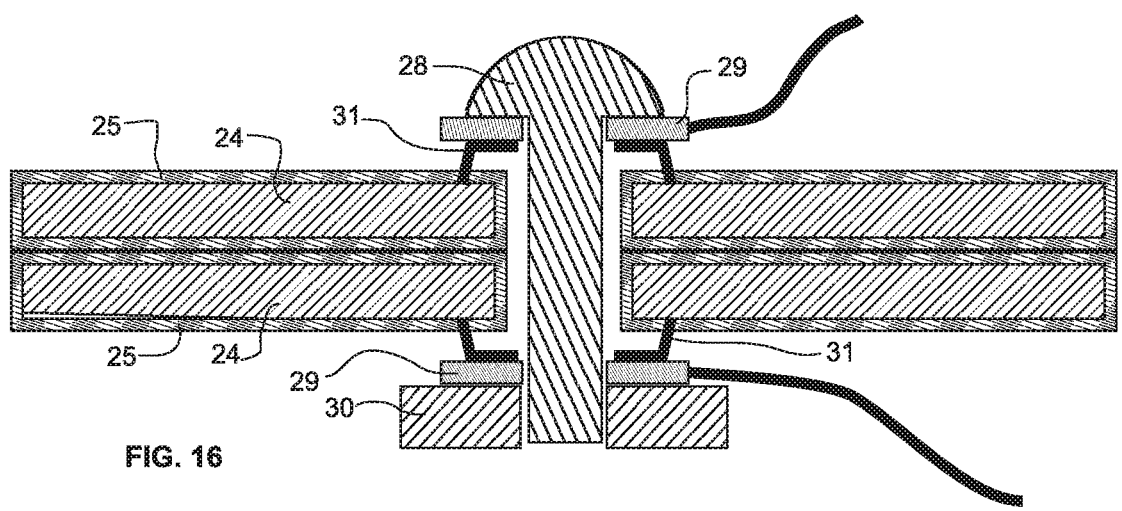
FIG. 16 is a schematic cross-sectional end view through an overlap node portion of an insulated electrode system with electrical connections.

FIG. 16 shows a configuration similar to FIG. 15, but in this case both sides of the electrodes are covered by a continuous insulating layer 25. Sharp structures in the ring terminal or a toothed lock washer 31 placed next to each ring terminal 29 may be used to cut through the insulating layer 25 of the electrode adjacent to the ring terminal and provide electrical continuity between the electrode and the wire. Note that ring terminals and lock washers may be coated with a protective coating for environmental sealing that is penetrated by the sharp structure to provide electrical continuity. If the electrode surfaces are also covered by the insulating layer at module connecting positions between nodes, then IDC contact features 18 should be incorporated in the module to electrode electrical interface. Although the electrodes could also be electrically and mechanically connected with magnetic force at nodes, mechanical connectors are generally preferred for economic reasons for installations where infrequent electrode reconfiguration is expected.

Figure 17:
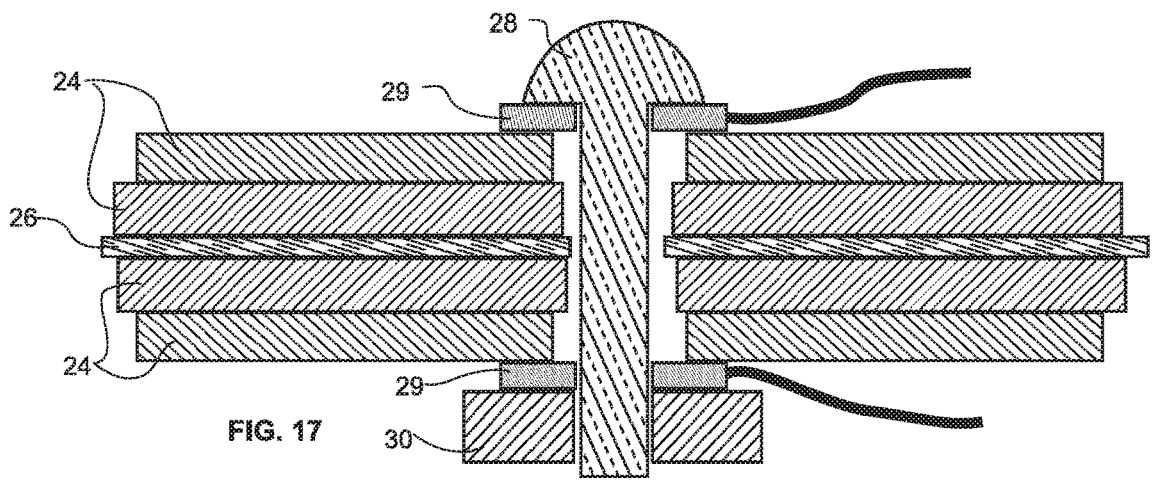
FIG. 17 is a schematic cross-sectional end view through an overlap node portion connecting a pair of bare electrode systems with electrical connections.

Two rail system subassemblies may be combined end to end to create an extended rail assembly. FIG. 17 illustrates an electrical attachment similar to FIG. 15 between a node position between a pair of different rail system subassemblies. Since only two additional electrode to electrode electrical connections are required to series connect the rail system subassemblies, it is still only necessary to insulate the combination of one electrode from each subassembly from the remaining pair of one electrode from each subassembly. That is, a wire is connected to the ring terminal, which is in mechanical and electrical contact with the first electrode of the first subassembly which in turn is in mechanical and electrical contact with the first electrode of the second subassembly. Since this combination needs to be electrically isolated from the remaining electrodes, a central electrical insulator 26 is used. The remaining two electrodes are attached to the second ring terminal in an equivalent manner.

Figure 18:
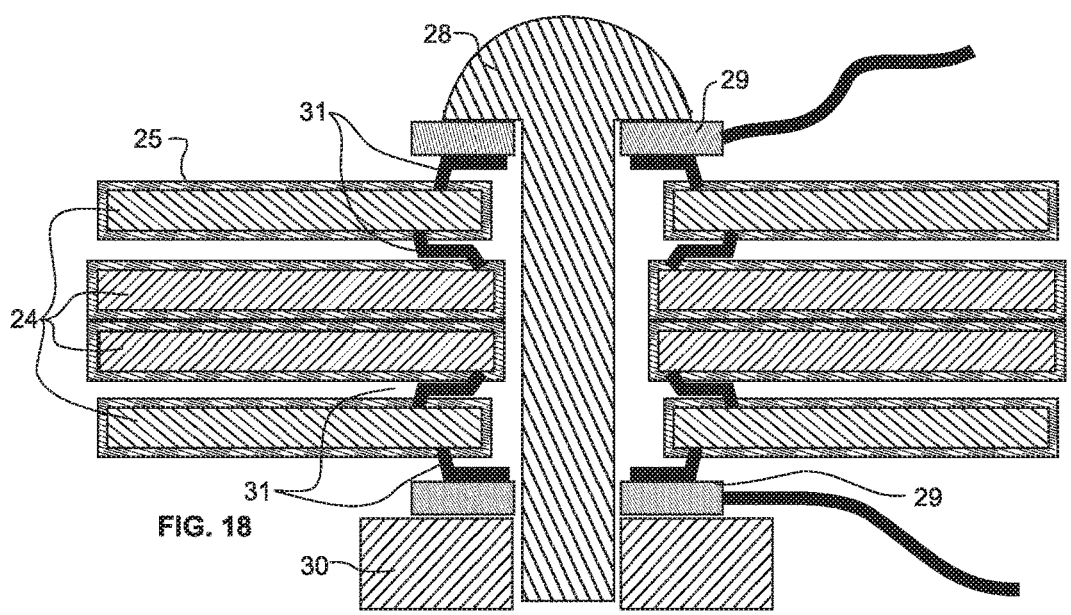
FIG. 18 is a schematic cross-sectional end view through an overlap node portion connecting a pair of insulated electrode systems with electrical connections.

FIG. 18 shows a configuration similar to FIG. 17 for the case where both sides of the electrodes 24 are covered by an insulating layer 25 at the overlap node. To provide electrical continuity from an electrode in a first subassembly and an electrode in the second sub assembly, sharp structures including those of a toothed washer 31 may be used to cut through the insulation of the electrodes 25, or IDC spikes may be incorporated into a plate placed between an electrode and the insulating layer. Alternatively, IDC spikes or teeth can be fabricated directly in the end of one or more electrodes. Unlike the uncoated electrode case of FIG. 17, no separate insulator 26 is required at the center of the stack. Additional pairs of electrodes could be incorporated by introducing insulating piercing washers 31 to connect each new electrode to the stack.

Figure 19:
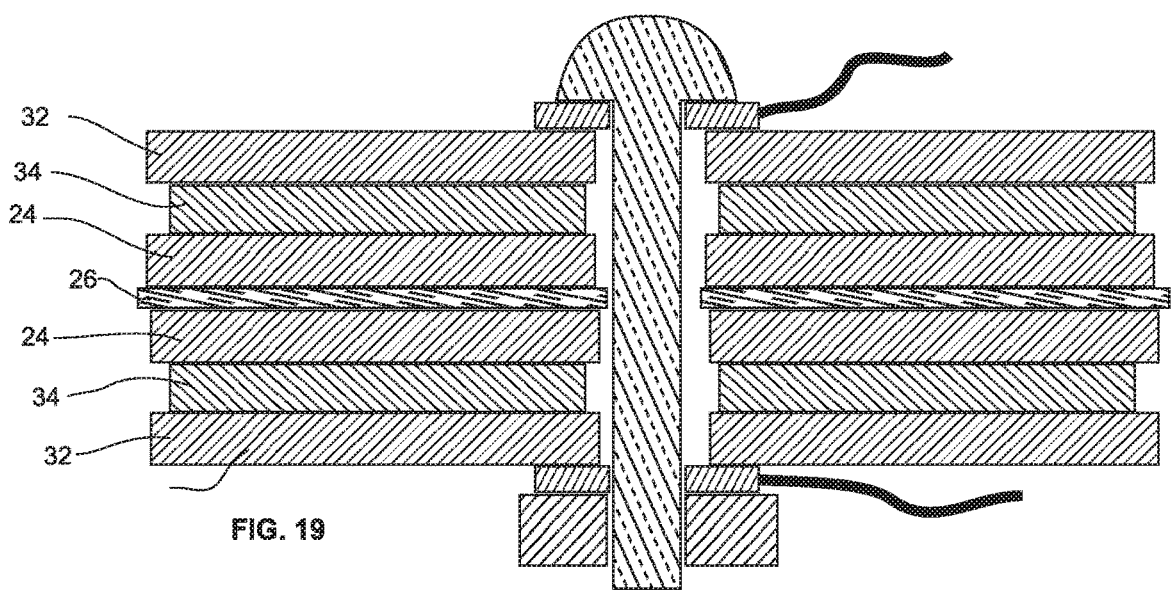
FIG. 19 is a schematic cross-sectional end view through an overlap node portion connecting a set of three bare electrode systems with electrical connections.

FIG. 19 shows an adaptation of FIG. 17 in which three uninsulated electrode pairs are joined at a node. A symmetrical stacking is shown in this figure in which the two electrodes 32 from one rail system subassembly are located on outermost surfaces of the stack. Alternately, stacking the electrodes from different subassemblies in the same sequence top to bottom may be used to reduce planarity differences close to the central node. The insulating element 26 may be a thin plastic washer or film applied to one of the innermost electrodes in the stack. If desired, the compressive force from the mechanical fastener could be tailored to allow rail system subassemblies to pivot relative to one another.

Figure 20:
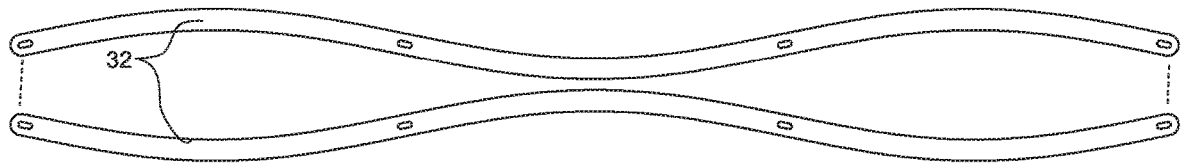
FIG. 20 is a top exploded view of an electrode system with one and one-half wavelength sinusoidal electrodes.
Figure 21:
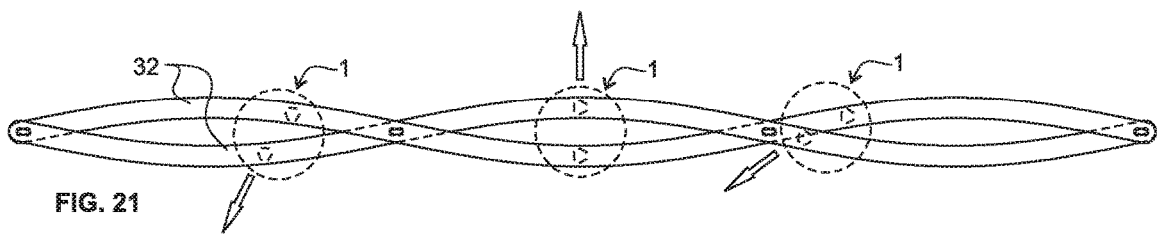
FIG. 21 is a top view of an electrode system with one and one-half wavelength sinusoidal electrodes showing the orientation of modules attached at different locations.

FIGS. 20 and 21 illustrate one and a half wavelength sinusoidal electrodes 32 combined into an extended rail system assembly variation of the one described above. If the same module 1 is used, electrodes 32 have the same amplitude but a shorter wavelength than the sinusoid wavelength of electrodes 24 illustrated in FIG. 10. As indicated by the broken hidden lines in FIG. 21, the electrodes alternate relative positions at the cross-over nodes. This type of interleaving may be used to modify the stiffness of the assembly, eliminate intermediate node attachment mechanisms, simplify rail system assembly, and/or decrease the average non-planarity between electrode surfaces. In addition, with the use of the IDC concepts described in U.S. patent application Ser. No. 15/213,115, the electrode rails may be coated with a polymeric film or paint to provide a colorful appearance, moisture protection and/or to provide electrical insulation at the overlap nodes of the electrodes. Interleaving electrodes of two different colors will provide a different visual appearance compared to non-interleaved electrodes.

Figure 22:
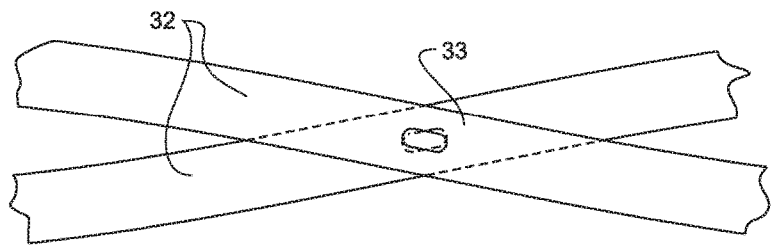
FIG. 22 is a top view of the portion of an electrode system where the electrodes overlap.

FIG. 22 shows an enlargement of one of the overlap crossover node areas 33. An elongated hole is shown that may be used with a mechanical fastener with an asymmetric feature such as a t-shaped end (not illustrated) that is sized to be inserted parallel to the rail system axis through both electrodes and rotated to lock it in place.

Figure 23:
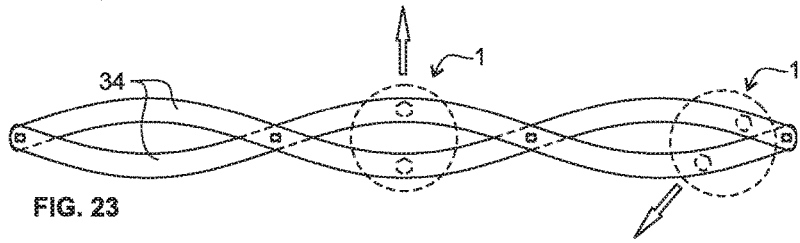
FIG. 23 is a top view similar to FIG. 21 in which the sinusoidal electrodes have a shorter wavelength.

FIG. 23 schematically shows how the rate of module rotation along the axis of a sinusoidal rail system increases when the wavelength is reduced further. This electrode system has the same amplitude and uses the same module 1 and contact spacing as FIG. 21, but the electrodes 34 have a shorter wavelength.

Figure 24:
FIG. 24 is a top view of an electrode system with non-uniform axial spacing with one and one-half wavelength faceted electrodes.

FIG. 24 illustrates an interleaved free-space electrode rail assembly in which the electrodes 54 are faceted. This variation of the sinusoidal form of FIG. 21 provides a different appearance with similar functionality.

Figure 25:
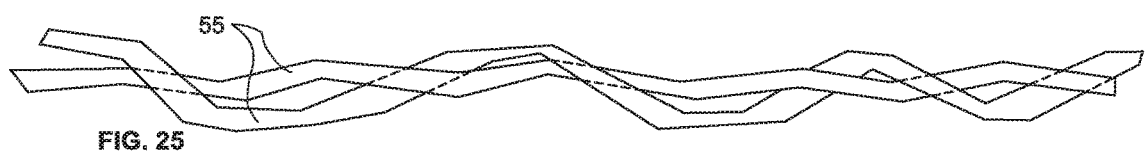
FIG. 25 is top view of an asymmetric interleaved electrode system.

FIG. 25 shows an asymmetric axial rail system with interleaved electrodes 55. It remains self-supporting through the electrode overlap regions and optional interleaving. The axial direction of the rail system is directed along the length of the assembly (horizontally as presented). While the number of possible module attachment points and angles may be reduced from previous embodiments, the non-uniform width and shape of the electrodes still provides many different angles between the module contacts and the rail system axis. Note that it is possible to connect modules oriented with the line connecting the module contacts parallel to the rail system axis near some of the overlap positions due to the electrode shapes. If the electrodes are affixed to one another with thin adhesive instead of screws and nuts, as illustrated, the maximum non-planarity that the contacts must tolerate can be made to be about the thickness of one electrode. Since mechanical fasteners like 28 and 30 in FIGS. 15 and 16 are not present and do not increase the assembly thickness to obstruct module placement at the cross-over nodes, additional mounting flexibility of modules with portions located above nodes may be possible.

Figure 26:
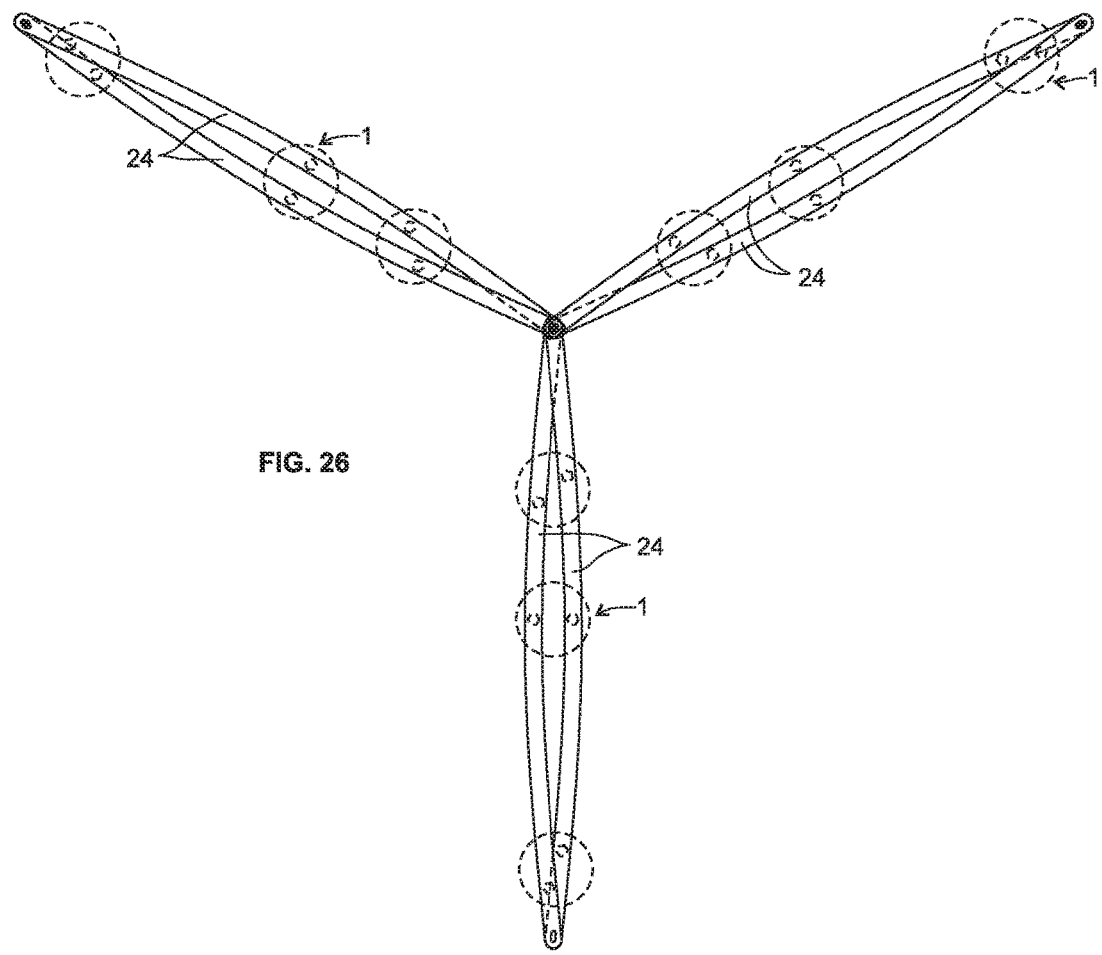
FIG. 26 is a top view of an extended electrode system comprising three electrode system lobes connected at a central point.

In addition to the end to end linear attachment mentioned above, rail system subassemblies can be assembled into extended planar and three-dimensional assemblies. For example, FIG. 26 illustrates a top view of three half-wave sinusoidal rail subassemblies with 120-degree separation between the axial directions of the three subassemblies each comprising a pair of electrodes 24. For the three-lobed structure of FIG. 26, three electrodes (one from each lobe subassembly) would be located on each side of the central insulating element as shown in FIG. 19 or its IDC counterpart based on FIG. 18. The electrical connection may be made at the central node which may also be used to fix the assembly to a ceiling. This could be used as a planar pendant light assembly with repositionable directional lighting modules. In addition to a planar pendant light, the individual rail subassemblies could be bent out of the plane to provide a dome-shaped pendant light. This bending could result from permanent deformation of the rails. It may also include a level of elastic deformation, for example, caused by the weight of the modules on electrodes 24 made of thinner steel. In common with some other embodiments included in this disclosure, the lobed rail system assembly of FIG. 26 may be suspended or supported in free-space in any orientation using wires, rods or other flexible, rigid or semi-rigid materials or may be fastened parallel to a solid surface or cantilevered from one element using mechanical fasteners known in the industry or mentioned previously.

Figure 27:
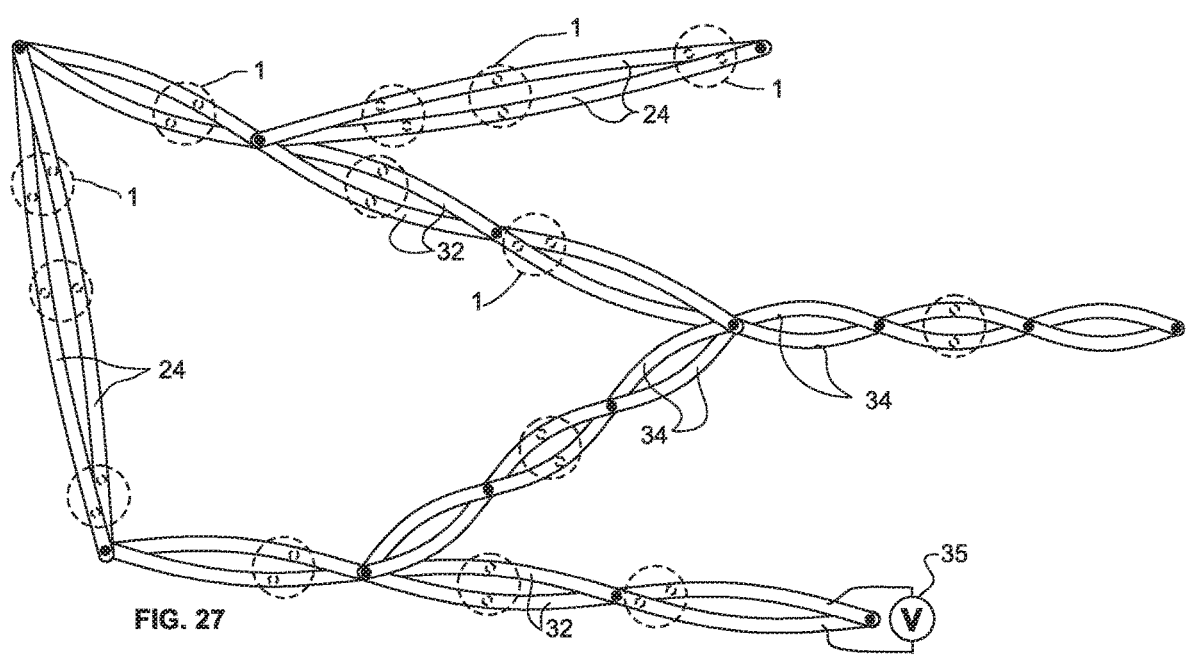
FIG. 27 is a top view of an extended electrode system comprising sinusoidal sub-systems of different wavelengths and half-wavelength cycles.

FIG. 27 shows an extended planar assembly of sinusoidal electrode rail subassemblies. The subassemblies shown have the same amplitude but differ in the number of half-wavelength cycles in the electrode pairs and the magnitude of the sinusoidal wavelength. Electrodes 24 provide one half cycle, electrodes 32 provide a full cycle and electrodes 34 provide three half cycles. The overlapping sections and mechanical attachment features at the end nodes of the subassemblies may be used for mechanical connection of the subassemblies. These nodes can also be used to provide electrical attachment between the electrodes of different subassemblies. In FIG. 27 a single voltage source 35 is attached to only one rail subassembly, which may result from the use of ring terminals 29 shown in FIGS. 15 and 16. Alternatively, an electrical connection may be made at any position of an electrode using solder, conductive adhesive, mechanical clamps or clips, or a power connection module using magnetic connectors. Electrical continuity between electrodes in other subassemblies may result from the electrode to electrode connections described in FIGS. 17-19. The combination of constructing track system paths to different areas of a ceiling coupled with rotating lighting modules with asymmetric output and rail segment bending provides flexibility in directing light to desired areas in a room.

Figure 28:
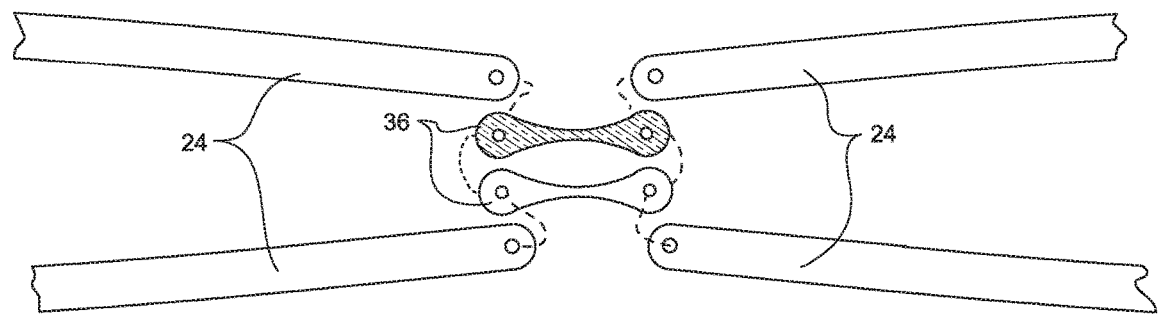
FIG. 28 is an exploded top view of the ends of two pairs of electrodes and two electrode links.
Figure 29:
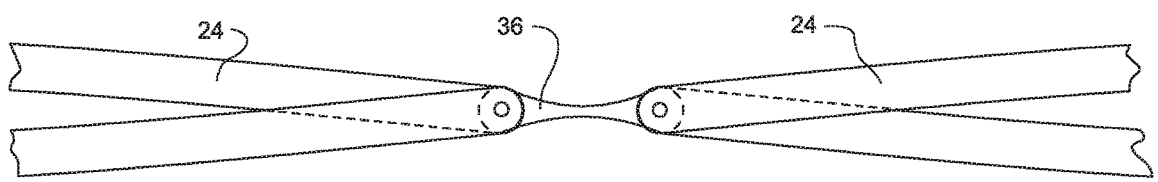
FIG. 29 is a top view of the ends of two pairs of electrodes joined by electrode links.
Figure 30:
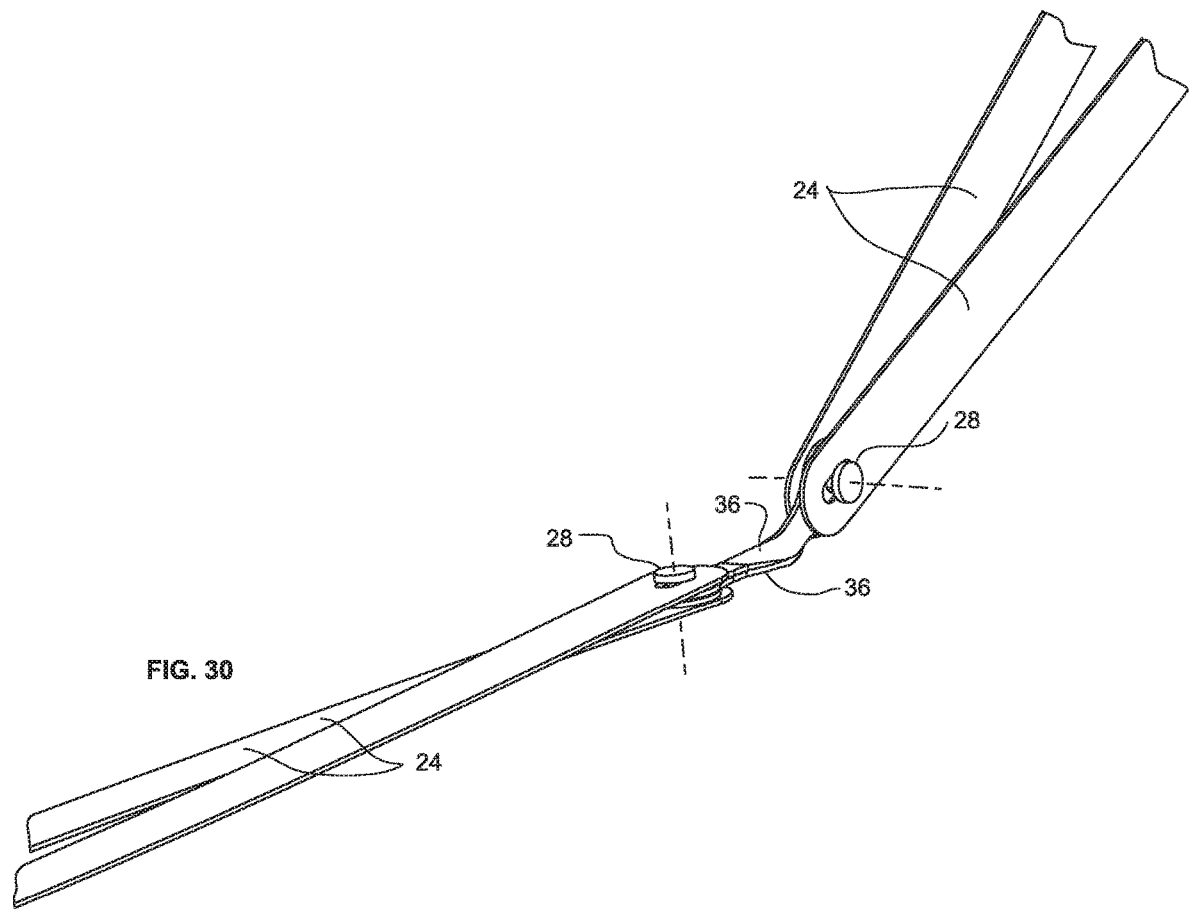
FIG. 30 is an isometric view of electrode links attached to the ends of two pairs of electrodes in which the links are bent to change the angle between the pairs of electrodes.

FIG. 28-30 illustrate linear electrode links 36 which may be used, for example, to physically separate an electrode pair node from one rail subassembly from an electrode pair node of another rail subassembly. These links may incorporate an insulator on the side facing inward to prevent electrical shorting of the electrode rails by inadvertent link to link contact. The electrical connection between electrodes 24 of one node through electrode links 36 to the electrodes of the next node would be a similar stack to that shown in FIG. 17 without the ring terminals 29 and with the insulator 26 being replaced by the insulators on the links 36. Electrode links for use with insulated rails would follow from similar modifications. The IDC version using links 36 with insulation on both sides would follow from similar changes to the stack shown in FIG. 18. Linear links as shown or links with more than two connecting features may be used to connect multiple linear rail systems together or provide mechanical support for mounting rail systems to a ceiling or other supporting surface.

FIG. 30 is a perspective view of a set of electrode nodes connected with links 36 that have been bent. This bending results in a transition of an electrode pair in one plane to an electrode pair in another plane which may be used, for example, to further tailor lighting directionality in an environment as desired. With the simple electrical and mechanical connection of node sections, this tailoring may be accomplished during installation by bolting together electrodes of different lengths using links that have been bent out of the plane at specific angles or twisted axially at specific angles in the factory. U.S. patent application Ser. No. 15/213,115 describes how folding a linear electrode track with alternating positive and negative fold line angles and surface fold angles may be used to produce a gyrating track assembly with additional directional capability. The gyrating track was characterized by a series of planar sections having normal directions to the planar sections that pointed at different directions along and around the track system axis. A set of bent links 36 with similar fold line and surface fold angles could be used to make a chain of the planar rail subassemblies shown, for example, in FIG. 12 of the current disclosure, to provide a series of planar segments that gyrate around the axis of the composite rail system in a similar manner. The directional capability with asymmetric optics described with FIG. 14 further increases directional capability of such a gyrating track. Similarly, links 36 with an axial twist could be used to make a series of planar rail segments in which normal directions to the plane of the segments would point at different directions around the rail system axis. A kit of electrodes and factory-bent links may be used to provide installation flexibility with consistent angles between adjacent pairs of electrodes.

Figure 31:
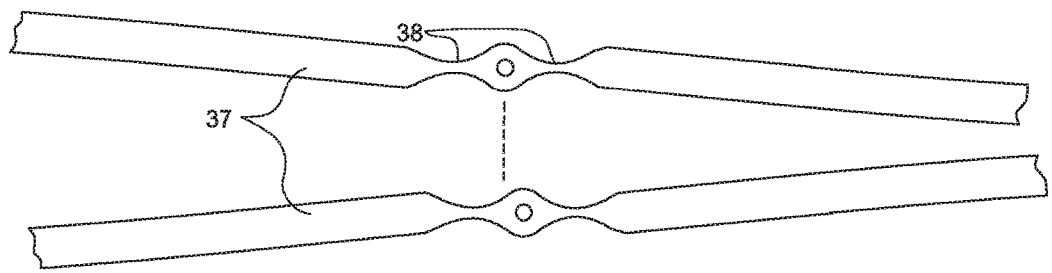
FIG. 31 is an exploded top view of a pair of electrode segments with integral bending links.
Figure 32:
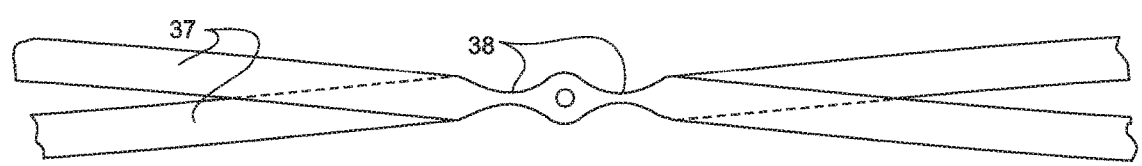
FIG. 32 is a top view of an assembled pair of electrode segments with integral bending links.

FIGS. 31 and 32 show the detail near nodes of a pair of electrodes with integral bending links 37. These electrodes incorporate preferential bending features 38 near an overlap node similar to the form of the links 36. These reduced cross-sectional areas, in common with the discrete links 36, are less stiff than surrounding areas of the rail assembly and may be used to provide easier localized bending and twisting near nodes during installation. Although a pair of bending features 38 are shown in a central portion of each electrode 37, one bending feature 38 could in addition or alternately be incorporated into each end of an electrode 37 or only on one side of the node shown in FIG. 31. Multiple pairs of electrodes 37 could be stacked as shown in the cross-sections of FIGS. 17-19.

Figure 33:
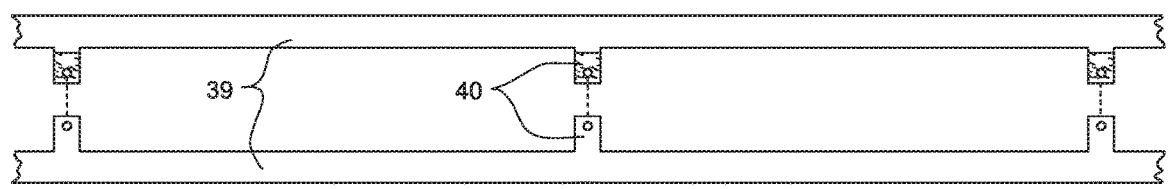
FIG. 33 is an exploded top view of a pair of electrodes incorporating integral spacer tabs.
Figure 34:
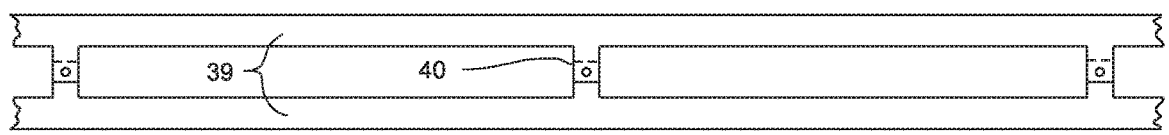
FIG. 34 is a top view of an electrode system comprising a pair of electrodes incorporating integral spacer tabs.

FIGS. 33 and 34 illustrate a self-supporting track system comprising two parallel ribbon electrodes 39 that include integral electrode spacer tabs 40 that are overlapped with an electrical insulator in between. These tabs 40 maintain spacing between the linear portions of the electrode as an alternative to the twist-on spacers disclosed in U.S. patent application Ser. No. 15/213,115. These tabs may be sized and spaced axially and interleaved to tailor stiffness and planarity of the resulting rail assembly. Note that if one module contact is electrically attached to a tab of one electrode, the other module contact may be attached to the outer ribbon of the second electrode. That is, the tabs provide localized non-uniform axial electrode spacing connection opportunities that can be used to provide additional module angular orientation flexibility compared to conventional parallel electrode linear track systems. If the tabbed electrode section of one rail overlaps the longitudinal ribbon of another rail, the module contacts may be oriented along the axial direction of the electrode system with each contact centered on the local electrode centerlines. By increasing all or a portion of the tab width in the system axial direction, module placement variation can be increased by moving the contact placement off of the centerline of the tabbed portion. The use of integral tabs is not limited to rectilinear ladder structures. For example, an alternative embodiment (not illustrated) may be produced by simply replacing longitudinal ribbon portions of the tabbed linear electrodes with sinusoidal electrodes 24, 32 or 34 that have been modified by including integral tabs. These tabs help provide self-supporting options and additional module orientation flexibility without an overlap of the sinusoidal areas. This unillustrated embodiment would also increase the possible range of angular positioning of a module compared to parallel ribbon electrodes. Note that the sinusoidal sections could be in-phase axially or out-of-phase as desired to change the visual appearance or the range of module angles desired for a specific contact separation. Even if both electrodes are sinusoidal, they do not need to have the same wavelength, amplitude or electrode cross-section. As before, the tabs and the electrodes they support could also be sized, shaped and oriented as desired.

Figure 35:
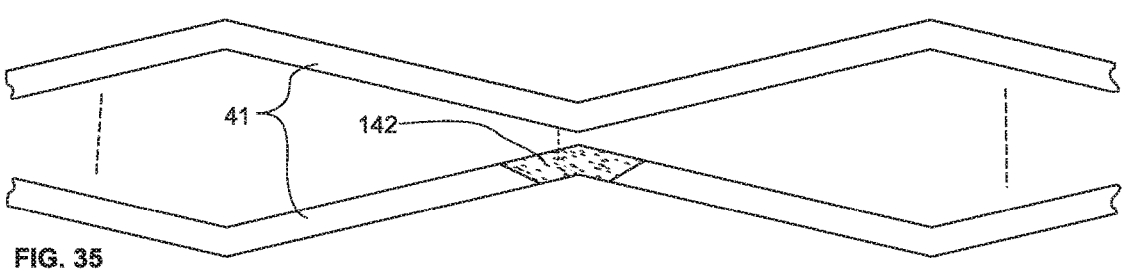
FIG. 35 is an exploded top view of an electrode system comprising a pair of zig zag electrodes.
Figure 36:
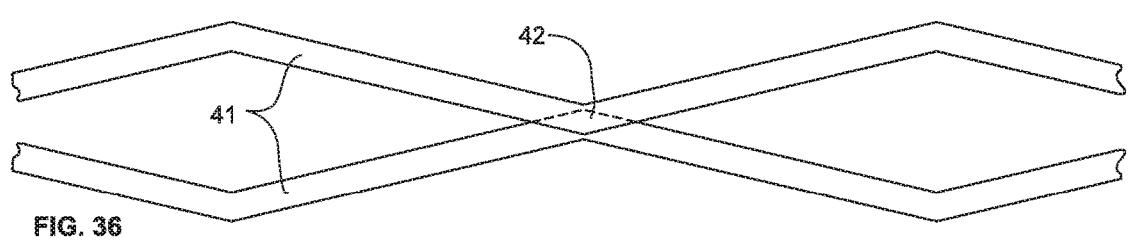
FIG. 36 is top view of an electrode system comprising a pair of partially overlapped zig zag electrodes.

FIGS. 35 and 36 illustrates a periodically overlapping rail assembly with diamond-shaped apertures comprising zig zag electrodes 41. The overlap region includes electrical insulation 142 that may be provided by an adhesive film that holds the rails together. The amplitude and wavelength of a zig zag rail system assembly is essentially doubled with this restricted overlap compared to the rail system shown in FIG. 24 with a complete electrode cross-over at each node.

Figure 37:
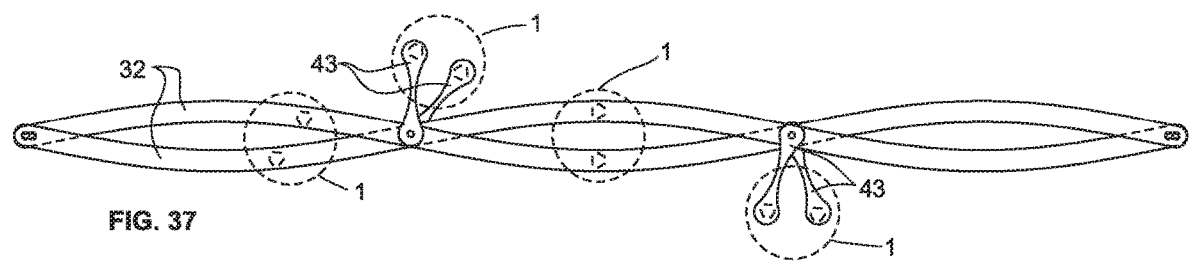
FIG. 37 is a top view of a sinusoidal electrode system having modules mounted to electrodes and bendable tabs.
Figure 38:
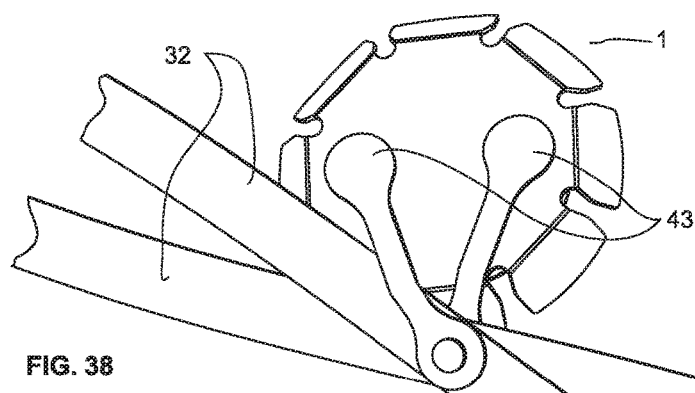
FIG. 38 is a bottom isometric view of the attachment of a module to bendable tabs attached at a node of a sinusoidal electrode system.
Figure 39:
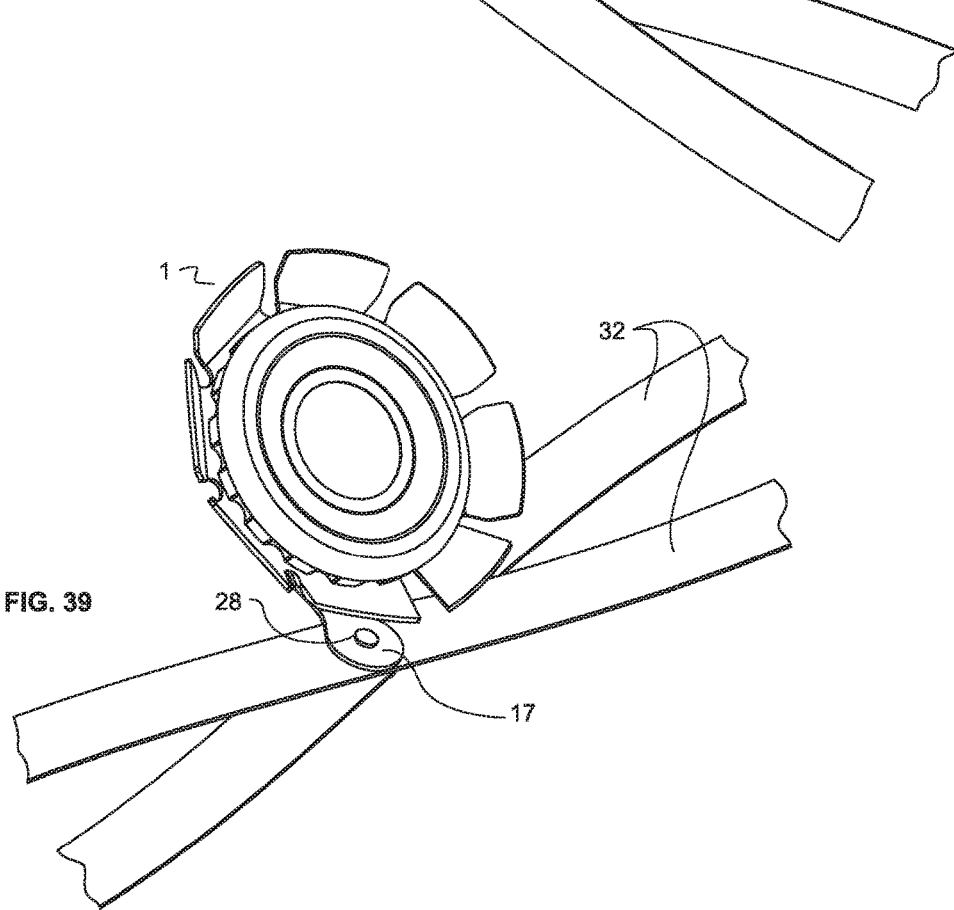
FIG. 39 is a top isometric view of the module attached to the bendable tabs of FIG. 38.

FIGS. 37-39 show bendable module mounting tabs 43 that may be attached at selected nodes. Unlike the bendable links 36 described above, only one end of the bendable tab 43 is attached to an electrode 32. The other end of the tab is connected to an electrical contact of a module 1. These tabs may be bent or twisted to orient module 1 at desired angles around or along the rail system axis. Electrical and mechanical connection of the tab at the node follow the discussion of multiple node attachment in FIGS. 17-19. Depending upon the rail configuration and degree of deformation, selected areas of the tabs may require electrical insulation. For magnetic attachment, the ends of the tabs 43 where the module attaches may comprise convex contact surfaces to simplify relative alignment of tab contact surfaces after bending. For mechanical attachment, modules may generally be attached before bending tabs 43 to orient the module. Although the embodiment above describes tabs that are mechanically attached at nodes on one end and magnetically attached to modules on the other, magnetic attachment at the electrode end with either magnetic or mechanical attachment at the module end (not illustrated) are considered to be part of this disclosure.

Figure 40:
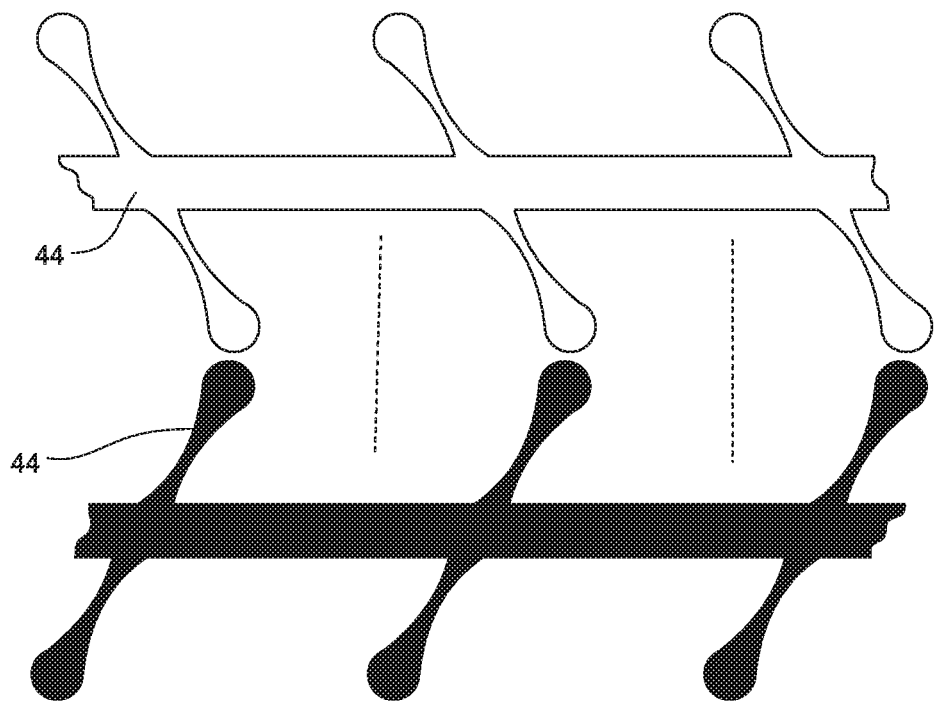
FIG. 40 is an exploded top view of a pair of electrodes having integral bending tabs.
Figure 41:
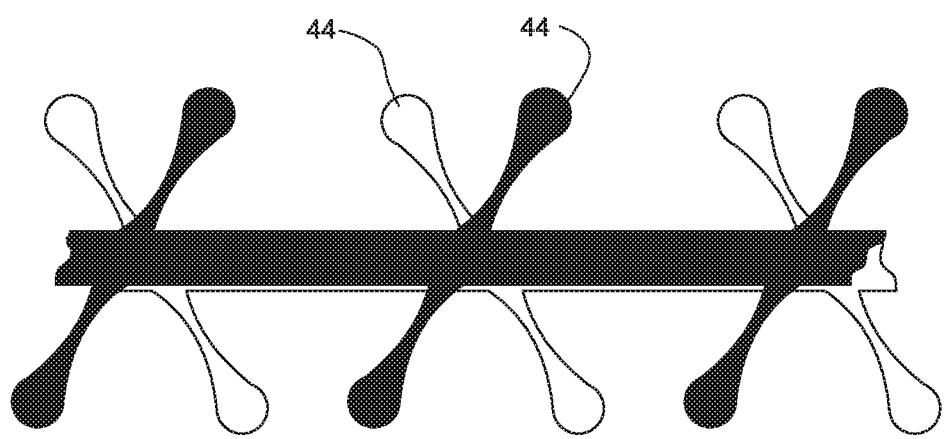
FIG. 41 is a top view of an electrode system comprising a pair of electrodes with integral bending tabs.

FIGS. 40-41 illustrate an electrode rail system in which two electrodes 44 have integral bendable tabs similar to the discrete tabs 43 above. This system shares the continuous central back-to-back overlap portion as the system shown in FIG. 74 of U.S. patent application Ser. No. 15/213,115. The longitudinal portions of these electrodes are overlapped and fixed together with an electrically insulating adhesive or other means. The integral bending tab portions that extend beyond the longitudinal axis may be bent or twisted as desired to orient module 1 (not shown). Electrode 44 may comprise a ribbon electrode with tabs attached by roll welding to ease fabrication. The assembled rail can also be bent across or twisted along the longitudinal axis to increase directional pointing flexibility.

Figure 42:
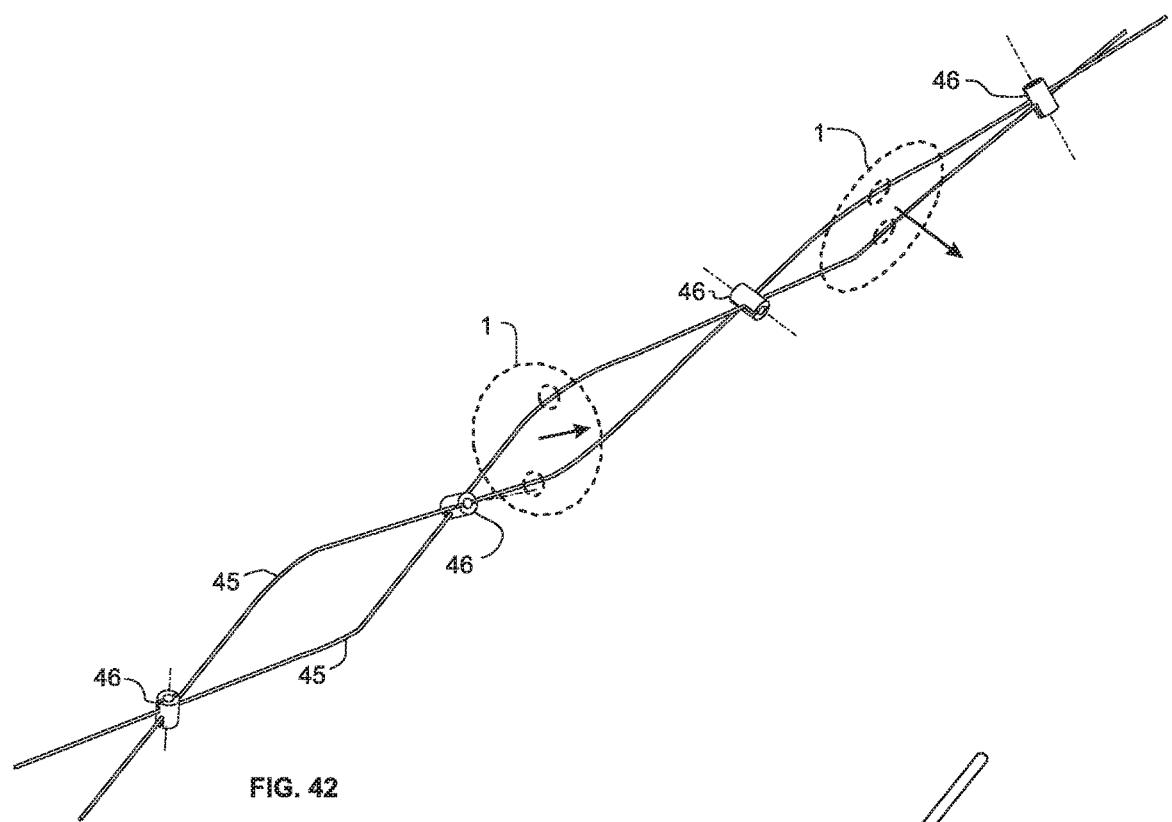
FIG. 42 is a top isometric view of a wire embodiment of an overlapping electrode system with node connectors.
Figure 43:
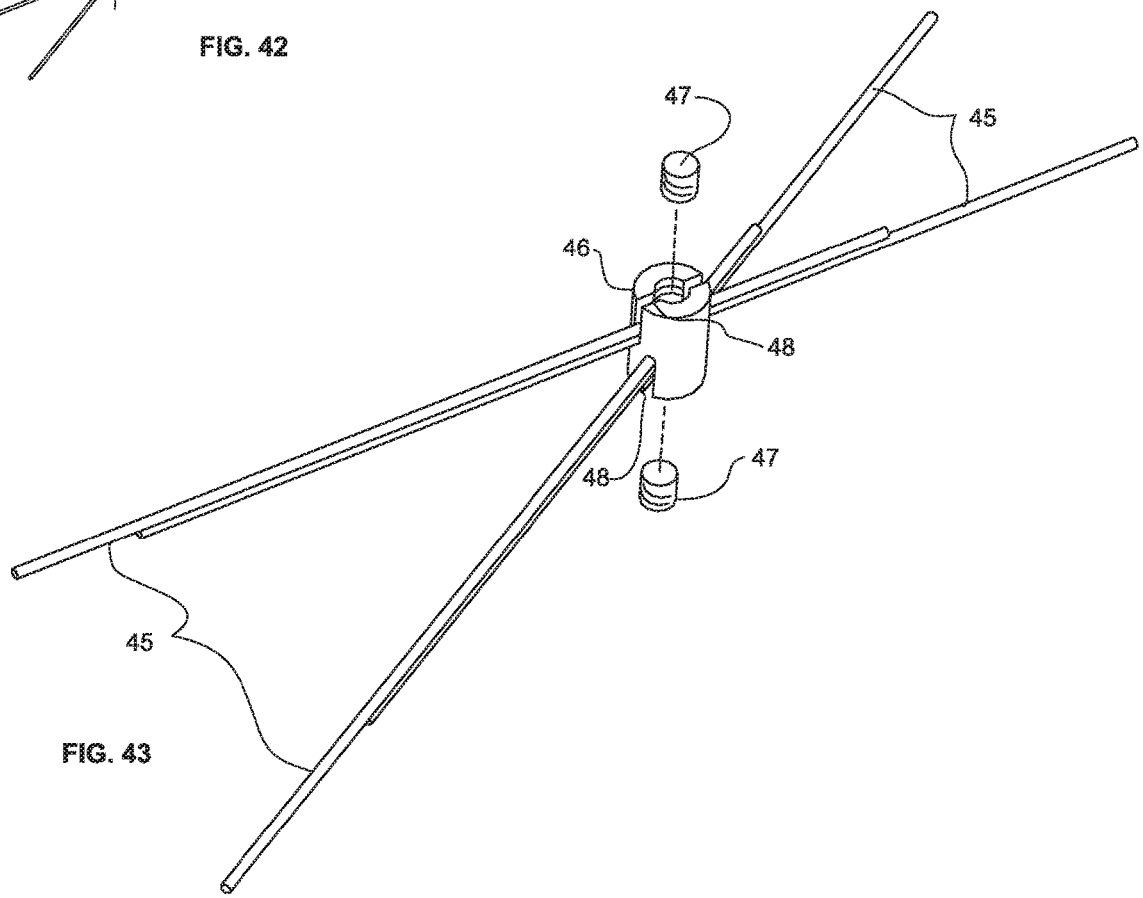
FIG. 43 is a top isometric view of a wire node connector attaching two pairs of electrode wires at the node.

FIGS. 42 and 43 illustrate a wire embodiment of the overlapping self-supporting rail systems using sheet metal described above. The wire electrodes 45 may be of the form of rigid rods or stiff flexible cable constrained to follow a path similar to previous embodiments. The overlapping of the wires at nodes prevents some of the racking movement and axial rotation that may result from relative movement including axial sliding of lateral spacers in some prior art parallel wire systems. The wire electrodes may be held at a desired overlap angle at nodes using node connector 46. Node connector 46 may include angled channels or slots 48 that capture the wire electrode 45 at the desired overlap angle. With stiff flexible cable, the slot angles and lengths of the two cables between node connectors influences the curve of the cable on either side of the wire cable system axis. The node connector 46 may be made of nylon or other insulating material to prevent electrical shorting of bare wire electrodes 45. Screw 47 may be used to secure the wire electrode in the spacer slot. Slots may include twist-on cable locking features or use elastic deformation of the electrodes without the use of screws like spacers disclosed in referenced U.S. patent application Ser. No. 15/213,115. The rail assembly may also be twisted along its axis and/or bent to orient the essentially plane sections between nodes. FIG. 42 illustrates how the variable axial spacing of the electrodes along the rail system axis provides additional module directional flexibility. Note that when ferromagnetic wire electrodes and magnetic attachment are used, the magnetic force of attraction may be tailored to provide sufficient force to pull a wire electrode into contact alignment locally. FIG. 43 illustrates how splicing of different electrodes can be accomplished at the node connectors by forcing intimate contact between wire electrodes like the electrode contact in FIG. 17 or wire clamps commonly used for electrical assembly. The connection to voltage source leads can be accomplished in a similar manner. Although uninsulated wire electrodes are generally preferred for magnetic module attachment, insulated wire electrodes and modules and node connectors with non-magnetic attachment IDC capability may be used with the self-supporting wire electrode assemblies of this embodiment.

Figure 44:
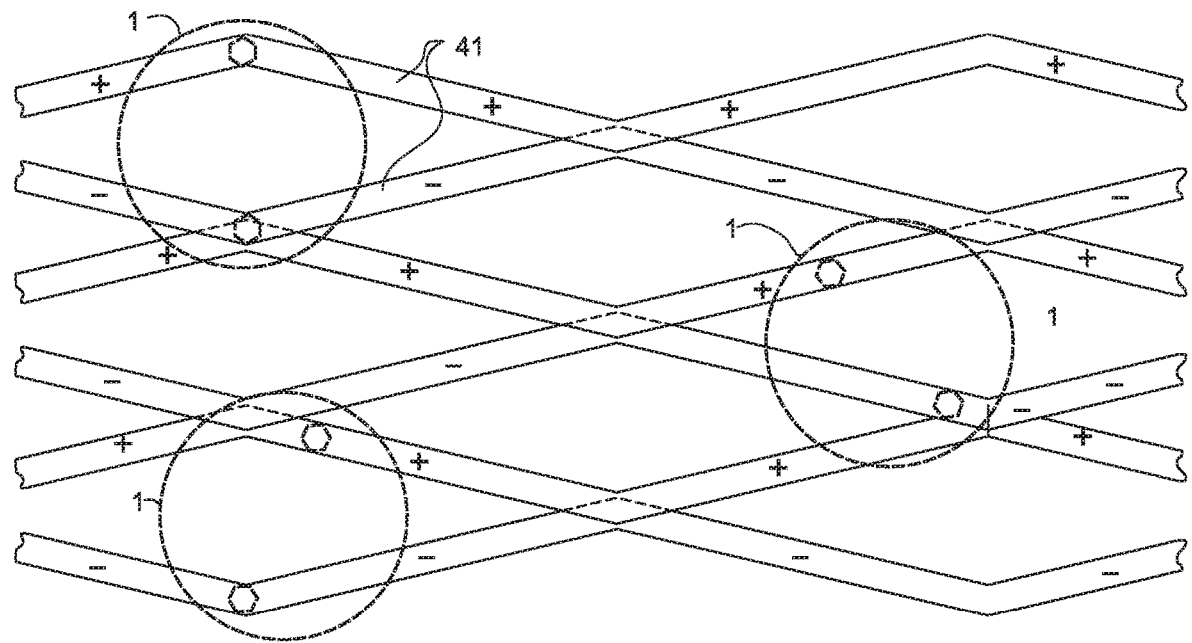
FIG. 44 is a top view of an extended electrode system comprising zig zag electrodes with dotted lines showing module contacts attached to adjacent electrodes.

In addition to the essentially linear electrode track systems disclosed above, 2-dimensional and 3-dimensional planar arrays may be constructed from linear segments. FIG. 44 shows an extended rail system comprising three pairs of electrodes 41 described with FIGS. 35 and 36. As illustrated, the angled tips of each electrode alternates between being on top or underneath the other electrode at the overlapping nodes. The + and − designations on the rail are included to provide a distinction between voltage potential. Like the two-electrode rail system embodiment of FIG. 36, module 1 can be attached across one + electrode and one − electrode anywhere in the wider assembly. In general, it is possible to construct track rail assemblies with more than two rails to provide more than two electrical supply connections to a module or to have a module respond differently depending upon which contacts are connected. The number and spacing of contacts on the module can be used to restrict which electrode to module connections are possible at a particular location in the rail system assembly and/or a particular module rotational angle. For example, suppose an additional straight electrode is added to the system of FIG. 36 and is aligned so that it is horizontal in the figure and goes through every node overlap region 42. Visual inspection of FIG. 14 shows that the center of the module also lies on the rail system axis at all positions if the module contacts are centered on the local centerline of the electrodes. If the module 1 has an additional electrical contact that is located at the midpoint between the other two contacts or if the third contact is not centered, this third contact will overlap the third electrode whenever the original module contacts overlap the original two zig zag electrodes. However, if this straight electrode is not aligned with the nodes, there will be some places and angles where it makes contact and some where it will not. This may be used to alter the functioning of the module at different positions.

Figure 45:
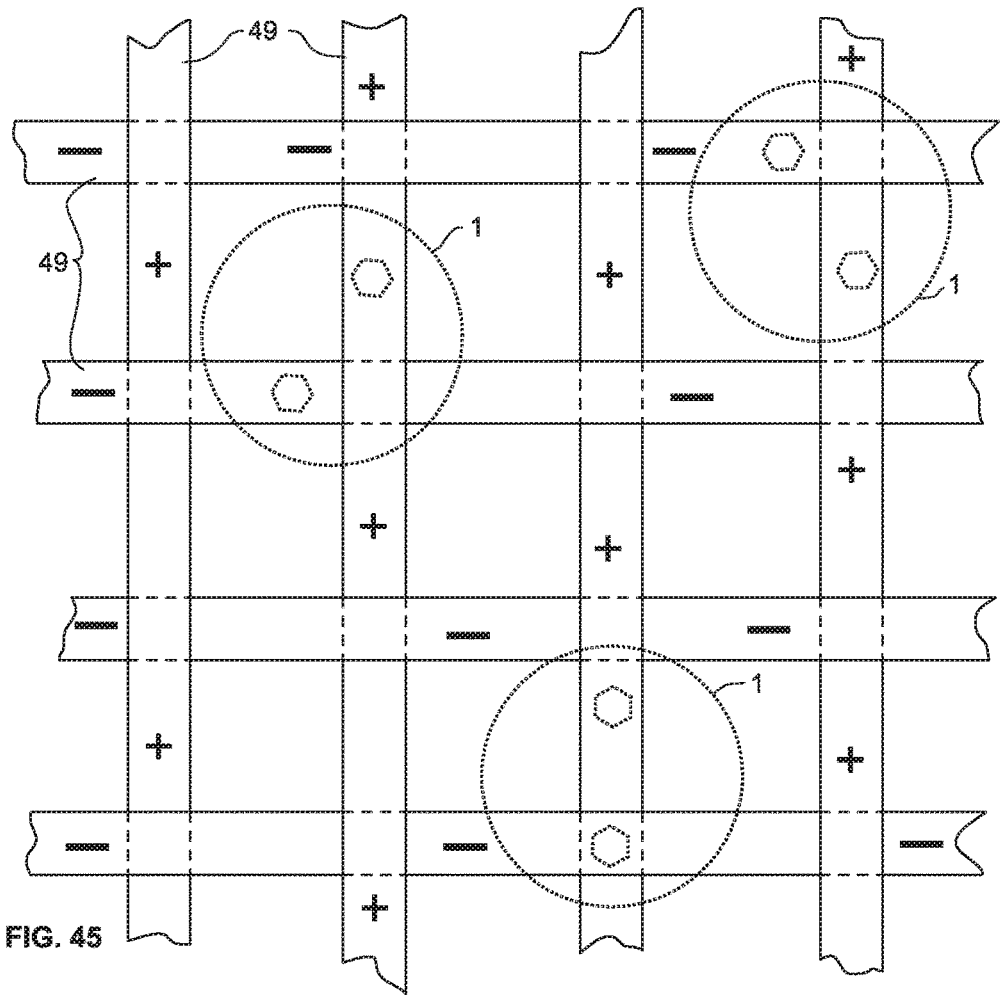
FIG. 45 is a top view of an extended electrode system comprising interleaved ribbon electrodes with dotted lines showing module contacts attached to horizontal and vertical electrodes.

While the rail system assembly in FIG. 44 still has the characteristic of a longer dimension (horizontally as shown) with an associated rail system axis aligned and centered in this long direction, elements of the embodiments above can be adapted to systems that do not have a distinct linear axis. FIG. 45 shows a planar array of straight electrodes 49 that are woven into a planar grid assembly. This assembly extends the self-supporting and module directional flexibility of the linear rail system embodiments described in the embodiments above. A free-standing room divider or ceiling panel can be produced with the open weave of FIG. 45 to which lighting or other electronic modules 1 can be attached. In this figure, the negative polarity rails extend horizontally, and the positive polarity rails extend vertically. With the interleaving of electrodes as shown, it is possible to have a wide range of possible module orientations near each open square in the lattice as shown in dotted line even with these straight electrodes. Substituting sinusoidal electrodes or other curved electrodes may be used to increase module rotation options. Although the module contact spacing shown is less than the spacing of electrodes, this is a design choice. As noted above, module contact spacing relative to the set of electrode separation distances may be adjusted to control possible attachment sites and orientations. These arrays are not limited to supplying power with positive and negative voltage electrodes as shown. Electrodes in the array may also be used for providing connections to multiple voltage power supplies and data communication for the attached modules.

For example, each of the four electrodes surrounding any of the square openings in the interleaved electrode array shown in FIG. 45 may be used for power or data connections to a module with two additional magnetic connections (not illustrated) supplementing the two magnetic connections of the module 1 described previously for FIGS. 1-9. Similarly, a module with six magnetic connections could be constructed to make electrical connections to three horizontal and three vertical electrodes of the array of FIG. 45. If desired, the size and shapes of the electrodes and apertures in the array could be designed to match mechanical keys on the module to restrict the possible orientation or locations of attachment of the module to the array. In addition, the interleaving of electrodes, that is, the weave pattern, may be modified from that illustrated to alter which electrode is oriented front or back at each overlap position.

Figure 46:
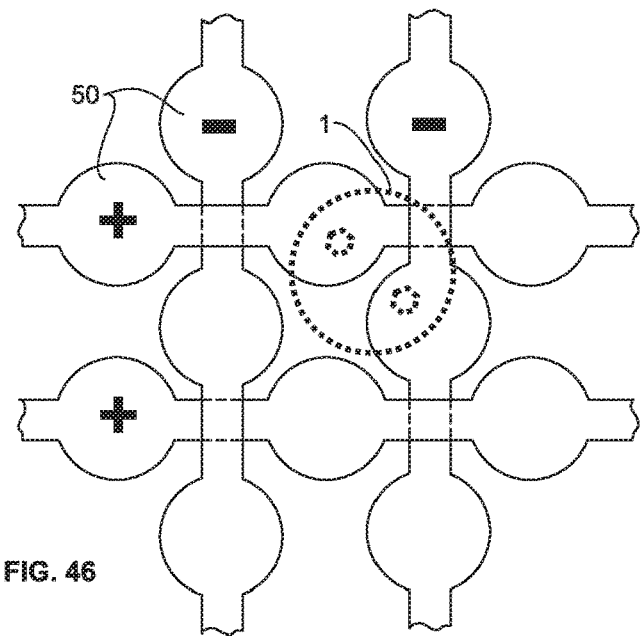
FIG. 46 is top view of an interleaved electrode system comprising electrodes with circular pads with dotted lines showing a module attached between a horizontal electrode and vertical electrode.

FIG. 46 illustrates an alternate planar electrode system comprising electrodes similar to those of FIG. 73 of U.S. patent application Ser. No. 15/213,115 with enlarged circular pads 50 for attaching module 1. Increasing the proportion of the planar electrode assembly filled with electrodes may be used to modify the breadth of module positioning options at a location or may be used for protective or decorative screening purposes allowing light, air and sound transmission in a similar manner to other known applications of metal grills. When modules 1 comprising IDC spikes 22 are used, electrodes may be coated with paint or self-healing polymeric films to provide color and environmental protection. Placement and removal of a module in a direction perpendicular to the plane of the electrode assembly minimizes the damage done to the insulating coating. Apertures may be used to provide access for mechanical clamping features disclosed in FIGS. 58-64 of U.S. patent application Ser. No. 15/213,115.

Figure 47:
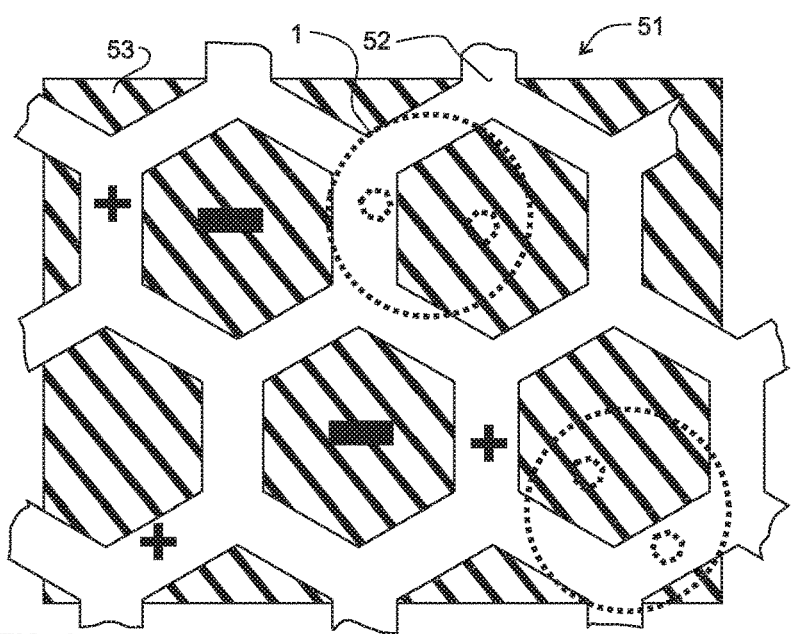
FIG. 47 is a top view of an electrode assembly comprising a planar sheet electrode and a hexagonal grid electrode with dotted lines indicating module attachment between the two electrodes.

FIG. 47 illustrates a laminated electrode grid assembly 51 comprising a planar electrode 53 and planar electrode with hexagonal perforations 52. Module 1 may be attached at different electrode grid locations and angular orientations as before. As noted earlier, flexible magnetic interconnects are relatively insensitive to contact planarity tolerances, so that the scale of the grid openings can be designed so that either contact of module 1 can attach to either electrode 52 or 53. The electrode assembly can also be curved with a radius of curvature large compared to the module dimensions. In addition, with a continuous planar electrode 53 made of ferromagnetic material, the magnetic attraction of the module contacts may be designed to be sufficient to work with a perforated electrode 52 that is made from a material that is not attracted to magnets including copper, aluminum, or flex circuitry. An alternate extended two electrode system (not illustrated) could be fabricated by stacking two perforated electrodes 52 back to back. Even if the electrodes are aligned, both electrodes could be attached to a module using the embodiment illustrated in FIGS. 69-72 of U.S. patent application Ser. No. 15/213,115. For non-IDC applications, the spikes could be replaced with contact springs.

Figure 48:
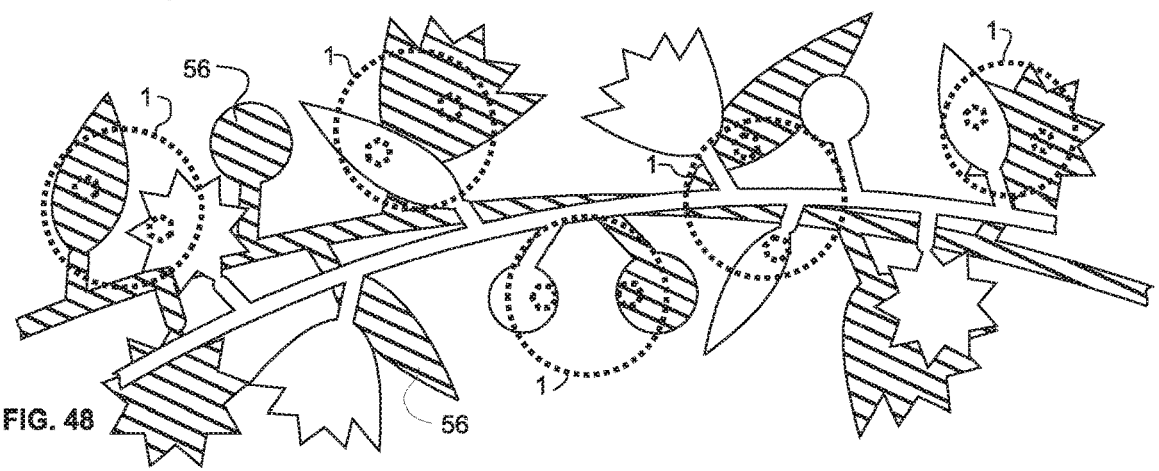
FIG. 48 is a top view of an electrode system with module attachment locations in the shape of plant parts.

FIG. 48 shows a decorative rail assembly comprising electrodes 56 that include module contact attachment locations that are designed to look like leaves or flowers on vines. As indicated by the dotted lines, module 1 may be attached between these enlarged portions on one or both sides of the vine stems. Compared to regular periodic electrodes such as shown in FIG. 21, it is possible to increase the angular flexibility of module attachment within a smaller axial distance through irregular electrode shapes, sizes and placement. Decorative features of electrodes 56 may be designed to allow intertwining of electrodes as shown in FIG. 25. Alternatively, overlapping regions of the two electrodes shown may be used to strengthen the assembly through adhesive bonding. Note that the module substrate or housing may also be shaped to mimic a portion of a plant or animal or scene.

Figure 49:
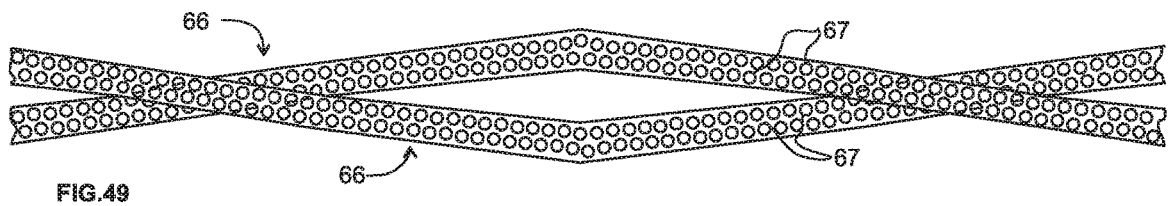
FIG. 49 is a top view of an interleaved electrode system with perforations.

Numerous examples of self-supporting electrode rail systems including those that allow modules to be placed at a range of angles have been presented. While they function similarly, the disclosed electrode systems embodiments presented have distinctive appearances, especially compared to conventional prior art parallel electrode ribbon and parallel electrode wire systems. The individual electrodes and electrode assemblies can be shaped and colored with spray enamel or flexible paints to be featured as intentionally visible design elements of the overall lighting system. FIG. 49 illustrates how perforations may be introduced into an electrode system for decorative purposes, or to adjust weight or stiffness while maintain the same outline. The distribution of IDC spikes and size of the electrical contact can be designed to ensure that perforations do not interfere with electrical continuity between the module and electrode system. Perforations or embossed features of other sizes, shapes and placement may be used to change the appearance of the electrode systems of this disclosure. Backside mounting of the modules as described above allow the electrode systems to obscure a portion of the modules to reduce the visual impact of the modules.

Figure 50:
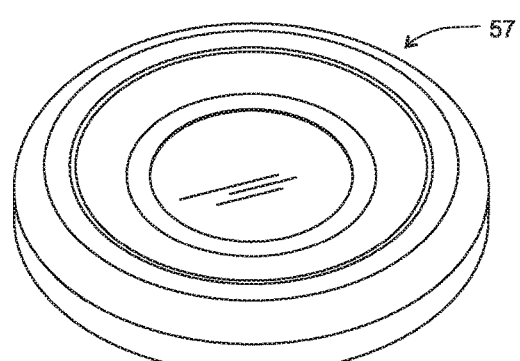
FIG. 50 is a top isometric view of a module with a thermal interface.
Figure 51:
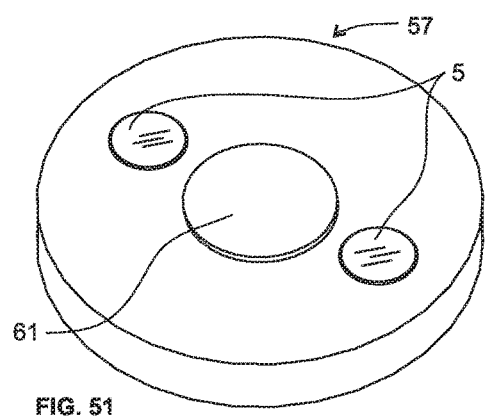
FIG. 51 is a bottom isometric view of a module with a thermal interface.
Figure 53:
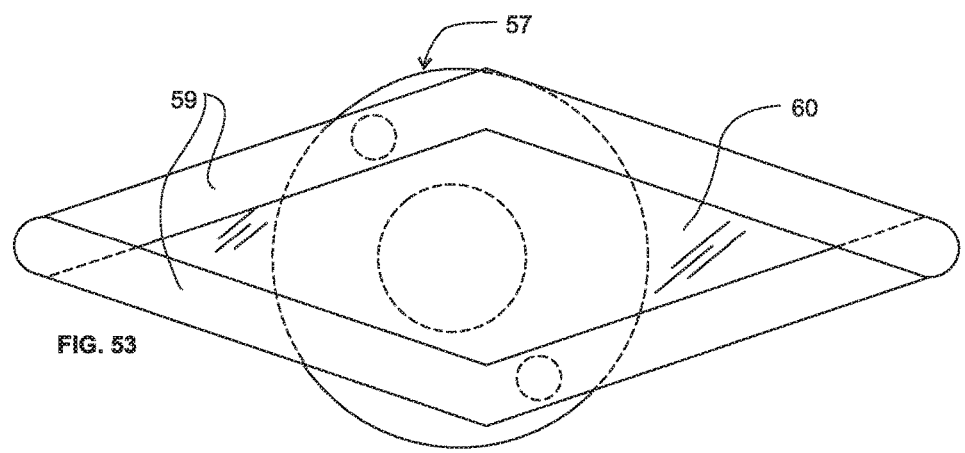
FIG. 53 is a top view of an embodiment of a thermal electrode system with a thermal heat sink spanning the opening between electrodes with a module indicating the positioning of electrical and thermal connections.

FIGS. 50 and 51 illustrate a module 57 that includes a thermal interface 61 for transferring heat to an external heat sinking rail or socket assembly as described in co-owned U.S. Pat. Nos. 8,651,711 and 9,709,258 which are incorporated by reference in their entirety herein. FIGS. 52 and 53 illustrate a non-uniform axial thermal rail system 58 embodiment similar to that shown in FIGS. 12 and 13 for modules that had an integral heat sink 2. The shape of the electrodes 59 has been changed from the half-wave sinusoidal shape in the other embodiment to a half-wave angular shape with piecewise linear sections with a larger ratio of amplitude to wavelength than before. As illustrated the amplitude is of the same order of magnitude as the wavelength. These overlapping electrodes are shown without holes and mechanical attachment to illustrate adhesive attachment at the overlap regions. An additional diamond-shaped heat sink plate 60 has been added to the bottom of the electrode assembly to provide a heat sink with a thermal contact surface for the central thermal interface 61 of the module. This heat sink plate 61 may be made of aluminum or other material with relatively high thermal conductivity and may include structures and features to increase thermal transfer away from the module described in the referenced patents. This heat sinking layer may be shaped to extend beyond the electrodes and may include an electrically insulating coating. FIG. 53 illustrates a top view of a module mounted on the rail system to show the positioning of the electrical and thermal contacts on the bottom of the module with the thermal rail assembly of FIG. 52. The directional benefits resulting from the variable spacing of at least one electrode from the non-thermal rail system axis are maintained, but the range of rotation may be impacted due to the addition of the thermal interface size and shape which extends from the bottom of the module. This mechanical interference consideration results from potential thermal conduction inefficiency caused by non-planarity between the electrodes 59 and heat sink 60. Thermal conduction to electrodes to provide module cooling is not precluded, but electrode material characteristics and this non-planarity may introduce a region of lower thermal conductivity even with a compressible thermal pad. From a mechanical perspective, any restriction on module placement 57 with a compressible thermal interface would typically be less severe than the addition of a conventional rigid aluminum heat sink to the bottom of module 1 extending through the opening between non-thermal electrodes. In an alternate embodiment (not illustrated) to the diamond-shaped piece 60, a linear strip of heat sinking material may be substituted in an axial direction. Depending upon the strip width, portions of both sides of electrodes may be exposed to provide attachment capability for module 57 on both sides of the electrode assembly. Alternatively, diamond-shaped pieces 60 may be attached to alternating sides of each node in the electrode system or a strip heat sink may be interleaved over and under the axial sequence of crossover nodes of the rail assembly. Any of the heat sinking systems disclosed herein may include channels, fins or other geometries to increase surface area, fluid-filled heat pipes and/or active cooling technologies including fans, thermoelectric coolers, or other heat transfer and management technologies. Apertures shown in prior embodiments can also be used to provide access to a heat sink 60.

The symmetrical electrode geometry of FIG. 53 and previously disclosed symmetrical rail systems such as FIG. 14 keeps the center of the module aligned with the axis of the rail assembly. That is, in changing the rotation angle of the module, the axis of the module rotation is about the midpoint between the contacts. The thermal interface 61 is centered on the axis of the rail system with module rotation. Positioning of the thermal module along the rail axis near to the overlap nodes may be prevented by mechanical obstructions to insure efficient thermal transfer to heat sink 60. This axial alignment characteristic may be exploited to provide additional mechanical module retention in magnetic attachment systems or to provide a twist-on or slide-on module attachment capability with non-magnetic modules using spring contacts. For example, u-shaped clips (not illustrated) could be placed along extensions of the line between contacts along the outside of the module. These clips could be sized to clear the electrodes near an electrode cross-over node but engage the outside edges of the electrodes when the module is moved away from the node. Mechanical engagement features may also be included that are sized to pass through the opening between electrodes for non-thermal rail systems when aligned axially but engage with the edge of the electrodes when the module is rotated.

Figure 54:
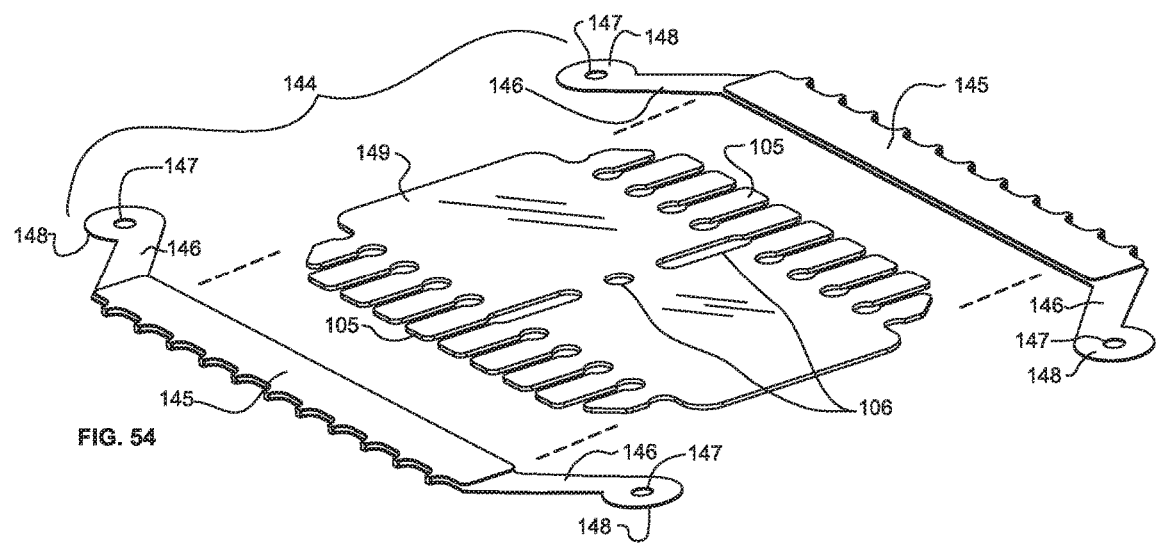
FIG. 54 is an exploded isometric view of a second embodiment of a thermal electrode system with non-uniform axial spacing.
Figure 55:
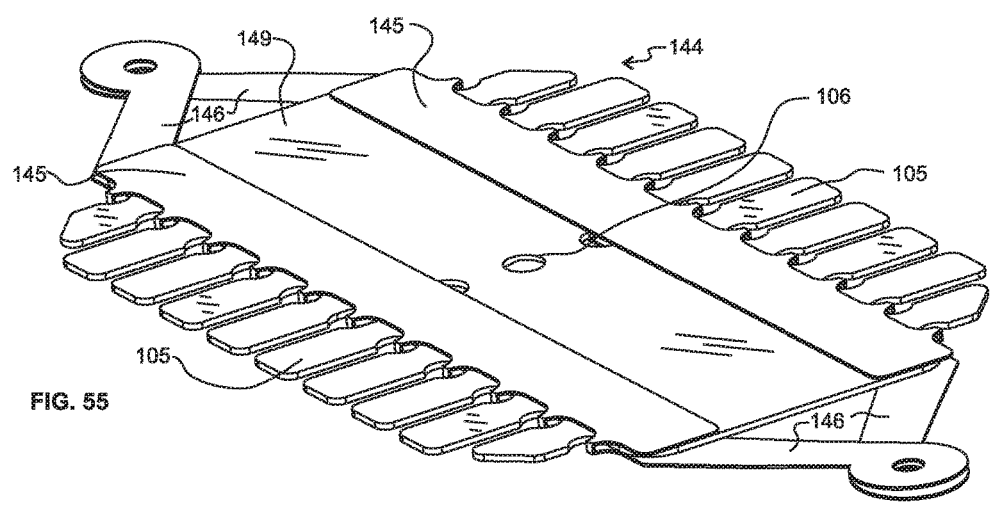
FIG. 55 is an isometric view of the second embodiment of a thermal electrode system.

Another embodiment of a thermal rail system is shown in FIGS. 54 and 55. FIG. 54 shows an unassembled thermal system subassembly 144 and FIG. 55 shows the completed subassembly 144. In this embodiment, the module rotational orientation flexibility in the assembly shown comes principally from the area of the rail system near the overlapping nodes and electrode legs 146 characterized by non-uniform axial spacing. This follows from the predominantly parallel rails shared with the embodiment of FIGS. 33 and 34 above. The rail assembly in this embodiment includes electrodes 145 that wrap around both sides of the heat sink 149. Heat sink 149 may include formable heat sink fins 105 and bend-definition features 106. Heat sink 149 is preferably made from materials such as aluminum, and may include decorative treatments, passivation treatments, and/or electrically insulating layers such as powder coat paints, e-coat paints, anodization or other material plating. Optional bend definition features 106 may include holes, slots, locally thinned areas or combinations thereof. Additionally, in the desired bend areas where the electrodes and heat sink overlap, material may be locally removed such that only one electrode layer thickness is present, thus providing easier and more consistent bending and unbending. An electrically insulating layer is included between the electrodes 145 and heat sink 149. The insulating layer may be a coating, anodizing or tape applied to either or both the electrode rails 145 and heat sink 149. In embodiments that utilize magnetic lighting pucks, electrode rails 145 contain a ferromagnetic material. In addition to the IDC connections described in previous embodiments, electrodes 145 may also be covered with a removable tape with the ability to locally remove the tape only in the module contact areas.

The electrodes 145 in the portion with the heat sink 149 as illustrated are parallel to one another like those shown in FIGS. 33 and 34. This is not a requirement. With the optional projecting heat sink fins 105 of heat sink 149, assembly of the electrodes to both sides of the heat sink may be easier to accomplish in longer sections having parallel geometries. Electrode rails 145 may be partially formed into a "v" shape prior to being installed over fins 105 of heat sink 149. Openings 107 contain clearance to allow assembly over fins 105. Rails 145 may then be folded flat onto heat sink 149 and mechanically attached to heat sink 145 with adhesives, pressure-sensitive adhesive tapes, crimping, welding, or mechanically locking features such as barbs. Rails may be attached to the heat sink directly, or rails attached to themselves through clearance features in the heat sink or around edges of the heat sink, or combinations thereof. After subsystem assembly, heat sink fins 105 may be bent and twisted to accommodate mounting and air flow conditions of the installation environment.

Rails 145 may be made from 0.01 to 0.04-inch-thick annealed low-carbon steel, with copper, nickel and/or tin plating for corrosion protection for magnetic attachment systems. Pucks may also be produced that do not include magnetic components but are mechanically attached to similar rail assemblies. For mechanically attached pucks, ferromagnetic materials are not required in the rail or electrode assembly. In that case, electrodes may be, for example, copper, aluminum, or applied flex-circuit material. Mechanically attached modules may include module retention features which engage track assembly retention features in the heat sink 149. Barbs, keys, clips, and adhesives are other mechanical retention methods. For non-magnetic attachment, the module electrical contacts may be pogo pins or metallic beam-spring contacts. Heat sink 149 thickness may be approximately 0.025 to 0.1 inch thick.

Figure 56:
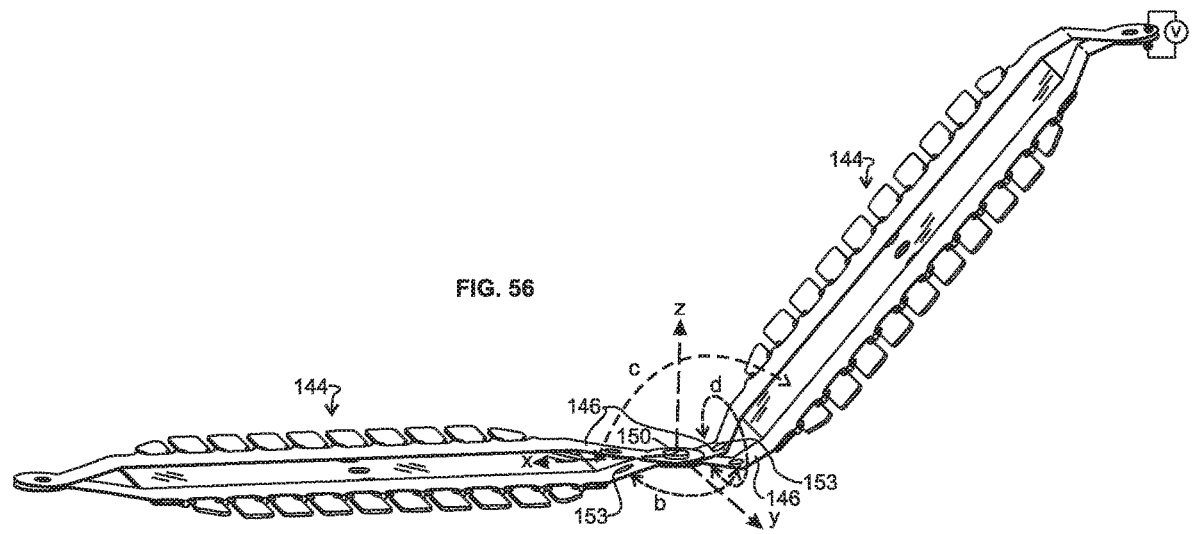
FIG. 56 is an isometric view of an assembly of two thermal electrode systems shown in FIG. 55 illustrating pivoting and bending options near the assembly point.

The use of soft, annealed, thin materials in the electrodes and heat sink bend features 106 allow the rail subassemblies to be bent and repositioned multiple times. Thermal rail subassemblies 144 may be electrically and mechanically connected at nodes as previously discussed regarding FIGS. 15-19. As shown in FIG. 56, two connected thermal rail subassemblies 144 may be pivoted around fastener 150 (angle "b"), the electrode legs 146 may be bent or flexed (angle "c") and electrode legs 146 may be axially twisted (angle "d"). Additional bend features 153 such as holes, slots, thinned material areas, embossments, may be added to assist desired bending and flexibility of the electrode legs 146. With the described degrees of bending and pivoting flexibility, rail modules may be easily assembled into many different configurations, and easily routed to orient the module mounting surfaces at virtually any location in a 3-dimensional installation. Rail subassemblies may be formed into a closed electrode rail system by looping ends together or may be configured with rail subassemblies that are connected on one end only. In this case, the unattached angled electrode leg portions may be cut away at the end of the heat sink 149. Such closed and open electrode rail configurations may be useful for stand-alone lighting fixtures.

Figure 57:
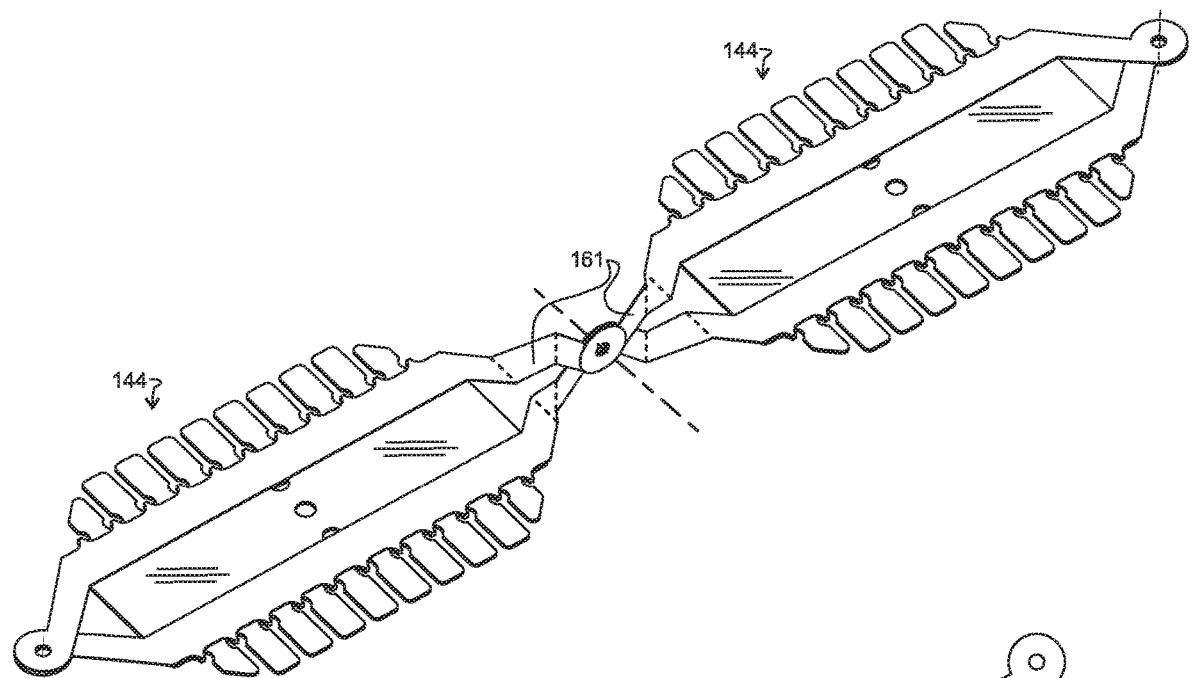
FIG. 57 is an isometric view of an assembly of two thermal electrode systems shown in FIG. 55 with bending to allow pivoting into closed-loop forms.
Figure 58:
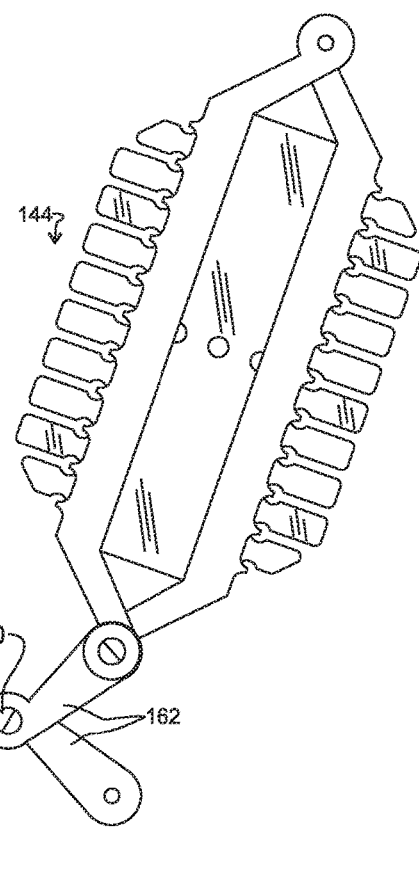
FIG. 58 is a top view of an assembly of thermal electrode systems shown in FIG. 55 including electrode links.
Figure 58:
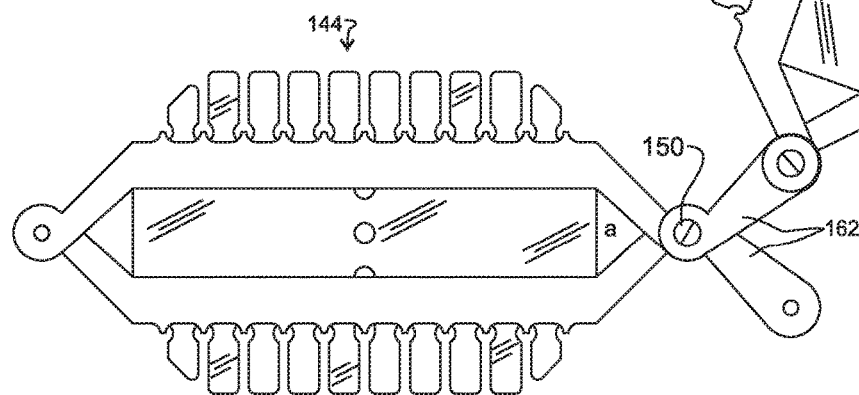
Figure 59:
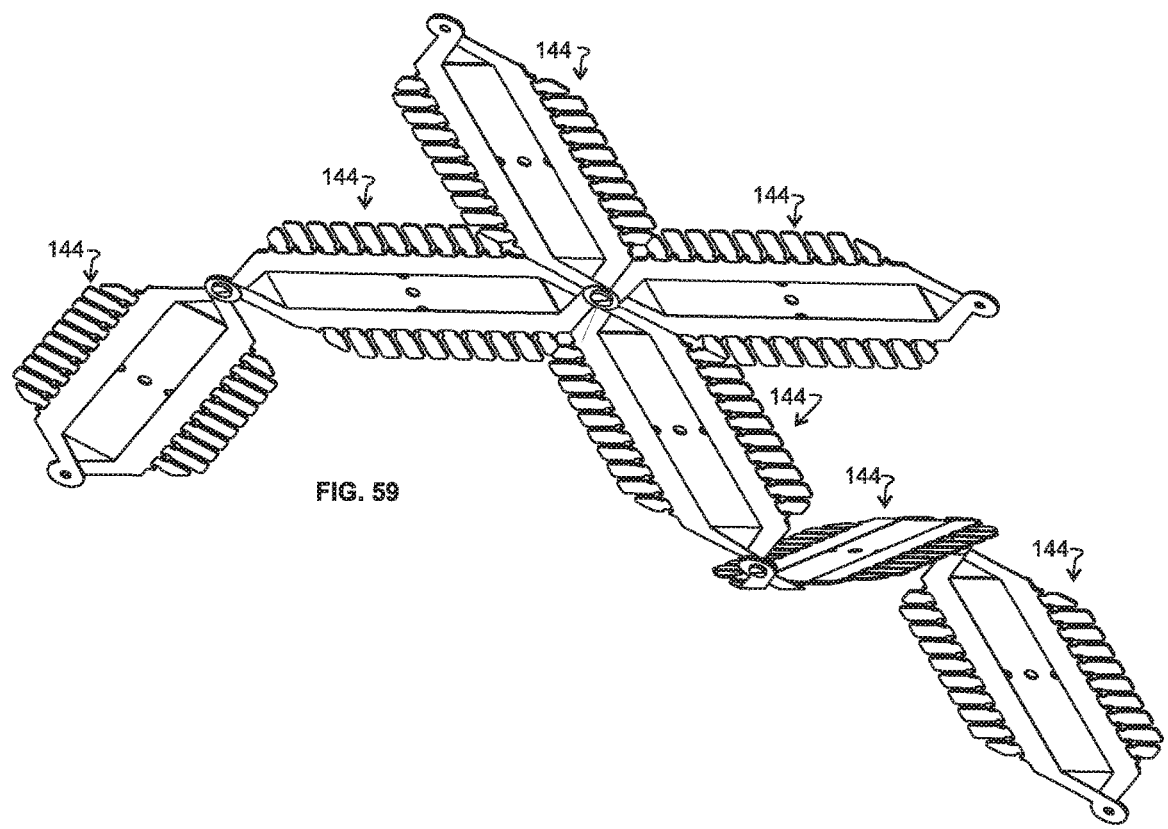
FIG. 59 is an isometric view of an extended assembly of thermal electrode systems shown in FIG. 55.
Figure 60:
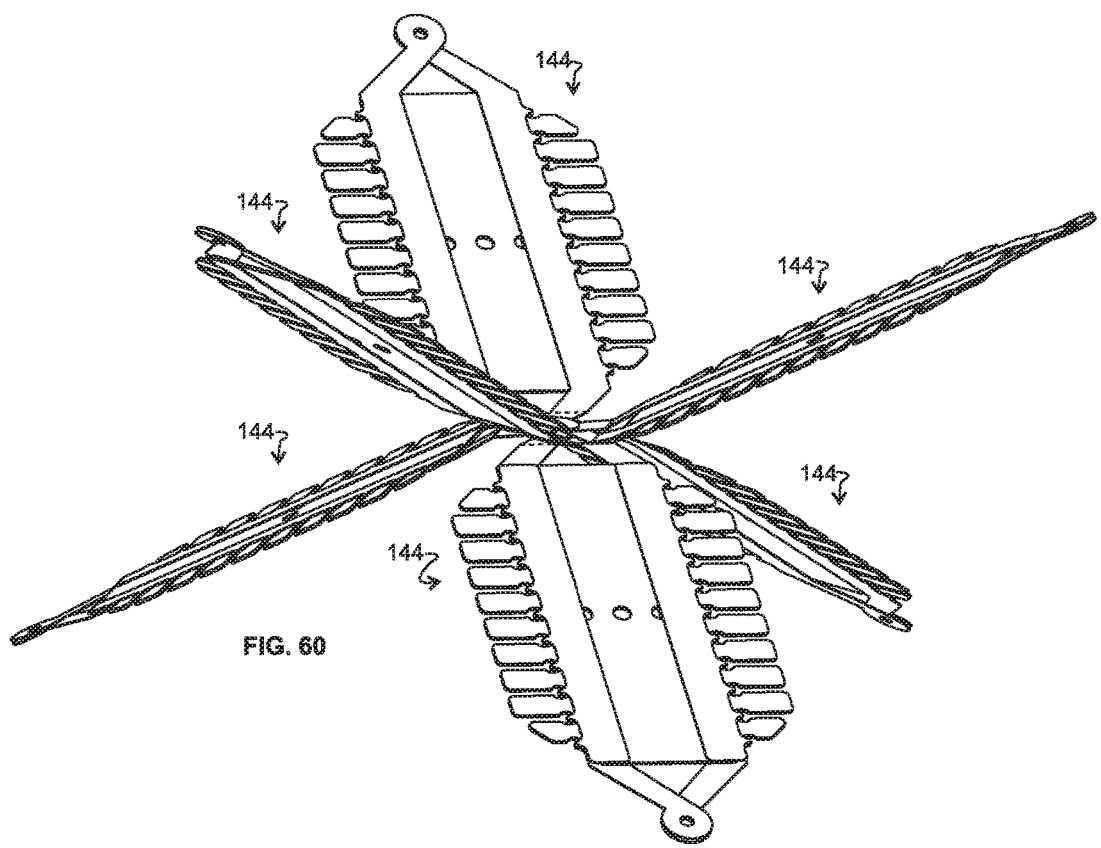
FIG. 60 is an isometric view of an assembly of six thermal electrode systems shown in FIG. 55 connected at a central point.

The perpendicular bend features shown in FIG. 54 allow the formation of a polygon from a series of bent thermal rail subassemblies 144 without bending any electrode legs 146. Alternatively, subassemblies may include pre-formed electrode legs 161 that result in pivoting in a plane perpendicular relative to the plane of the rail module as shown in FIG. 57 to form a closed-loop regular polygon rail system assembly. FIG. 58 illustrates electrode links 162 that are held to subassembly nodes with fastener 150 that may be used to fix a plurality of thermal rail subassemblies together as described previously for FIG. 28-30. FIGS. 59 and 60 illustrate examples of 3-dimensional electrode rail system assemblies that may be constructed using only pivoting and bending of rail subassemblies 144. These may be hung from ceilings, arms of poles, or attached mechanically to building surfaces using standoffs, mechanical fasteners, adhesives or pressure-sensitive tapes. Gyrating tracks could be produced by changing the angle of the perforations relative to the system axis.

Figure 61:
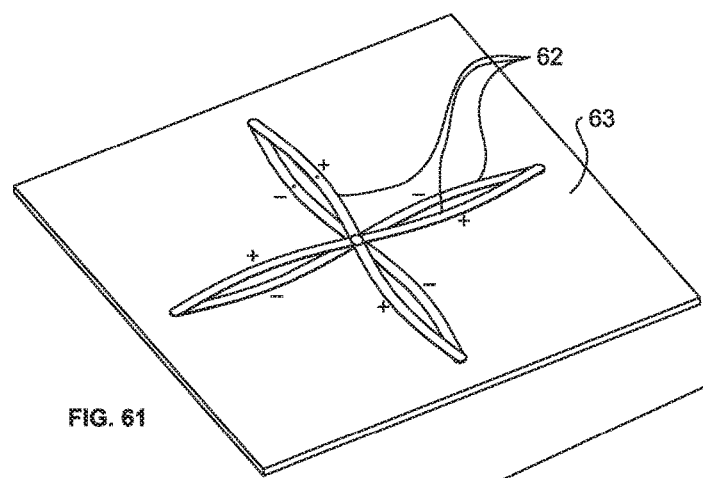
FIG. 61 is a top isometric view of sinusoidal electrode systems with non-uniform axial spacing mounted to a flat panel.
Figure 62:
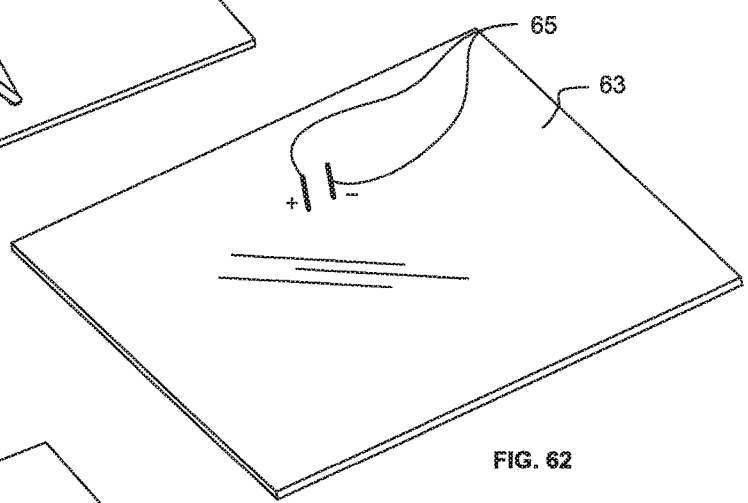
FIG. 62 is a bottom isometric view of the panel of FIG. 61 showing the electrical connections.

FIG. 61 shows a planar array of four sinusoidal electrodes 62 each one wavelength long mounted to a square electrically insulating substrate 63, such as an acoustic suspended ceiling tile similar to the parallel electrode systems of FIGS. 75-78 of U.S. patent application Ser. No. 15/213,115. Power to the rail assembly may be supplied through electrical connecting posts 65 that are welded or soldered or otherwise connected to a pair of electrodes as shown in rear view FIG. 62. These posts may be pushed through the substrate to mount the electrode system. Electrical connection to the other electrode pair may be accomplished at the central node as before. The central node may alternately be used to provide electrical connections and mechanical support. Electrodes 62 may be affixed to the substrate 63 with additional posts extending through the substrate or other mechanical means including adhesives. Other substrates than ceiling tiles found in offices and homes may be retrofitted with electrode rail systems. For example, plastic diffusers on fluorescent troffers may be modified or replaced to mount one of the electrode rail systems of this disclosure supplied with electrical power from a power supply fed by the existing ballast or by mains power bypassing the ballast or a lower voltage power network in the ceiling. Although magnetic attachment and IDC may be preferred for aesthetic reasons in providing relative smooth panel surfaces, mechanical module attachment to electrode systems that are proximate panel surfaces and non-IDC systems are considered to be part of this disclosure.

Figure 63:
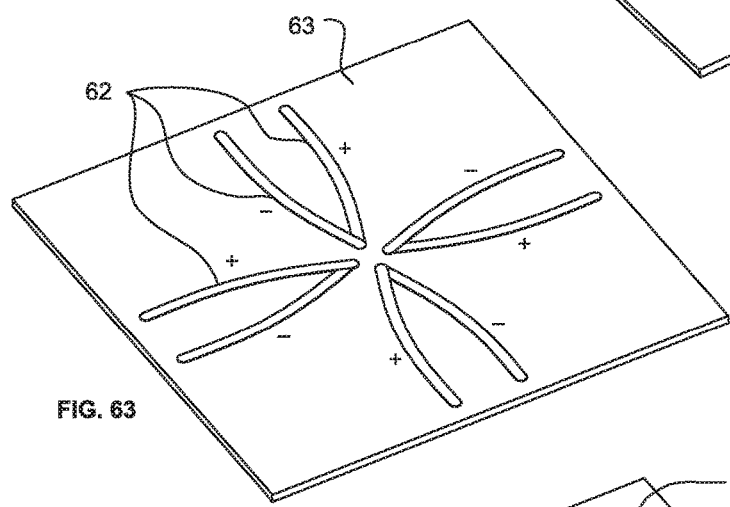
FIG. 63 is an isometric view of an alternate electrode system with sinusoidal electrode segments mounted to a flat panel.
Figure 64:
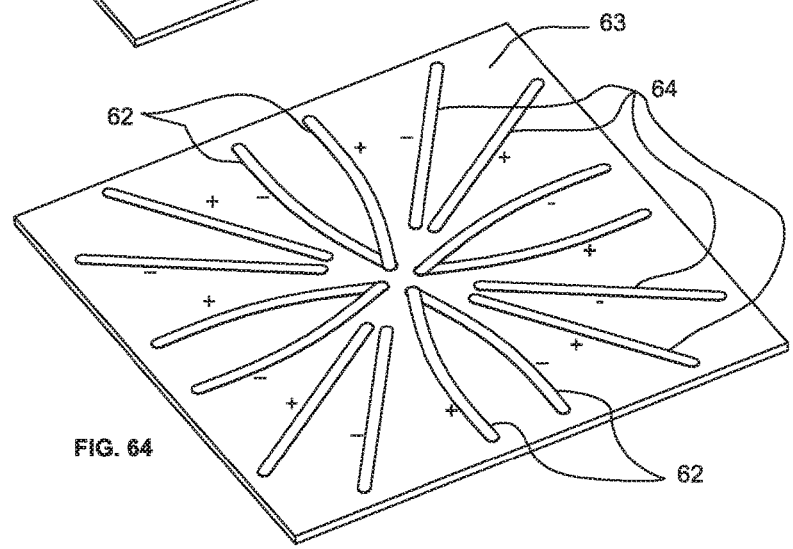
FIG. 64 is an isometric view of an electrode system comprising straight and sinusoidal electrode segments having non-uniform axial spacing mounted to a flat panel.

FIG. 63 shows a similar embodiment comprising four electrode systems with quarter wavelength sinusoidal electrodes 62. Increasing the contact spacing of an attached module provides a different set of mounting points between any of the electrodes of different polarity compared to FIG. 61. FIG. 64 further adds pairs of straight electrodes 64 to the system of FIG. 63 that are oriented at an acute angle with each other and placed symmetrically about the diagonals of the substrate. This configuration provides additional module mounting location options. FIG. 64 shows four pairs of sinusoidal electrodes 62 that form four rail system assemblies with rail axes going through the midpoints of the sides of the panel and the center of the panel. That is, the sinusoidal rail system subassembly axes may be considered to be directed at 0, 90, 180, 270 and 360 degrees of the unit circle. The electrode separation distance increases moving along each of the subsystem axes away from the center of panel 63. The four pairs of straight electrodes 64 added in FIG. 64 form four rail system subassemblies with rail axes located along diagonals connecting opposite corners of panel 63. These rail system axes may be considered to be oriented along 45, 135, 225 and 315 degrees of the unit circle. Note that each sinusoidal electrode 62 in FIG. 64 is adjacent to a straight electrode 64 that has the opposite voltage polarity. As a result, modules 1 may also be attached between each adjacent electrode pair comprising one sinusoidal electrode and one straight electrode. That is, the rail assembly may also be considered to also include eight rail system subassemblies in which each comprises a straight and curved electrode in which the axes of these rail systems are oriented along directions between 0 and 45 degrees, 45 and 90 degrees, 90 and 135 degrees, 135 and 180 degrees, 180 and 225 degrees, 225 degrees and 270 degrees, 270 to 315 degrees and 315 and 360 degrees of the unit circle. The sinusoidal electrodes 62 may also be used without including any of the overlap regions as shown.

In the discussion above, each electrical contact of the module had a magnetic assembly dedicated to that single contact. Parent patent application Ser. No. 13/910,132 describes systems using multiple ferromagnetic pole pieces to split the magnetic flux path of a single magnet to concentrate and direct the magnetic flux substantially perpendicular to multiple electrical contacts. With the proximity of electrode ends near the center of the panels shown in FIGS. 63-64, modules having multiple electrical contacts can be provided with a variation of the cup magnet geometry of module 1.

Figure 65:
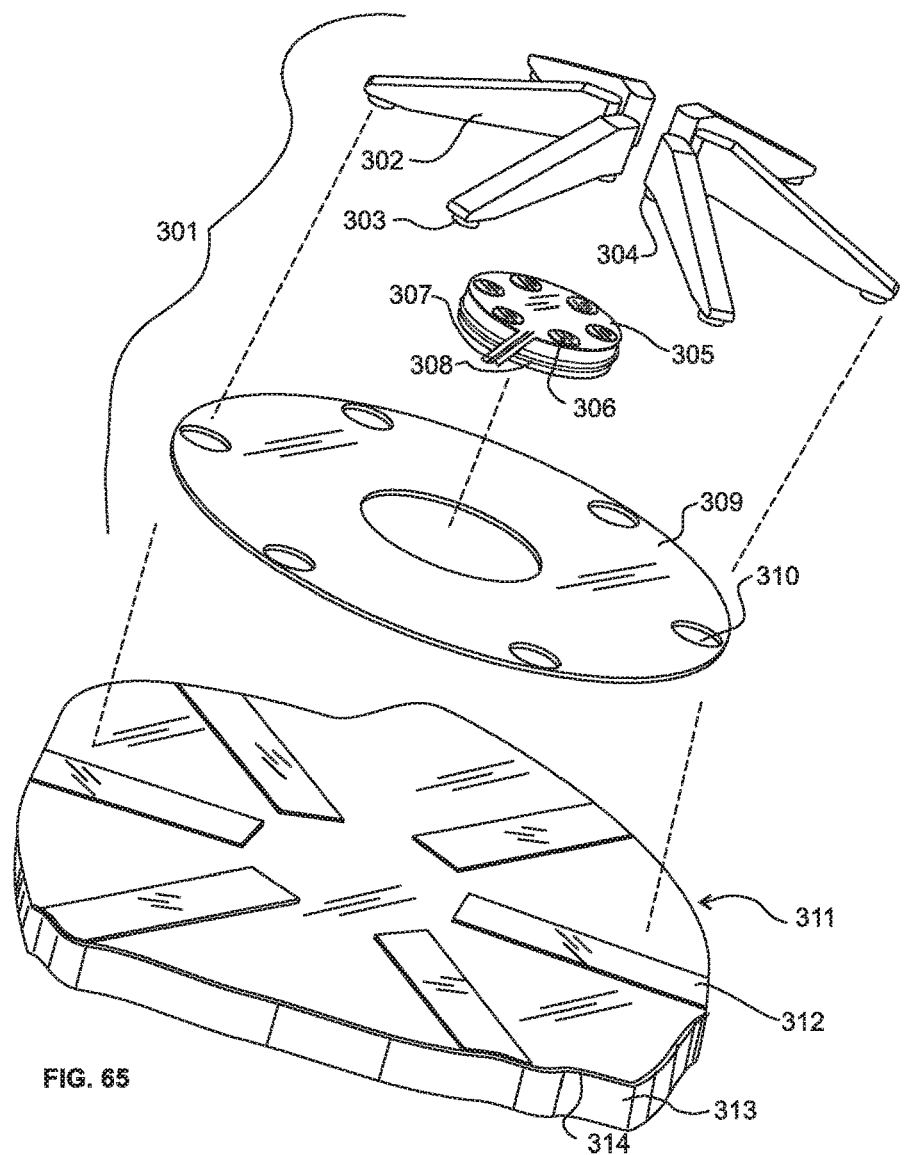
FIG. 65 is an isometric view of connecting portions of a magnetic module with six movable ferromagnetic armatures and an electrode panel.

FIG. 65 shows an exploded view of a six-contact magnetic electrical connector portion 301 of a module that employs a single disk magnet for electrical and mechanical attachment to an electrode panel portion having converging electrodes. In this embodiment, the electrode ends 312 are copper or other metal foils or an outer layer of a flexible circuit array. An insulating layer 314 separates the electrode layer from the ferromagnetic substrate 313 which may be a single sheet that may extend from the center of the panel to the outer ends of all electrodes. Since the functionality of this six-contact module may be different than the simple two-contact modules in most previous embodiments, the scale and shape of the electrodes in this central connection region may be quite different from that away from the center of the panel. The use of photolithography in making printed circuits or screened electrodes allows smaller and more complicated electrode end shapes and positioning for panel connector portion 311 than may be practical with thicker ferromagnetic electrodes. As a result, the six electrode ends 312 may be electrically attached to any desired combination of, for example, sixteen electrodes of the same shape as those in FIG. 64 converging towards the center of the panel. At the same time, the shapes of those electrodes could be easily patterned in different shapes such as the plant motif electrode 56 of FIG. 48.

The portion of the module 301 that provides electrical connection to the electrode system comprises rocking ferromagnetic armatures 302, an axially polarized disk magnet 308, a flex circuit 305 attached to the top of the disk magnet 308 and a module bottom plate 309. In this embodiment, the rocking ferromagnetic armatures 302 provide an electrical circuit path from the lower contact structure 303 to the upper contact structure 304. A coating of a metal such as copper or tin or a discrete wire could be added between these contact structures to increase electrical conductivity if necessary for a particular application. The upper contact structure 304 is pulled into flexible circuit 305 at a contact pad 306 under magnetic force to provide electrical continuity with flexible circuit traces that connect to the other circuitry and electronics (not shown) in the module through the tab 307. Contact structures 303 and 304 may be rounded to provide Hertzian stress for consistent electrical contact with the electrodes of the panel 302 and flexible circuit pad 306 as the armature 302 rocks to compensate for system mechanical planarity variation and tolerances. The armatures 302 are loosely constrained by the magnetic attraction from the magnet and apertures 310 in the module bottom plate 309. The module bottom plate and any other mechanical constraints on armature motion should generally be made of plastic, aluminum or other material that is non-magnetic. Variations are possible. For example, a weaker magnetic attraction from an additional magnetic element could be used to hold armatures 302 in a retracted position when the module is not connected that would be overcome by a stronger magnetic attraction when adjacent the panel portion 311. Also, an IDC contact spike (not shown) could be added to the lower contact structure 303. As an alternative to conducting armatures, electrical continuity from the bottom of the module to the internal electronics could be accomplished without electrical conduction through armatures using FMI technology discussed above for module 1. The electronics of this module connected to the tab 307 could include AC/DC power conversion, sensors, cameras, data communication, light dimming circuitry, or other functionality.

Figure 66:
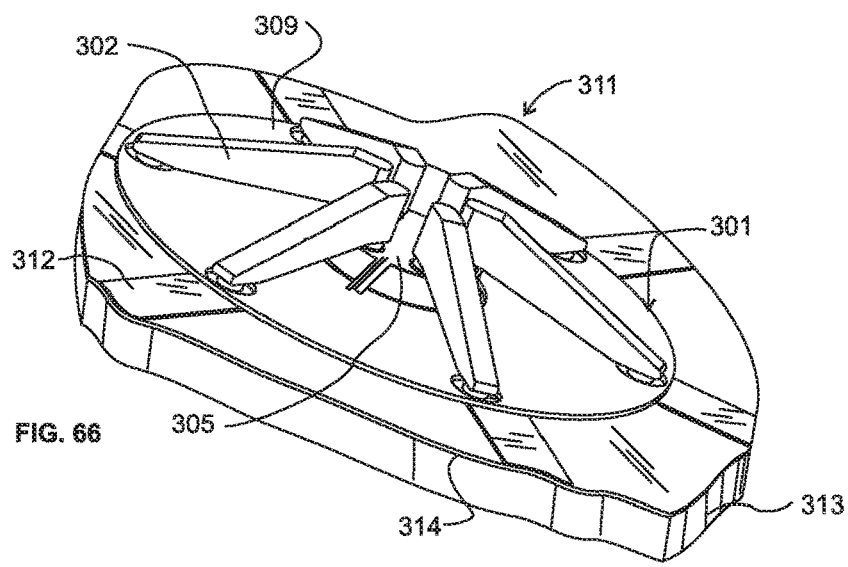
FIG. 66 is an isometric view of the connecting portions of the magnetic module and electrode of FIG. 65 in a connected state.
Figure 67:
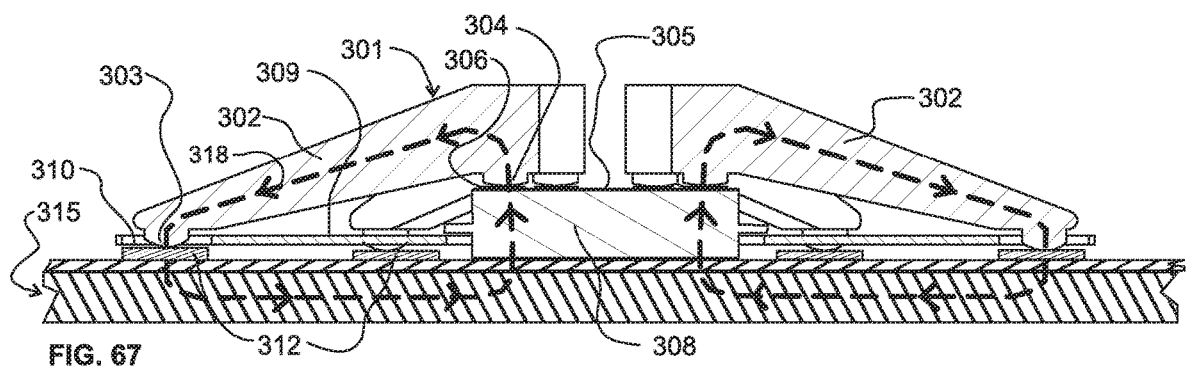
FIG. 67 is a cross-sectional view of the assembly of FIG. 66 showing electrical connections and the magnetic flux path.

FIG. 66 shows the assembled connecting portion of the module 301 attached to the ends of the electrodes 312 on the panel central portion 311. FIG. 67 shows a side diametric cross-sectional view of the assembly of FIG. 66 taken through the middle of armatures 302 on opposing sides of the module. FIG. 67 indicates the magnetic flux path 318 going from the top pole face of the magnet 308, through the armatures 302 into the ferromagnetic plate 315 of the panel and back into the bottom pole face of the magnet 308. The ferromagnetic armature 302 directs the magnetic flux and force substantially perpendicular to the electrode contacts 312 of the panel similar to the extended contact shown in FIG. 9. The loosely constrained armatures 302 are pulled by magnetic force through the apertures 310 in the module bottom 309 as needed to make contact. To shorten the magnetic flux gap, the disk magnet may be fixed to extend through a central aperture in the module bottom plate. The disk magnet may optionally be loosely constrained in the housing to provide additional mechanical tolerance insensitivity if desired by adding peripheral flanges on the magnet in concert with other housing features.

Note that a ferromagnetic element could also be associated with the lower pole face of the magnet to provide flux concentration, IDC capability or electrical continuity in non-FMI applications. A protruding ferromagnetic element on the bottom of the magnet could be designed to fit into an aperture in the panel to assist in alignment before electrical connection. For example, a hemispherical protrusion with a flanged key could be designed to drop into a matching well in the panel surface and the module rotated until the key was properly aligned in the same manner that a ferromagnetic acorn nut can be easily guided into a hexagonal hole or slot slightly larger than the width of the nut, but will not drop until rotated so that the flats of the nut align with the hexagonal hole or slot. An asymmetric key could be designed so that only one orientation would match.

An electrode end portion 312 could also be recessed into a slot by adding non-magnetic plate sections (not illustrated) on both sides of the electrode end portion on the panel surface. In addition to a central ferromagnetic element under the magnet, the shape of one or more lower contact structures 302 and apertures or slots surrounding recessed electrodes 312 could also be used to restrict possible attachment of a module to an electrode by mechanical keying. For example, even a linear track electrode system having an electrically insulating surface with recessed electrodes could employ different electrode recess distances, electrode widths and asymmetric spacings to allow a module with matching magnetic elements that would electrically connect only when the module was properly positioned laterally and radially with the linear track recesses. Sequencing of contacts is also possible in this case, for example, by having a wide central electrode recess matching a wide central module contact such that the module would slide across the array until the central module contact dropped into the central electrode recess. Peripheral contacts could be shaped and positioned to bridge narrower recesses on the track system until the module was rotated properly to allow these contacts to fit in the matching peripheral grooves. Asymmetric spacing and depths of electrode recesses relative to the central recess may also increase angular selectivity.

Although the module connector portion 301 has been described with identical armatures 302 symmetrically arranged in module connector portion 301, there may be applications where it would be desirable to have asymmetric contact spacing from the center, different angular separation between armatures or different heights and shapes of contact structures 303 and 304.

Figure 68:
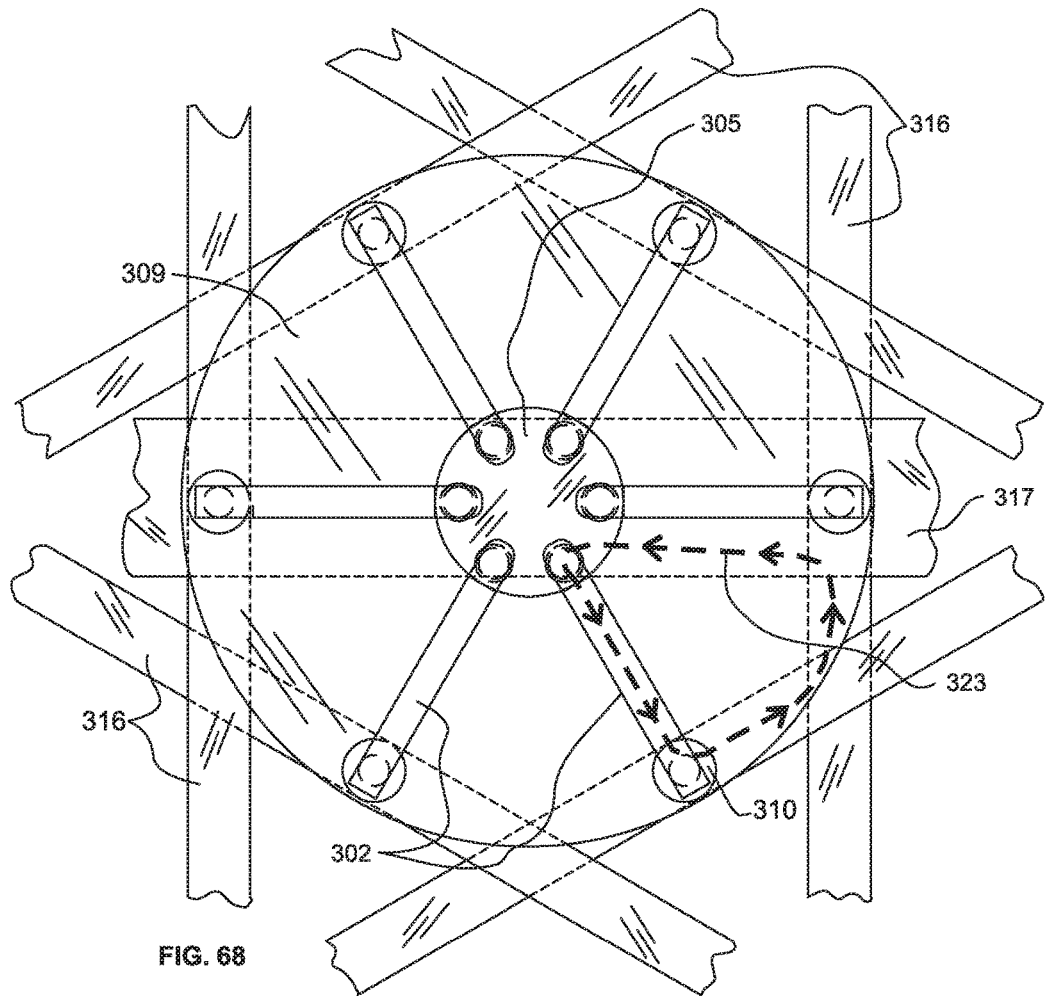
FIG. 68 is a top view of the module connecting portion of FIG. 65 and an array of ferromagnetic electrodes showing one of the magnetic flux paths.

Although the embodiment above describes a panel that has a set of flexible circuit electrodes mounted on top of a ferromagnetic plate, the rocking armature module connecting portion 301 can also work with free-standing interwoven electrode systems similar to FIG. 45 since the rocking armatures can accommodate differences in absolute electrode position planarity in the woven configuration. FIG. 68 is a schematic top plan view of module connecting portion 301 mounted to an array of woven electrodes 316 and 317. The shape and size of the electrodes and the resulting overlaps and intersecting angles of the weave pattern are design options. In the weave pattern shown, electrode 317 has been made wider only to distinguish the flux path of the two armatures more directly connected to it from the other four connected to electrodes 316 in FIG. 68. The flux path through the armatures is basically the same as that portion of the flux path 318 shown in FIG. 67 which is largely perpendicular to the face of electrode 317 instead of ferromagnetic sheet 315. The flux path for one of the armatures connected to electrode 316 is shown on FIG. 68. While the portion through the magnet and armature is comparable to that portion of flux path 318 in FIG. 67, the rest of the flux path 323 is different. Since there is no ferromagnetic element that directly connects armature contact structure 303 and the lower pole face of magnet 308, the magnetic flux path 323 includes portions that lie in the plane of the electrode assembly as shown in FIG. 68. The magnetic flux is perpendicular to the surface of electrode 316 where the lower armature contact structure 303 is positioned, but then passes through the electrode until it overlaps with an intersecting electrode 316, then follows along that electrode until the overlap with electrode 317 and then passes to the bottom pole of the magnet 308.

Figure 69:
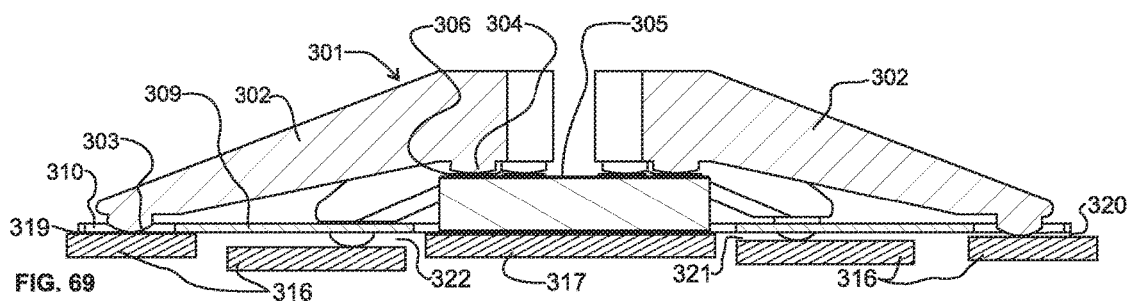
FIG. 69 is a schematic cross-sectional view of the system of FIG. 68 showing ferromagnetic armatures connected to electrodes at different distances from the bottom of the module.

FIG. 69 provides a schematic cross-sectional representation showing how the rocking armatures 302 can be designed to accommodate a range of different interleaved or stacked electrode distance variations from the module bottom 309. The rocking armatures move to make contact with the electrodes 316, but they do not have as much tendency to pull the electrodes to the bottom of the module as noted for the lighting pucks with cup magnets in earlier embodiments. The weave pattern also restricts electrode movement. As a result, a range of distances of up to the order of an electrode thickness is possible. In FIG. 69, gaps 319, 320, 321 and 322 between the bottom of the module and the electrode face are indicated.

Although the segmented ferromagnetic cup and magnet is appropriate for modules connecting to an extended electrode array in systems where electrodes are added to an existing substrate such as a ceiling tile, including the magnet in the connection half with the segmented ferromagnetic elements is another design choice based on system requirements. As an alternative to the magnet with segmented ferromagnetic cup located in the module 301, it may be desirable to embed the magnet under the flex circuit in a panel electrode segment like that shown in FIG. 65-67. By embedding the magnet in the panel, positioning of the module at the center of the panel may be simplified somewhat. While a magnet of the opposite polarity of that in the panel could be included in the module, in this case, there is no requirement to have any magnets in the module. Ferromagnetic pieces to make a segmented cup are sufficient to provide similar closed flux paths as described above. As was done with the embodiment in FIGS. 65-67, this discussion will describe the portions of the panel and the module providing electrical and mechanical connections in the form of a stand-alone magnetic electrical connector. Since the focus of the embodiment is directed specifically to the attachment of a module to multiple electrode contacts using a single magnet, the discussion of a discrete connector system is applicable.

Figures 70, 71:
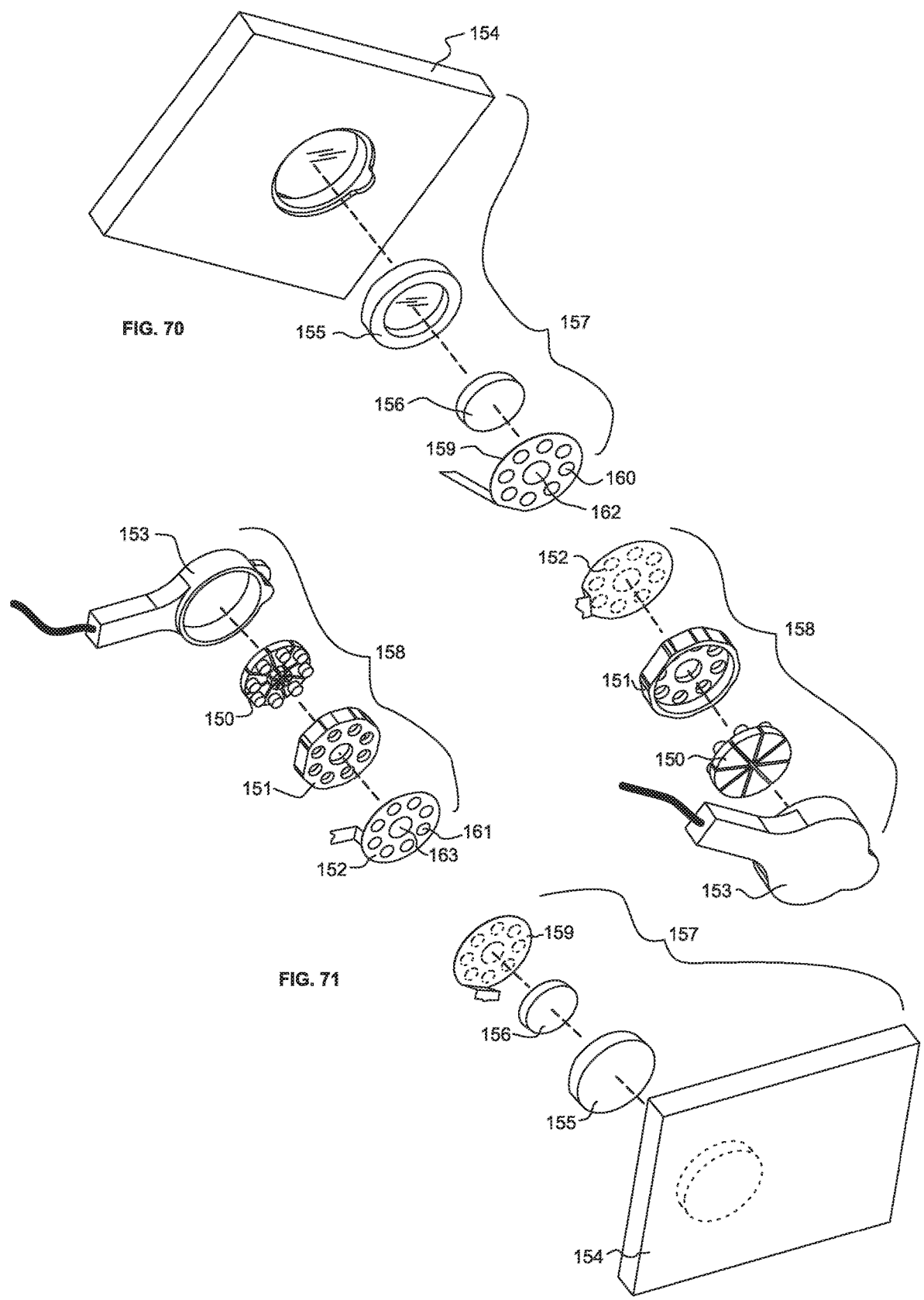
FIG. 70 is a top exploded view of a 9-contact radial connector system with a cup magnet and segmented ferromagnetic elements.
FIG. 71 is a bottom exploded view of the 9-contact radial connector system with a cup magnet and segmented ferromagnetic elements.

FIGS. 70 and 71 show top and bottom exploded views of a 9-contact magnetic connector assembly. The panel side of the connector 157 contains an axially polarized disk magnet 156 attached to a ferromagnetic cup 155 similar to that shown in FIG. 4, with a flex circuit 159 placed in front of the cup 155 and magnet 156. The flex circuit 159 as shown has an array of 8 contact pads 160 surrounding a single central contact pad 162. This assembly is embedded in the surface of a planar panel 154. In this embodiment the cup magnet assembly can be fixed in position or loosely constrained by the flex circuit 159, which may be an extension of a flex circuit incorporating electrode ends 312 in FIG. 65. A fringing magnetic field is created across the gap between the rim of the cup 155 and the exposed pole face of the magnet 156 in the same manner as shown in FIG. 9. The magnetic flux density of the fringing field may be adjusted by tailoring the gap between the rim and the radial edge of the magnet. The flux density can also be concentrated by the geometry of the cup rim, for example by removing material to create a discontinuous rim with castellations.

The module side of the connector half 158 includes a series of loose ferromagnetic armatures 150 loosely constrained within a non-magnetic retainer 151 and a connector housing 153. As illustrated, the armatures 150 are pie shaped elements with raised contact structures facing the connector interface to concentrate magnetic flux and Hertzian stress as described in referenced patents describing FMI. One of the contacts in each armature segment is centered on the gap between the cup rim and magnet, while the other is near the axis of the magnet. In this example, the pointed ends of the pie segments share a common electrical contact centered on the axis of the connector, but this is a design choice. If desired, the armature segments could be moved radially outward so that the inner raised structures are associated with an inner ring of discrete electrical contacts. The armature shape may also be changed to reduce fabrication cost. For example, instead of pie shaped elements, a rod could be bent into a u-shape (not illustrated) so that the ends of the u-shaped armature act in a similar manner to the raised ends of the pie segments illustrated. If the inner contact portions of these u-shaped ferromagnetic elements are separated and moved radially outward, the central contact 163 on flex circuit 152 and central contact 162 on flex circuit 159 could each be modified to provide a ring of 8 separate inner contact pads aligned with the 8 outer connections to increase the number of connections from 9 to 16.

As illustrated, a flexible circuit 152 overlays the ferromagnetic armature contact positions and contains a contact pad geometry of 8 outer pads 161 surrounding a central contact pad 163 to match the contacts on flex circuit 159 in the panel connector half 157. Since a flexible circuit provides the electrical connection between connector halves and the other electronics (not shown) in each side of the assembly, the magnetic cup assembly and ferromagnetic armatures do not need to participate in the electrical conduction. The flexible circuits may be used to provide sealing of both halves in addition to this elimination of the need for electrical conduction and electrical attachment to the magnetic structures.

Alternatively, the flexible circuit on the connector half may be removed if electrical conduction is through the ferromagnetic armatures as in the previous embodiment. Circuit wires may also be attached to ferromagnetic structures 150 by any mechanical means such as crimping, spring contacts, magnetic force, soldering, welding, etc. If participating in electrical conduction, each of the armatures may be separated into two halves separated by an electrical insulator (not illustrated) so that electrical attachment may be made to each end. As discussed previously, the contacts may incorporate piercing structures to create an insulation displacement contact connector.

Using the flex circuit for the panel connector half 157 is also a design choice. Instead of a ferromagnetic cup of unitary construction, the ferromagnetic cup may be constructed of electrically-isolated segments (not illustrated) that each provide electrical continuity directly. Magnetic force between the pole of the magnet further from the connector interface and the ferromagnetic cup segment may be used to trap and electrically connect a wire prepared with a flat tab crimp connector similar to the contacts on flex circuit 305 in module portion 301 of FIG. 65.

If desired, different subset combinations (not shown) of the ferromagnetic elements 150 could be populated in the module connector 158 to distinguish different species of attached modules without requiring any additional electronic components in the module. This may be a useful partitioning of cost in inexpensive applications such as toys by concentrating all electronics in a base unit with the cup magnet assembly and having a larger quantity of pluggable modules with only ferromagnetic elements that cause a different electronic response in the base unit dependent upon which combination of ferromagnetic elements are present. These armatures could be used to electrically bridge base unit contacts directly or activate some form of switching within the base unit, such as described in co-owned U.S. Pat. No. 8,491,312. Use of a flex circuit in the base unit may be desirable because of thinness to increase magnetic force, but since mechanical tolerances can be accommodated with the module armature movement, the base unit electrical contacts can be directly fabricated on a thicker rigid printed circuit board positioned in front of the cup magnet assembly.

When flex circuit 152 is used with the loosely constrained pie-shaped armatures 150 of connector half 158, there is no need to electrically isolate the ferromagnetic segments 150 from one another. As an alternative to the multiple armatures 150, a segmented ferromagnetic spring 261 can be used to provide the magnetic flux paths from the center of the magnet pole to the peripheral contacts. FIGS. 72 and 73 illustrate top and bottom views of magnetic connector system halves in which a ferromagnetic segmented spring is located on one side of an FMI contact assembly and a cup magnet is located in the other half. Since both connection interfaces include flexible contacts, it is a design choice on whether the magnet is incorporated into a panel portion with thin electrodes on the surface like 311 in FIG. 65 or into a module that connects to that panel. The description below will describe the half with the magnet as the module connector. While the contacts are flexible, the magnetic elements need to be aligned to the contacts. The description below describes a substrate with apertures located at the flexible contacts. One design option is a flex circuit attached to apertures in a non-magnetic plate. Another is a rigid or semirigid printed circuit board that has been mechanically and/or chemically milled to provide apertures aligned to the outer copper plane, or whether the aperture alignment function is provided by mechanical features that are not adjacent to the contacts, or choosing to directly affix the magnetic elements directly to the flexible circuits are also considered to be disclosed design choice variations from the referenced patents and patent applications describing FMI technology.

Module connector 260 includes a ferromagnetic cup 271 with castellations 275 and optional ferromagnetic boss 272 and attached axially polarized disk magnet 273. The castellations 275 are preferably sized to be loosely constrained by recesses 270 in substrate 266 and flexible circuit contacts 268 and 269. The contacts may be electrically connected to electrodes in a panel or to other electronics as discussed previously. The boss can be used to adjust the height of the disk magnet. As illustrated, there are one central contact 268 and eight peripheral contacts 269, but other numbers of contacts can be accommodated.

Panel connector 259 comprises substrate 262 with flexible circuit contacts 263 and 264 adjacent to apertures 265. Ferromagnetic segmented spring cup 261 with contact structures 274 is shaped to be loosely constrained by the apertures and flexible circuit. The flexible circuit can be attached to sensor, power supply, communications, lighting or other electronics as discussed earlier. Assembled top and bottom views are presented in FIGS. 74 and 75, and a top plan view of the assembly is found in FIG. 76.

Figure 76:
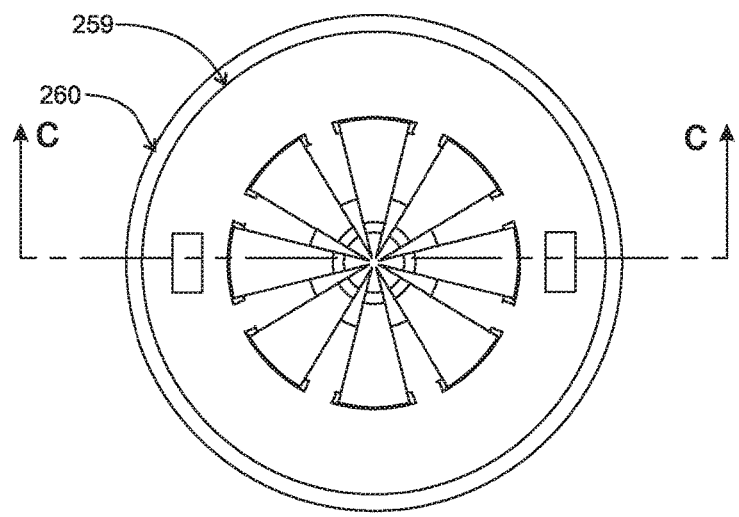
FIG. 76 is a top view of a 9-contact radial connector system with a cup magnet and a segmented ferromagnetic spring in the connected state.
Figure 77:
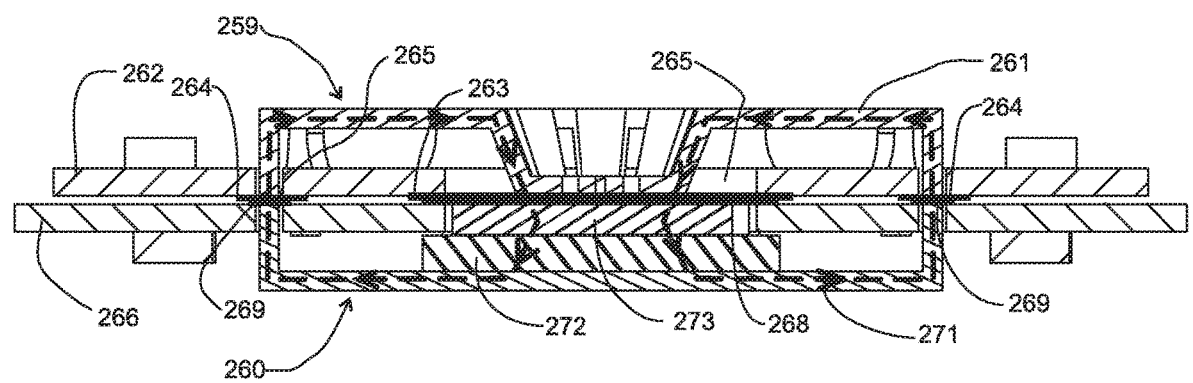
FIG. 77 is a cross-sectional view of a 9-contact radial connector system with a cup magnet and a segmented ferromagnetic spring showing magnetic flux paths.

FIG. 77 provides a cross-sectional view of the assembly through the middle of the assembly shown in FIG. 76 with the flux path indicated. The segmented spring 261 provides a magnetic flux path in a similar manner to the loose pie shaped ferromagnetic elements 150 of connector half 158 of the last embodiment. The deflection of the spring under magnetic force and the rounded contact structures 274 for each segment compensate for mechanical tolerances in the assembly. This segmented ferromagnetic cup geometry can also be used to make multiple electrical contacts with a single magnet with other electrode geometries such as linear tracks and discrete connectors that are not part of any track system.

This disclosure and documents incorporated by reference include descriptions of different embodiments to illustrate a plurality of inventive concepts. The embodiments presented are not restrictive. It should be understood that inventive concepts from one embodiment may be used singly or combined with inventive concepts from other embodiments to create additional embodiments. In addition, it should be understood that more than two electrodes may be incorporated into a rail system subassembly, or the heat sink in the thermal rail systems could also be used as an electrode. This additional electrical connection could allow data communication through the electrode system and module without multiplexing data on the power supply. Three electrode systems may be useful for modules such as wireless communication lighting modules to avoid the need to include a power conversion circuit in each module. That is, for a module that is most efficient powering an LED at 24 volts DC using control circuitry that requires 5 volts DC, three contacts allow a larger, more efficient system power supply to be located remotely and sized to supply multiple smaller, less expensive modules.

What is claimed is:

1. An electrode system comprising ferromagnetic material and having a removable module attachment region comprising:
   a first strip electrode having a first longitudinal axis comprising:
      a first front face;
      a first rear face;
      a plurality of first edges;
      wherein the first front face and the first rear face define a first thickness therebetween; and
      wherein the first front face is oriented perpendicular to the first longitudinal axis and has a lateral extent determined by the plurality of first edges; and
   a second strip electrode having a second longitudinal axis comprising:
      a second front face;
      a second rear face;
      a plurality of second edges;
      wherein the second front face and the second rear face define a second thickness therebetween;
      wherein the second front face is oriented perpendicular to the second longitudinal axis and has a lateral extent determined by the plurality of second edges; and
      wherein the first front face and the second front face are essentially parallel; and wherein the combination of the first longitudinal axis and the second longitudinal axis determine a first electrode system axis midway between the first longitudinal axis and the second longitudinal axis; and wherein at least a portion of a first edge in the removable module attachment region is not parallel to the first electrode system axis; and
   a module for mechanical and electrical attachment to the electrode system comprising:
      a housing;
      an electrical interface;
      a magnetic structure; and
   wherein the magnetic structure is operable to provide a magnetic attractive force between the electrical interface and the first strip electrode that is directed substantially perpendicular to a face of the first strip electrode.

2. The electrode system of claim 1 wherein the removable module attachment region comprises:
   the first front face;
   the second front face;
   the first rear face; and
   the second rear face.

3. The electrode system of claim 1 wherein the magnetic structure comprises:
   a magnet with opposing first and second pole faces;
   wherein the first pole face is proximate the electrical interface and the first strip electrode; and
   a ferromagnetic pole piece;
   wherein the ferromagnetic pole piece is proximate to the second pole face of the magnet;
   wherein the magnetic attractive force is characterized by a magnetic flux circuit path including the magnet, the ferromagnetic pole piece and the first strip electrode; and wherein the magnetic flux circuit path is substantially perpendicular to the electrical interface at the first strip electrode.

4. The electrode system of claim 3 wherein the ferromagnetic pole piece provides a magnetic flux circuit path between the second pole face of the magnet and the second strip electrode.

5. An electrode system having a removable module attachment region comprising:
a first electrode;
a second electrode;
wherein the electrode system comprises:
a first portion in which the first electrode overlaps the second electrode;
a second portion in which the first electrode does not overlap the second electrode; and
a third portion in which the second electrode does not overlap the first electrode;
wherein the electrode system has an electrode system longitudinal axis; and
wherein the electrode system has non-uniform axial electrode spacing in the removable module attachment region.

6. The electrode system of claim 5 wherein the first electrode is a line electrode having a local centerline of sinusoidal shape.

7. The electrode system of claim 5 wherein the removable module attachment region of the electrode system comprises two substantially planar areas; and
wherein the first electrode crosses over the electrode system longitudinal axis between the two substantially planar areas.

8. The electrode system of claim 5 wherein the first and second electrodes overlap at a first overlap node and a second overlap node.

9. The electrode system of claim 8 wherein the first electrode lies above the second electrode at the first overlap node and the first electrode lies below the second electrode at the second overlap node.

10. The electrode system of claim 5 where the electrode system comprises localized electrode forming means comprising reduced cross-sectional areas.

11. The electrode system of claim 5 further comprising:
a third electrode;
a fourth electrode; and
wherein the first electrode is electrically connected with the third electrode; and
wherein the second electrode is electrically connected with the fourth electrode.

12. The electrode system of claim 11 wherein the first electrode, the second electrode, the third electrode and the fourth electrode are mechanically connected in a stacking orientation at an overlap node.

13. The electrode system of claim 5 further comprising a module;
wherein the module has an electrical interface comprising a first electrical contact and a second electrical contact;
wherein the first electrical contact is attachable to the first electrode and the second electrical contact is attachable to the second electrode at a plurality of module attachment positions along the electrode system longitudinal axis;
wherein each attachment position has an associated module rotation angle measured between the electrode system longitudinal axis and a line connecting the first and second electrical contact; and
wherein the plurality of module attachment positions have a range of module rotation angles exceeding 60 degrees.

14. The electrode system of claim 5 further comprising a heat sink interface wherein the heat sink interface is accessible through an aperture between the first electrode and the second electrode.

15. The electrode system of claim 5 wherein the first electrode comprises a strip electrode having an electrode width bounded by a first edge and a second edge and wherein the first edge includes a plurality of protrusions.

16. The electrode system of claim 11 wherein the third electrode comprises a strip electrode comprising:
a first planar end;
a second planar end;
a central section connecting the first planar end to the second planar end; and
wherein the central section comprises at least one of a bend or a twist.

17. A kit of parts for assembling an electrode system with a removable module attachment region having non-uniform axial electrode spacing comprising:
a first electrode having a first longitudinal axis;
a second electrode having a second longitudinal axis;
attachment means for mechanically holding the first electrode and the second electrode at a plurality of spatially separated overlap nodes to form an electrode system comprising a self-supporting module attachment region with non-uniform axial electrode spacing; and
a module comprising an electrical interface for removable attachment to the first electrode and the second electrode after assembly into an electrode system with non-uniform axial electrode spacing.

18. The kit of parts for assembling an electrode system with a removable module attachment region having non-uniform axial electrode spacing of claim 17 wherein the first electrode and the second electrode have the same shape; and wherein the non-uniform axial electrode spacing results from a relative translation or rotation between the first electrode and the second electrode prior to the mechanical attachment of the first electrode to the second electrode.

19. The kit of parts for assembling an electrode system with a removable module attachment region having non-uniform axial electrode spacing of claim 17 further comprising a bendable tab configured to change the orientation of module attachment wherein one end of the tab is configured for mechanical and electrical connection to the first electrode.

20. The kit of parts for assembling an electrode system with a removable module attachment region having non-uniform axial electrode spacing of claim 17 wherein the first electrode and the second electrode comprise wire electrodes; and
wherein the attachment means comprises a node connector having wire channels wherein the wire channels are sized and oriented to hold the wires in an overlapping configuration.

* * * * *